(12) United States Patent
Fujimoto et al.

(10) Patent No.: US 6,968,426 B1
(45) Date of Patent: Nov. 22, 2005

(54) SCALABLE DISC ARRAY CONTROLLER

(75) Inventors: Kazuhisa Fujimoto, Kokubunji (JP);
Akira Fujibayashi, Sagamihara (JP);
Nobuyuki Minowa, Odawara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/700,874

(22) PCT Filed: May 18, 1998

(86) PCT No.: PCT/JP98/02176

§ 371 (c)(1),
(2), (4) Date: Jan. 2, 2001

(87) PCT Pub. No.: WO99/60471

PCT Pub. Date: Nov. 25, 1999

(51) Int. Cl.[7] ............................................. G06F 12/00
(52) U.S. Cl. ......................................... 711/114; 711/4
(58) Field of Search ........................... 711/4, 113, 111, 711/114, 148, 149, 153; 710/313, 317, 316, 710/131, 129

(56) References Cited

U.S. PATENT DOCUMENTS

| | | | |
|---|---|---|---|
| 5,819,054 A | 10/1998 | Ninomiya et al. ............. | 712/3 |
| 5,887,270 A * | 3/1999 | Brant et al. ................. | 711/162 |
| 6,006,296 A * | 12/1999 | Gold et al. ................. | 710/100 |
| 6,115,764 A * | 9/2000 | Chisholm et al. ........... | 710/100 |
| 6,385,681 B1 * | 5/2002 | Fujimoto et al. ........... | 710/131 |
| 6,477,619 B1 * | 11/2002 | Fujimoto et al. ........... | 711/114 |

FOREIGN PATENT DOCUMENTS

JP      720994      1/1995

* cited by examiner

Primary Examiner—Kimberly McLean-Mayo
(74) Attorney, Agent, or Firm—Mattingly, Stanger, Malur & Brundidge, P.C.

(57) ABSTRACT

This invention relates to a disk array controller. There has been demand for a large scale memory device system operable without interruption. Further, in order to cope with the recent trend toward open systems, scalability of performance and capacity in such systems is needed.

Conventionally, internal buses such as ones which connect the channel interface section to the shared memory section, and the disk interface section to the shared memory section, have been mounted on one platter, and the channel interface and other packages have been mounted thereon. If the internal buses have failed, the operation of the whole system must be stopped. There has been another problem that the performance of the internal buses is fixed.

A disk array controller according to this invention comprises an interface platter on which a channel interface section and a disk interface section are mounted, a memory platter on which a shared memory section is mounted, and a cable which connects the interface platter to the memory platter in order to solve the above problems.

3 Claims, 83 Drawing Sheets

SCALABLE DISC ARRAY CONTROLLER

This application claims benefit of priority of PCT Application PCT/JP98/02176 filed on May 18, 1998 in Japan.

TECHNICAL FIELD

This invention relates to a controller for a disk array device which divides data and stores it in plural magnetic disk drives.

BACKGROUND ART

The I/O performance of subsystems which use magnetic disk drives as secondary memories is lower than that of computer main memories by three or four digits. Efforts to minimize this performance discrepancy or improve the I/O performance of subsystems have been made by many people. As one method for improving the I/O performance of subsystems, what is called a disk array, in which a subsystem is composed of plural magnetic disk drives and data is divided and stored in the magnetic disk drives, has been known.

In one example of the prior art, as shown in FIG. 2, a disk array device has the following: plural channel interface units 111 for data transmission between a host computer 101 and a disk array controller 5; plural disk interface units 112 for data transmission between magnetic disk drives 120 and the disk array controller 5; a cache memory unit 115 which temporarily stores data to be recorded in the magnetic disk drives 120; and a shared memory unit 114 which stores control data for the cache memory unit 115 and the disk array controller 5, where the cache memory unit 115 and the shared memory unit 114 are accessible from all the channel interface units 111 and all the disk interface units 112. In this conventional system, each of the channel interface units 111 and the disk interface units 112 is connected to the shared memory unit 114 or to the cache memory unit 115.

In another example of the prior art, as shown in FIG. 3, a disk array device has the following: plural channel interface units 111 for data transmission between a host computer 101 and a disk array controller 6; plural disk interface units 112 for data transmission between magnetic disk drives 120 and a disk array controller 6; cache memory units 115 which temporarily store data to be recorded in the magnetic disk drives 120; and shared memory units 114 which store control data for the cache memory units 115 and the disk array controller 6, where each of the channel interface units 111 and the disk interface units 112 is connected to the shared memory units 114 through a shared bus 130 and each of the channel interface units 111 and the disk interface units 112 is connected with the cache memory units 115 though a shared bus 130.

DISCLOSURE OF THE INVENTION

Large scale memory systems which are used for data management of main computer systems in large scale companies such as banks, securities companies and telephone companies are required to run around the clock uninterruptedly all the year round. In addition, with the recent growing demand for open-ended systems, scalability of performance and capacity is anticipated to support small to large scale systems.

However, in the prior art shown in FIGS. 2 and 3, the internal buses which connect each of the channel interface units 111 and disk interface units 112 to the shared memory unit 114 or to the cache memory unit 115 are mounted on one platter (backplane), and channel interface packages and disk interface packages are mounted on the same platter. Due to this structure, in the case of a fault in the internal buses, the platter itself had to be replaced, which means that the whole system had to be stopped.

Besides, since the internal buses are mounted on the platter, their performance is fixed. Therefore, the prior art has the following problem: in small scale systems, the cost performance is low because the performance of the internal buses is too high to match that of the channel or disk interface units, while in large scale systems, the performance of the internal buses is insufficient and cannot be increased.

As there is a drastic decline in the price of large disk array devices in the market, products with higher cost performance are anticipated.

A first object of the present invention is to provide a disk array controller which runs around the clock all the year around uninterruptedly without the need for stopping the whole system in the case of a fault or during maintenance. A second object of the present invention is to provide a disk array controller which provides scalability of performance and capacity without an unfavorable influence on the cost performance.

The above-mentioned objects can be achieved by a disk array controller which has the following: an interface unit platter on which channel interface units connected with the host computer and disk interface units connected with disk drives are mounted; a memory platter on which a shared memory unit for storing control data is mounted; and cables which connect the interface platter and the memory platter.

Also, the above-mentioned objects can be achieved by a disk array controller which has the following: plural platters on each of which channel interface units connected with the host computer, disk interface units connected with disk drives and a shared memory unit for storing control data are mounted; and cables which interconnect the plural platters.

Furthermore, the above-mentioned objects can be achieved by a disk array controller which has the following: an interface platter on which channel interface units connected with the host computer, disk interface units connected with disk drives, shared buses which connect the channel interface units and disk interface units, and shared bus interconnect controllers connected with the shared buses to control requests from the channel interface units and the disk interface units, are mounted; a memory platter on which shared memory units for storing control data are mounted; and cables which connect the interface platter and the memory platter.

The above-mentioned disk array controller according to this invention uses expensive cables. Further, data transmission at high frequencies by cables is likely to cause noise. Therefore, a further object of this invention is to shorten the cable length in the disk array controller according to this invention which is placed in the rack, as far as possible.

The above-said further object of the present invention can be achieved by a disk array controller which has the following: an interface platter on which channel interface units connected with the host computer, and disk interface units connected with disk drives are mounted; and a memory platter on which shared memory units for storing control data are mounted, where the orientation of the mounted interface platter is different from that of the mounted memory platter.

Also the above-said further object of the present invention can be achieved by a disk array controller which has the following: plural interface platters on each of which channel interface units connected with the host computer, and disk interface units connected with disk drives are mounted; and a memory platter on which shared memory units for storing control data are mounted, where the memory platter is located between the plural interface platters.

Also, the above-said further object can be achieved by a disk array controller which has plural platters on each of which channel interface units connected with the host computer, disk interface units connected with disk drives, and a shared memory unit for storing control data are mounted, where one of the plural platters is located above another of them.

Other solutions for the above-mentioned objects and further object will be discussed in the section "BEST MODE FOR CARRYING OUT THE INVENTION."

BEST MODE FOR CARRYING OUT THE INVENTION

The best mode for carrying out this invention is explained next using various embodiments.

Embodiment 1

Figure 1:
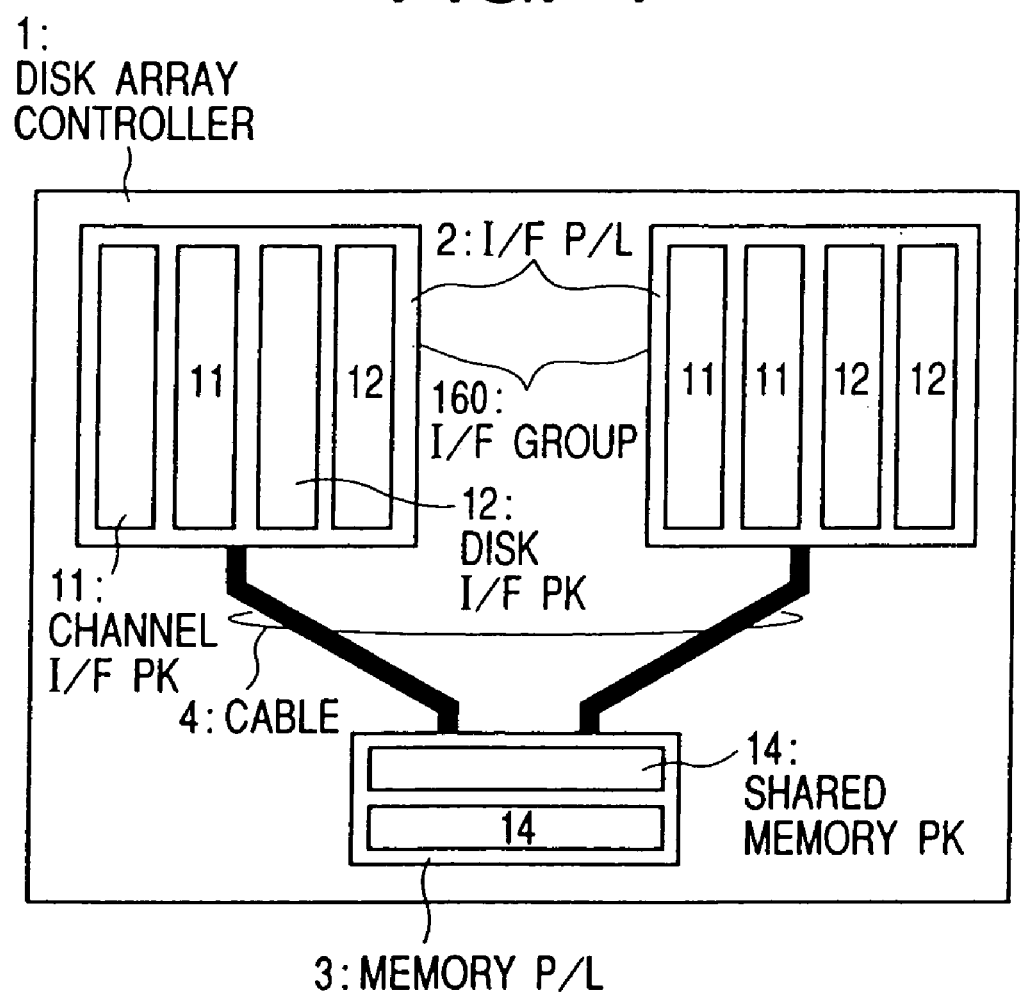
FIG. 1 shows a configuration in the rack-mounted form of a disk array controller according to this invention.
Figure 2:
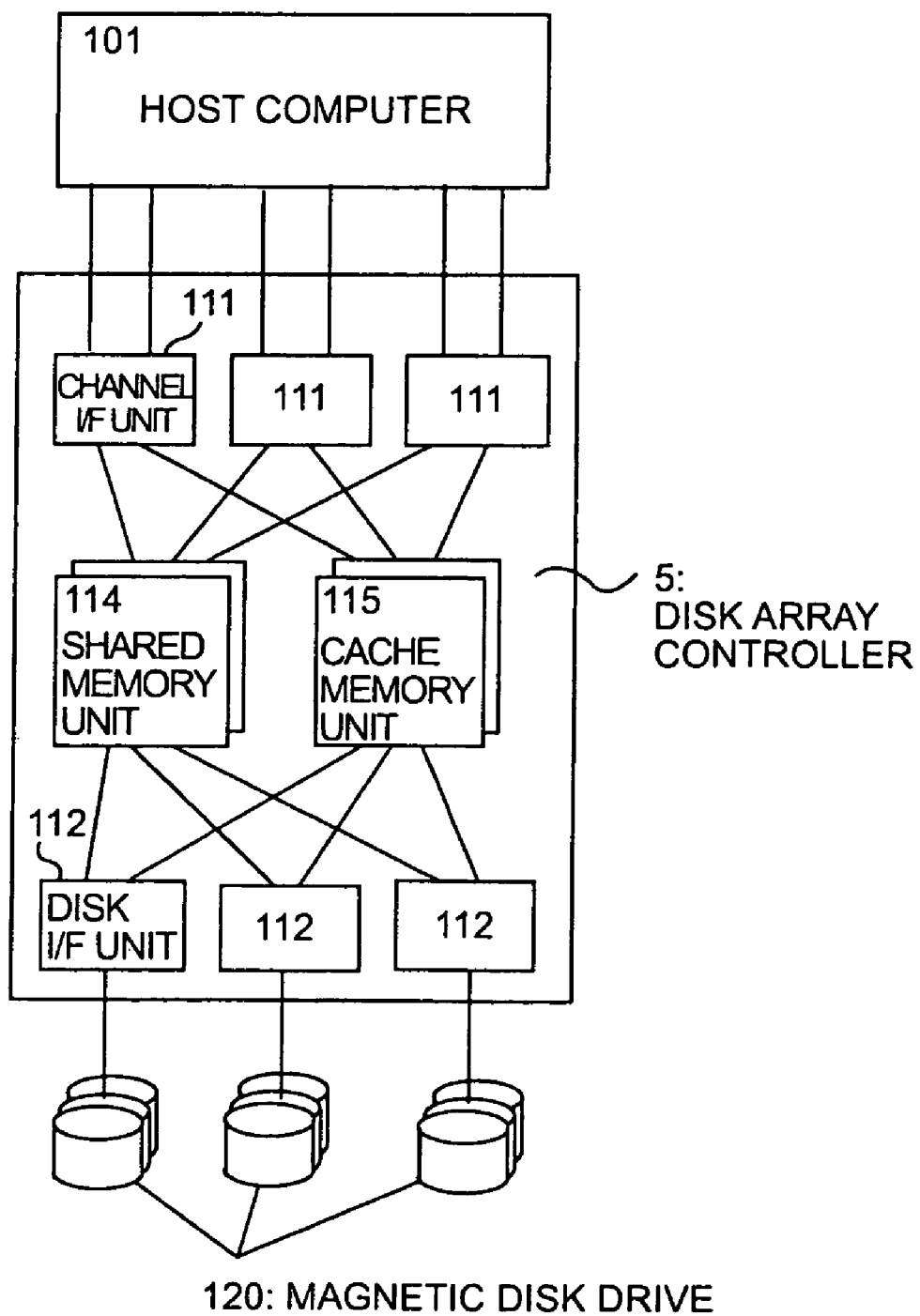
FIG. 2 shows a configuration of a conventional disk array controller.
Figure 3:
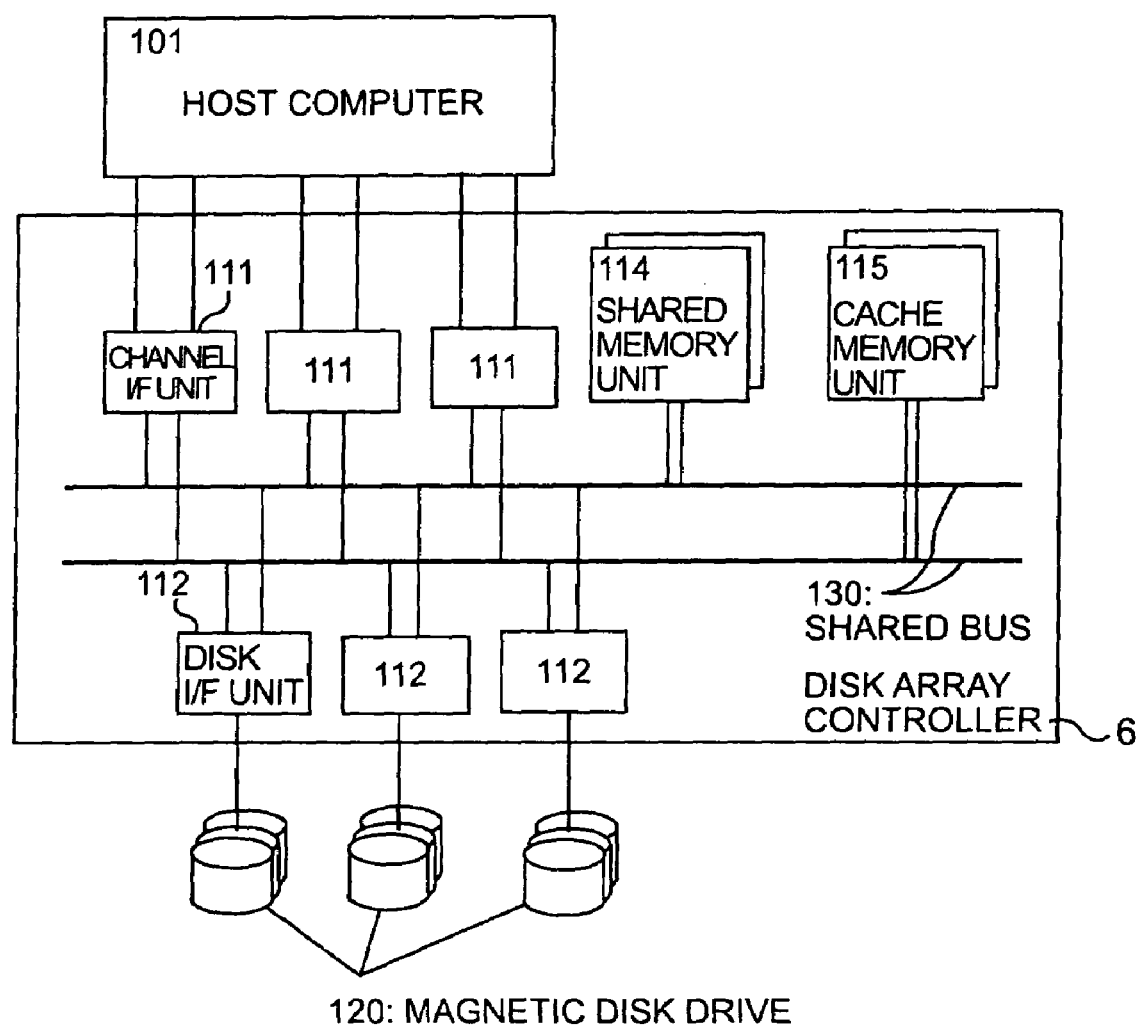
FIG. 3 shows a configuration of a conventional disk array controller.
Figure 4:
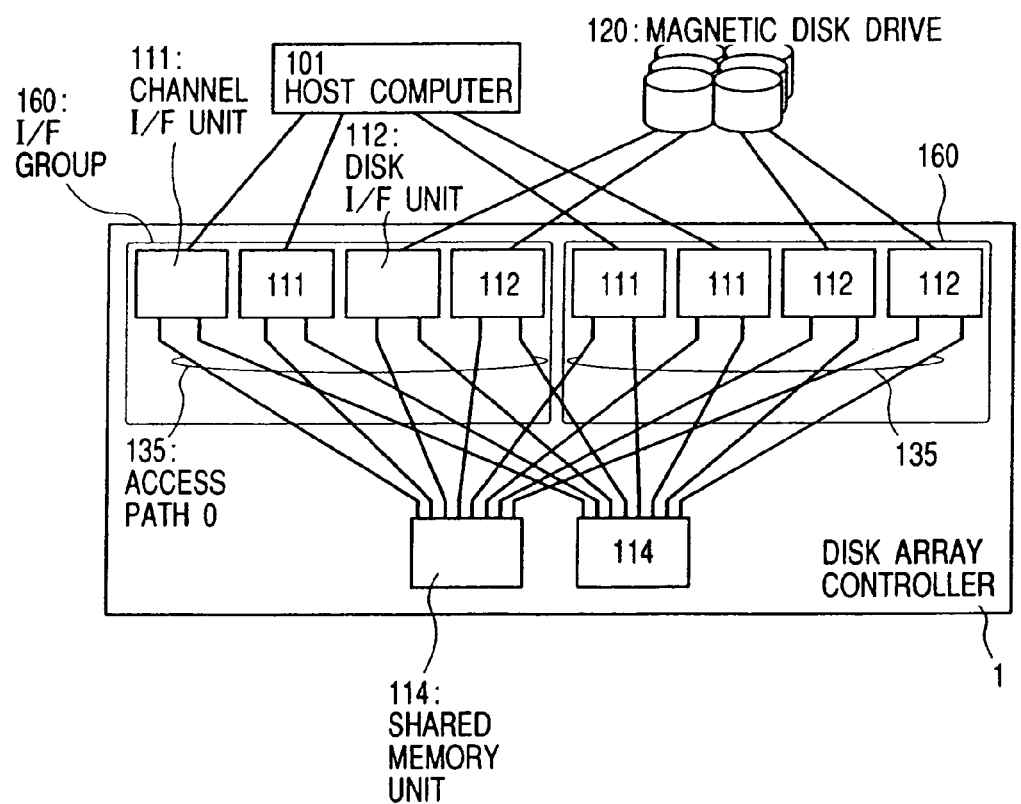
FIG. 4 shows a configuration of a disk array controller according to this invention.

FIGS. 1 and 4 show one embodiment of the invention.

FIG. 4 shows the configuration of a disk array controller according to the invention. The disk array controller 1 has channel interface units 111, disk interface units 112, shared memory units 114 and access paths 0 (135).

The channel interface units 111 each have at least one interface with the host computer, at least one microprocessor, at least one (two, in this embodiment) access circuit to the shared memory units 114, and at least one (two, in this embodiment) access path interfaces to the shared memory units 114 (these are not shown here) to enable data transmission between the host computer 101 and the shared memory units 114.

The disk interface units 112 each have at least one interface with plural magnetic disk drives 120, at least one microprocessor, at least one (two, in this embodiment) access circuit to the shared memory units 114, and at least one (two, in this embodiment) access path interface with the shared memory units 114 (these are not shown here) to enable data transmission between the plural magnetic disk drives 120 and the shared memory units 114.

The shared memory units 114 each have a memory for storing data to be recorded in the magnetic disk drives 120, control data for that data and control data for the disk array controller 1, and at least one (eight, in this embodiment) access path interfaces (these are not shown here) to the interface units.

In this embodiment, two channel interface units 111 and two disk interface units 112 constitute one group, which is called an I/F group 160. In this embodiment, the disk array controller 1 has two I/F groups.

Here, the number of I/F groups 160 is not limited as above. The number of I/F groups depends on the number of access paths to the shared memory units, management unit for maintenance (the number of channel and disk interface units subjected to each maintenance service), and other factors. One possibility is that the minimum disk array controller configuration corresponds to one I/F group.

FIG. 1 illustrates the configuration of the disk array controller 1 in the rack-mounted form. The channel interface units 111, disk interface units 112 and shared memory units 114 shown in FIG. 4 are separately packaged in channel interface packages (PK) 11, disk interface packages (PK) 12 and shared memory packages (PK), respectively. The channel interface packages 11 and disk interface packages 12 which constitute one I/F group 160, are mounted on one interface platter (P/L) 2, and the two shared memory packages 14 are mounted on a memory platter (P/L) 3 different from the interface platters 2. Each interface platter 2 and the memory platter 3 are connected by a cable 4. The cable 4 is a cable for access path 0 (135) which connects the channel interface units 111 or disk interface units 112 with the shared memory units 114.

The channel interface packages 11, disk interface packages 12, and shared memory packages 14 may be all mounted on different platters.

As described above, when a certain number of interface packages are mounted on one interface platter, in case of a fault in a platter, it is only necessary to stop the parts for which the packages mounted on that platter are responsible, instead of stopping the entire system. Also, since the cable 4 is used for the access paths 0 (135), the number of access paths 0 (135) can be easily increased or decreased as the number of interface platters 2 bearing interface packages increases or decreases, so that scalability of access path 0 performance can be assured. Therefore, the performance and capacity can be flexibly varied depending on the scale of the system, without any deterioration in cost performance. This also implies that a disk array controller product can be supplied at a reasonable price which suits the scale of the system.

Embodiment 2

Figure 31:
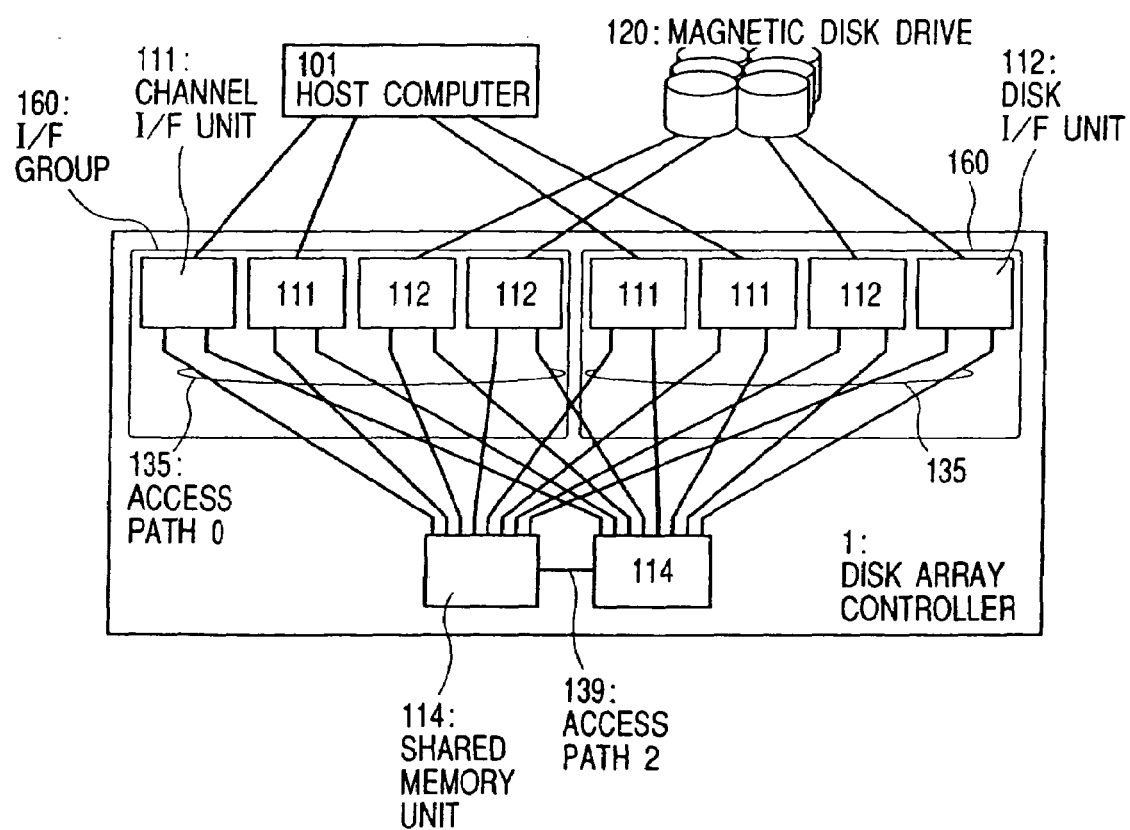
FIG. 31 shows another configuration of a disk array controller according to this invention.
Figure 32:
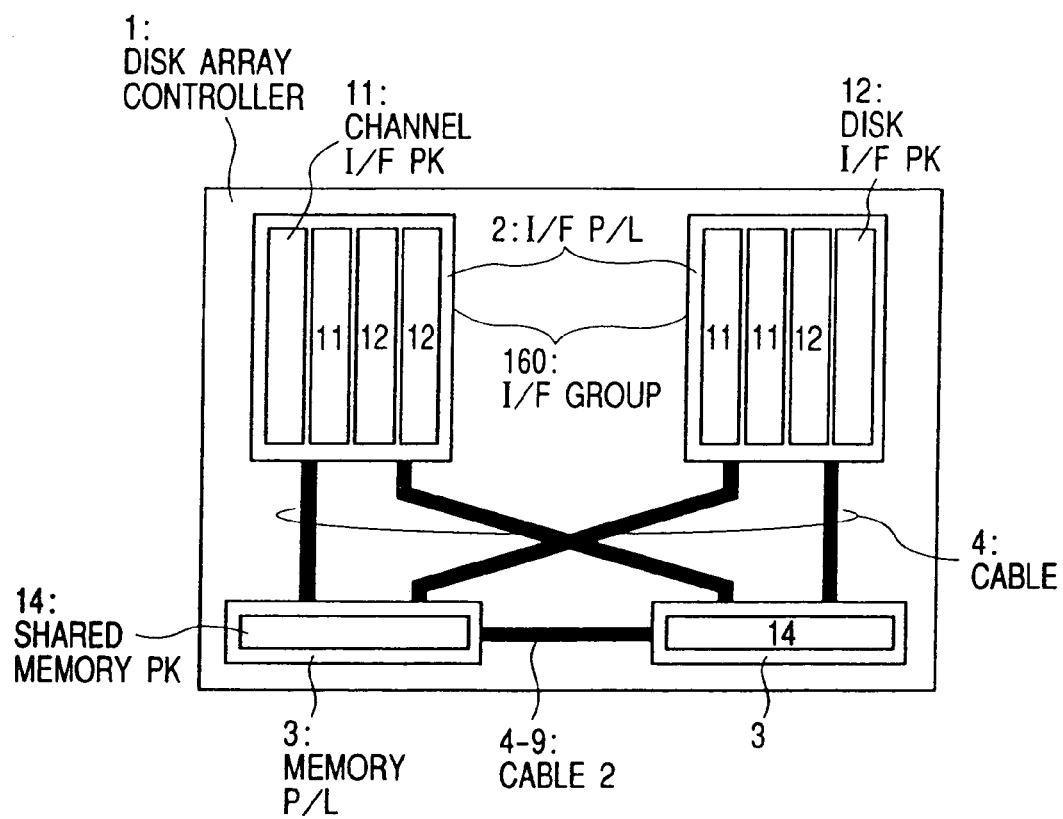
FIG. 32 shows another configuration in the rack-mounted form of a disk array controller according to this invention.

FIGS. 31 and 32 show another embodiment of this invention. Its difference from embodiment 1 is that the two shared memory units 114 in FIG. 4 are interconnected via access path 2 (139) to make a dual system, as shown in FIG. 31.

FIG. 32 illustrates the configuration of the disk array controller 1 in FIG. 31 in the rack-mounted form. Two shared memory units 114 are separately packaged in two shared memory packages (PK) 14, which are mounted on different memory platters 3. The memory platters 3 are interconnected by cable 2 (4-9) and one interface platter 2 and each of the two memory platters 3 are connected by cable 4. The cable 2 is a cable for access path 2 (139) as shown in FIG. 31.

This configuration not only produces the same effects as those of embodiment 1 but also a further effect: Thanks to the dual system of shared memory units 114, even if one shared memory package 14 or memory platter 3 fails, the system can be operated using the shared memory package 14 mounted on the other memory platter 3. Therefore, it is possible to replace the defective shared memory package 14 or memory platter 3, without stopping the system.

In this embodiment, the shared memory units 114 are interconnected via access path 2 (139) to make a dual system; however, instead, the same dual system effect can be obtained by writing the same data in both the two shared memory units 114 from the channel interface units 111 or disk interface units 112. In this case, it is unnecessary to interconnect the shared memory units 114 via access path 2 (139). However, if they are interconnected via access path 2 (139), the data in the two shared memory units 114 can be directly cross-checked for confirmation or a similar purpose, resulting in improved reliability.

Embodiment 3

Figure 45:
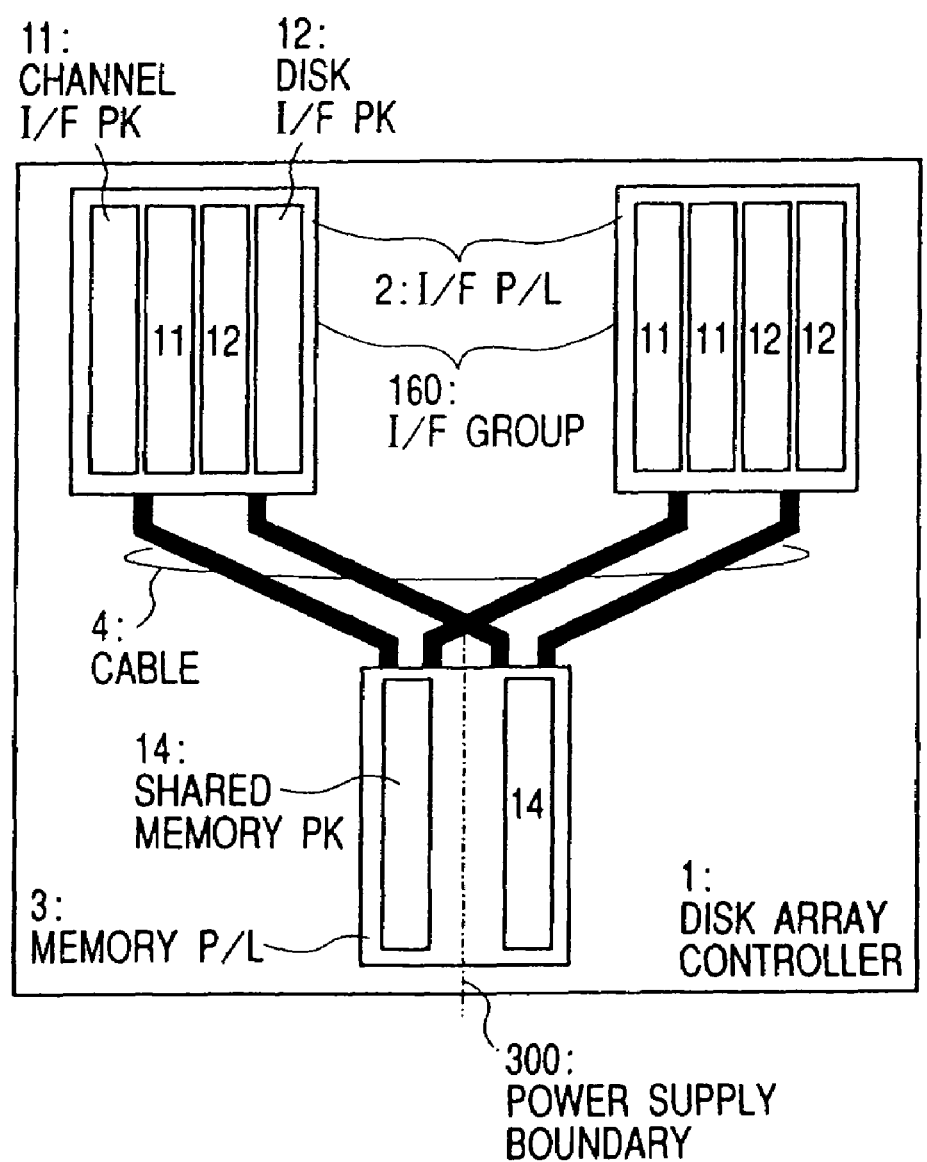
FIG. 45 shows another configuration in the rack-mounted form of a disk array controller according to this invention.

FIG. 45 shows another embodiment of the invention. Like embodiment 2, this embodiment uses two shared memory units 114 which make up a dual system. Two shared memory units 114 are separately packaged in shared memory packages 14, which are mounted on one memory platter 3. This memory platter 3 is divided into two areas by a power supply boundary 300. Power is separately supplied from independent power supplies to the two areas. Each of the areas bears one shared memory package 14. One interface platter 2 and the two areas of the memory platter 3 are connected by cables 4.

This configuration not only produces the same effects as those of embodiment 1 but also a further effect: even if a fault occurs in the shared memory package 14 in one of the areas into which the memory platter 3 is divided by the power supply boundary 300, the system can be operated using the shared memory package 14 mounted on the other area. Therefore, it is possible to replace the defective shared memory package 14, without stopping the system.

Embodiment 4

Figure 17:
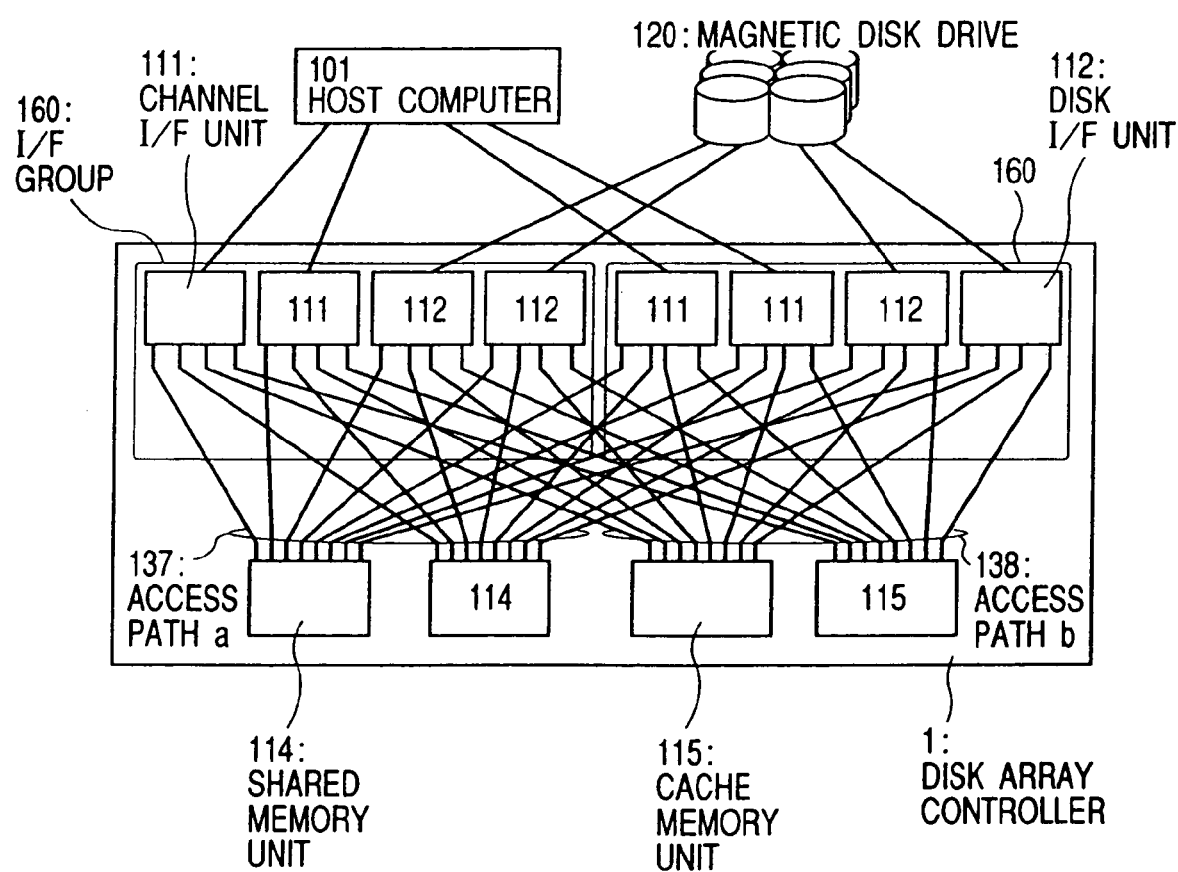
FIG. 17 shows another configuration of a disk array controller according to this invention.
Figure 18:
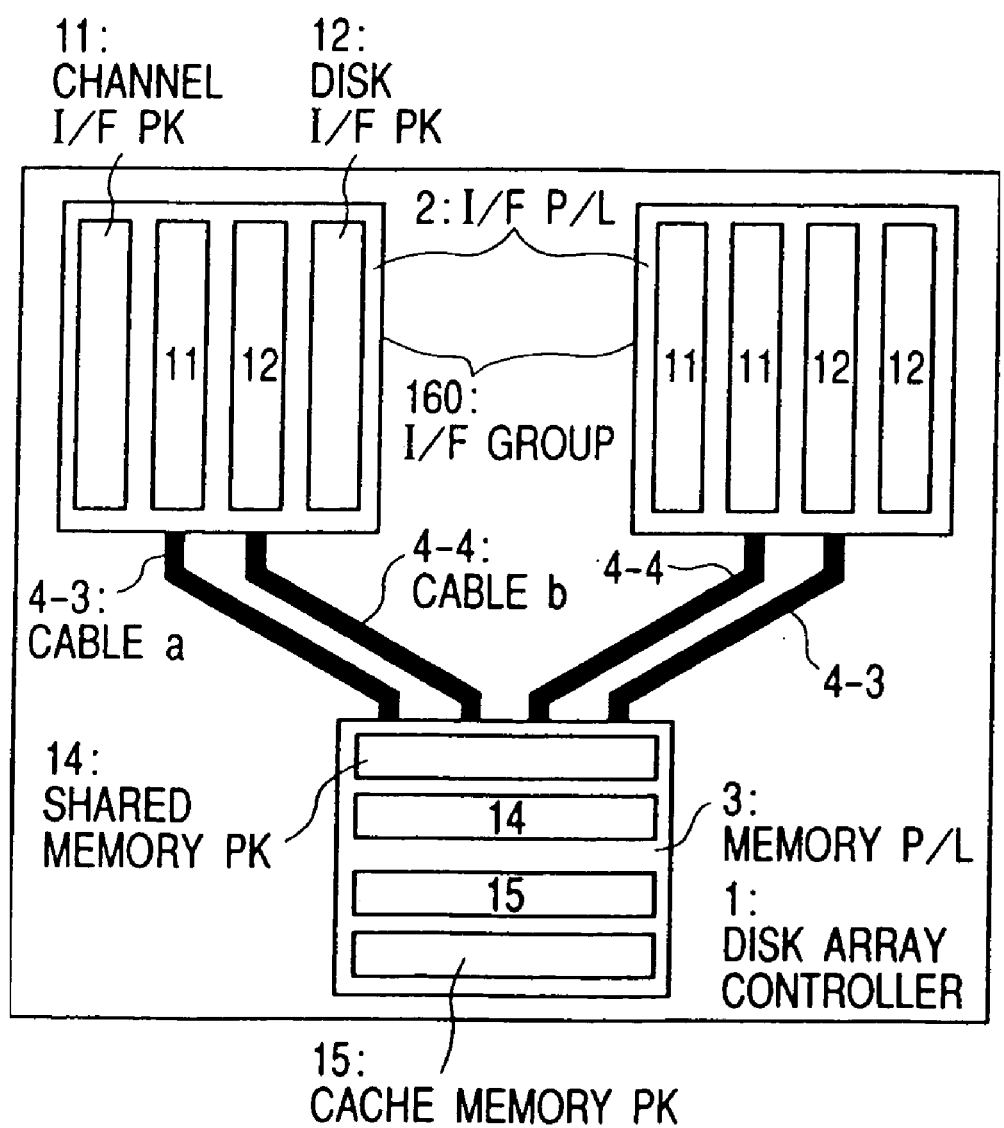
FIG. 18 shows another configuration in the rack-mounted form of a disk array controller according to this invention.

FIGS. 17 and 18 show another embodiment of the invention. Its difference from embodiment 1 is that as shown in FIG. 17, the cache memory units 115 for storing data to be recorded in magnetic disk drives 120, and the shared memory units 114 for storing control data for the cache memory units 115 and the disk array controller 1 are physically divided, and access paths a (137) to the shared memory units 114, and access paths b (138) to the cache memory units 115 are independent of each other.

FIG. 18 illustrates the configuration of the disk array controller 1 in FIG. 17 in the rack-mounted form. The cache memory units 115 and the shared memory units 114 are separately packaged in cache memory packages 15 and shared memory packages 14, respectively, which are mounted on the memory platter 3. In place of the cable 4 which connects each interface platter 2 and the memory platter 3 as shown in FIG. 1, cables a (4-3) for access paths a (137) to the shared memory units 114 and cables b (4—4) for access paths b (138) to the cache memory units 115 are used.

The shared memory packages 14 and the cache memory packages 15 may be mounted on different platters.

This configuration not only produces the same effects as those of embodiment 1 but also a further effect: Since access paths from the channel interface packages 11 and the disk interface packages 12 to the cache memory packages 15 or the shared memory packages 14 can be made physically independent, it is possible to distinguish between faults related to access to the cache memory units 115 (faults in the cache memory units 115 or paths or others for access to them) and faults related to access to the shared memory units 114 (faults in the shared memory units 114 or paths or others for access to them) so that defective parts can be independently repaired without affecting other parts.

Embodiment 5

Figure 53:
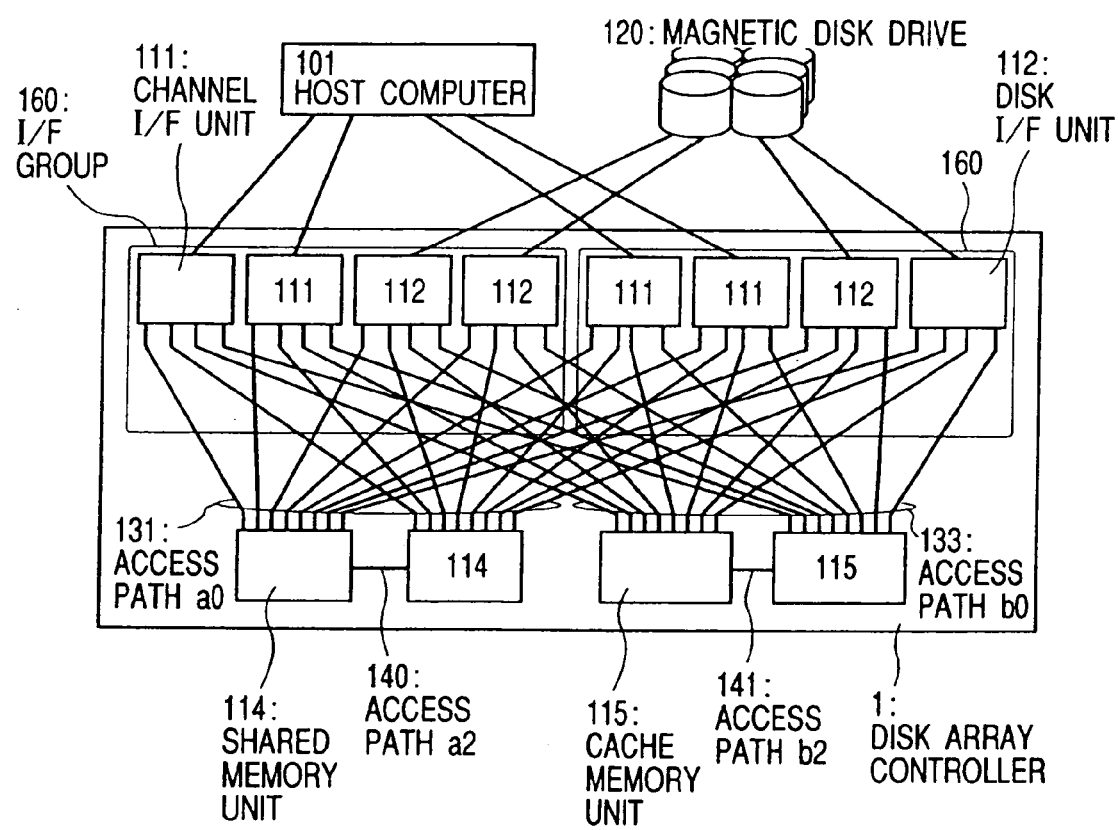
FIG. 53 shows another configuration of a disk array controller according to this invention.
Figure 54:
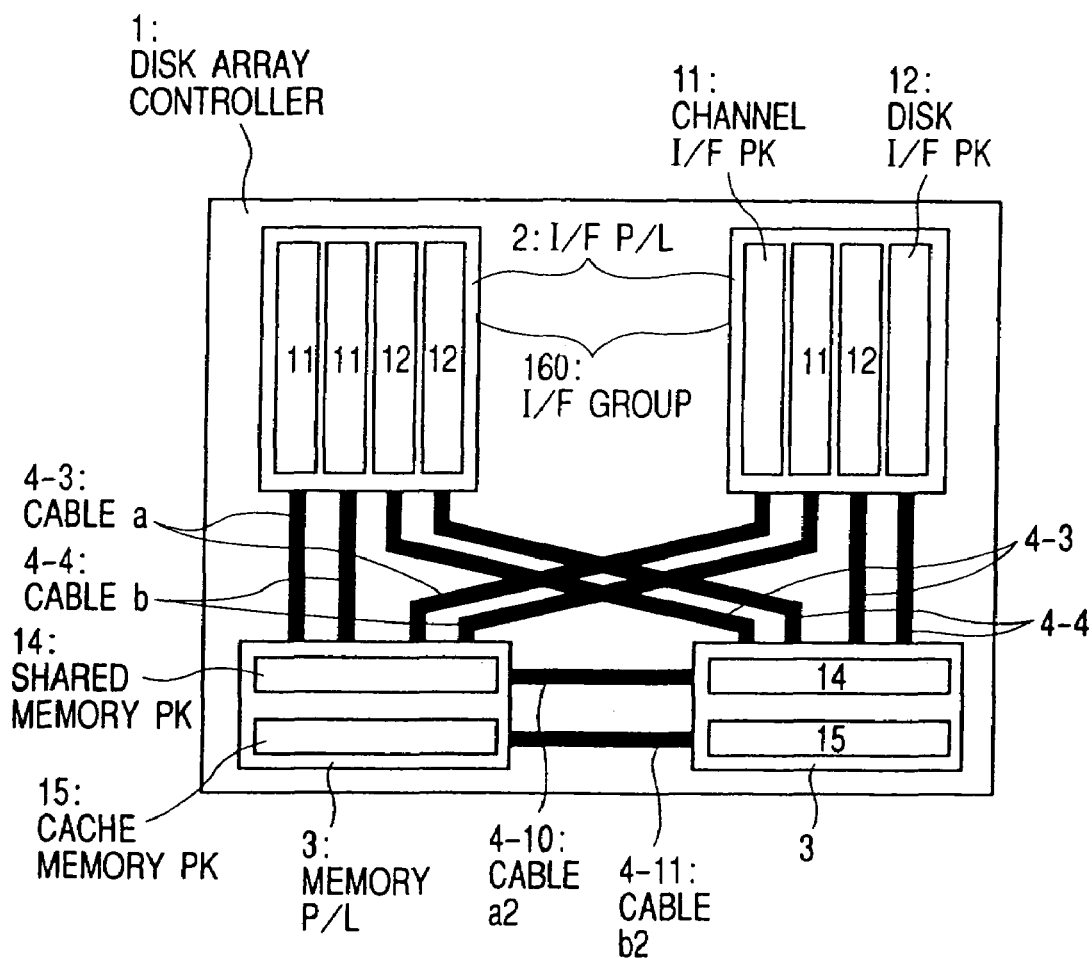
FIG. 54 shows another configuration in the rack-mounted form of a disk array controller according to this invention.

FIGS. 53 and 54 show another embodiment of this invention. Its difference from embodiment 4 is that two shared memory units 114 are interconnected via access path a2 (140) and two cache memory units 115 are interconnected via access path b2 (141) to make a dual system, as shown in FIG. 53.

FIG. 54 illustrates the configuration of the disk array controller 1 in FIG. 53 in the rack-mounted form. Two shared memory units 114 and two cache memory units 115 are separately packaged in shared memory packages 14 and cache memory packages 15, respectively, and one shared memory package and one cache memory package, which constitute one set, are mounted on one memory platter 3, with the two memory platters 3 being interconnected by cable a2 (4-10) and cable b2 (4-11). One interface platter 2 is connected to two memory platters 3 by cable a (4-3) and cable b (4—4). Cable a2 (4-10) and cable b2 (4-11) are cables for access path a2 (140) and access path b2 (141), respectively.

This configuration not only produces the same effects as those of embodiment 4 but also a further effect: Even if a fault occurs in one shared memory package 14, cache memory package 15 or memory platter 3, the system can be operated using the shared memory package 14 or cache memory package 15 mounted on the other memory platter 3. Therefore, it is possible to replace the defective shared memory package 14, cache memory package 15 or memory platter 3, without stopping the system.

In this embodiment, the shared memory units 114 are interconnected via access path a2 (140) and the cache memory units 115 are interconnected via access path b2 (141); however, instead, the same dual system effect can be obtained by writing the same data in both the two shared memory units 114 or both the two cache memory units 115 from the channel interface units 111 or the disk interface units 112. In this case, it is unnecessary to interconnect the shared memory units 114 or the cache memory units via access path a2 (140) or access path b2 (141). However, if they are interconnected via access path a2 (140) or access path b2 (141), the data in the two shared memory units 114 or the two cache memory units 115 can be directly cross-checked for confirmation or a similar purpose, resulting in improved reliability.

Embodiment 6

Figure 67:
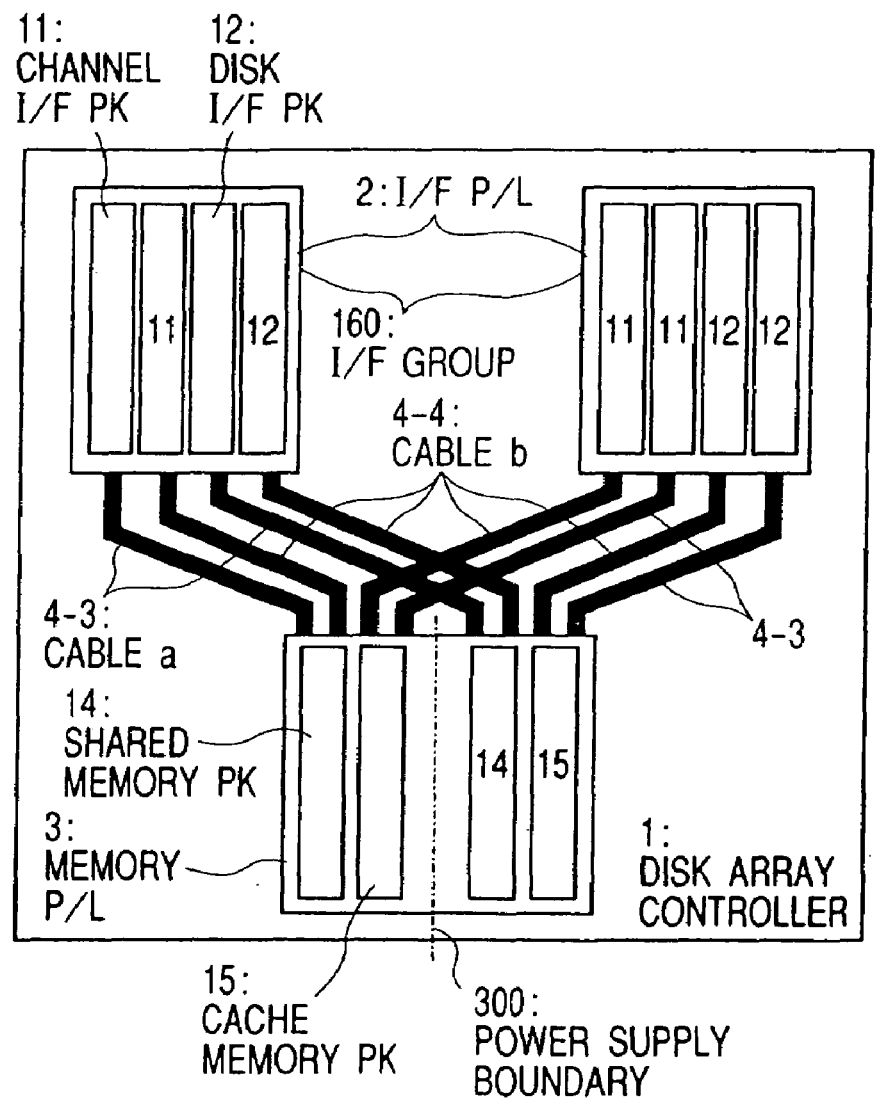
FIG. 67 shows another configuration in the rack-mounted form of a disk array controller according to this invention.

FIG. 67 shows another embodiment of the invention. As shown in FIG. 67, in this embodiment, two shared memory units 114 and two cache memory units 115 are packaged in shared memory packages 14 and cache memory packages 15, respectively, which are mounted on one memory platter 3 which is divided into two areas by a power supply boundary 300 as in embodiment 3. Each of the areas bears one shared memory package 14 and one cache memory package 15. One interface platter 2 is connected to one of the two areas of the memory platter 3 by cables a (4-3) and to the other by cables b (4—4). This embodiment thus provides a dual system which consists of two shared memory units 114 and two cache memory units 115.

This configuration not only produces the same effects as those of embodiment 4 but also a further effect: Even if a fault occurs in the shared memory package 14 or cache memory package 15 in one of the areas into which the memory platter 3 is divided by the power supply boundary 300, the system can be operated using the shared memory package 14 or cache memory package 15 in the other area of the memory platter 3. Therefore, it is possible to replace the shared memory package 14 or cache memory package 15 in the area where the fault has occurred, without stopping the system.

Embodiment 7

Figure 5:
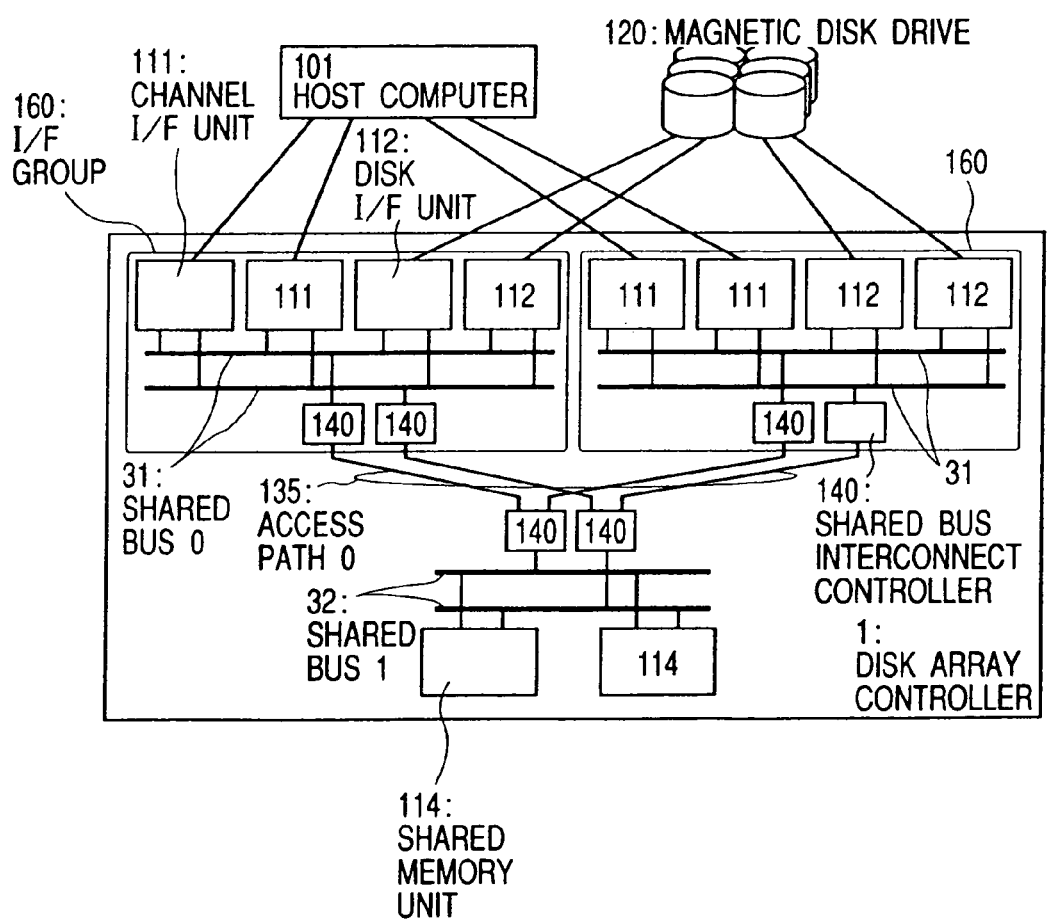
FIG. 5 shows another configuration of a disk array controller according to this invention.

FIG. 5 shows another embodiment of the invention. The disk array controller 1 shown in FIG. 5 has the following: channel interface units 111; disk interface units 112; two shared buses 0 (31) which connect them; shared memory units 114; two shared buses 1 (32) which interconnect the shared memory units; shared bus interconnect controllers 140 which connect the shared buses 0 (31) and shared buses 1 (32); and access paths 0 (135).

Each channel interface unit 111 has at least one interface with the host computer, at least one microprocessor, at least one (two, in this embodiment) access circuit to the shared memory unit 114, and at least one (two, in this embodiment) interface with the shared buses 0 (31) (these are not shown here) to enable data transmission between the host computer 101 and the shared memory units 114.

Each disk interface unit 112 has at least one interface with plural magnetic disk drives 120, at least one microprocessor, at least one (two, in this embodiment) access circuit to the shared memory units 114, and at least one (two, in this embodiment) interface with the shared buses 0 (31) (these are not shown here) to enable data transmission between the plural magnetic disk drives 120 and shared memory units 114.

Each shared memory unit 114 has a memory for storing data to be recorded in the magnetic disk drives 120, control data for that data and control data for the disk array controller, and at least one (two, in this embodiment) interface with shared buses 1 (32) (these are not shown here).

One shared bus is connected with one shared bus interconnect controller 140. The shared bus interconnect controllers 140 connected with the shared buses 1 (32) each have two access paths 0 (135) from two shared bus interconnect controllers 140 which belong to different I/F groups 160.

For access from the channel interface units 111 or disk interface units 112 to the shared memory units 114, the SM access circuit (not shown here) inside each channel interface unit 111 or disk interface unit 112 first obtains the right to use the shared buses 0 (31) and then accesses the shared bus interconnect controller 140 connected with the shared buses 0 (31), and issues a request for access to the shared buses 1 (32). The shared bus interconnect controller 140 sends the access request to the shared bus interconnect controller 140 connected with the shared buses 1 (32). If the shared bus interconnect controller 140 connected with the shared buses 1 (32) receives access requests from two different shared bus interconnect controllers 140 connected with it, it selects one of them by arbitration and obtains the right to use the shared buses 1 (32). After obtainment of the right, the shared bus interconnect controller connected with the shared buses 1 (32) sends the access request to the shared memory units.

In this embodiment, two channel interface units 111, two disk interface units 112 and two shared bus interconnect controllers 140 constitute one group, which is hereinafter called an I/F group 160. In this embodiment, the disk array controller 1 has two I/F groups.

Here, the number of I/F groups 160 is not limited as above. The number of I/F groups depends on the management unit for maintenance (the number of channel and disk interface units subjected to each maintenance service), and other factors. One possibility is that the minimum disk array controller configuration corresponds to one I/F group. Though this embodiment uses two shared buses 0 (31), it is possible to use only one. However, the use of two shared buses like this makes the access path to the shared memory units 114 redundant, which improves trouble resistance.

The configuration of the disk array controller 1 in FIG. 5 in the rack-mounted form is basically the same as the configuration of embodiment 1 shown in FIG. 1. The difference from embodiment 1 is that shared buses 0 (31) are wired on interface platters 2 and shared bus interconnect controllers 140 are directly mounted there, and that shared buses 1 (32) are wired on one memory platter and shared bus interconnect controllers 140 are directly mounted there.

The advantage of this configuration is as follows. The use of cables as access paths would be more costly than when access paths are directly mounted on a platter. Further, data transmission at high frequencies by several cables could cause noise unless the cable length is equalized with high accuracy. It is more advantageous in terms of scalability to use cables for all access paths between the channel interface packages 11, disk interface packages 12 and shared memory package 14 as in the disk array controller of embodiment 1. However, for the above-mentioned reason, the use of many cables may be disadvantageous in terms of cost and implementation efficiency. Therefore, in this embodiment the number of cables used is decreased in comparison with the disk array controller of embodiment 1 by wiring shared buses 0 (31) on interface platters 2 and directly mounting shared bus interconnect controllers 140 thereon, and wiring shared buses 1 (32) on one memory platter and directly mounting shared bus interconnect controllers 140 thereon. This realizes a disk array controller which has an advantage over the prior art in terms of scalability and over the disk array controller of embodiment 1 in terms of cost and implementation efficiency.

In addition, since this embodiment uses a dual system consisting of two shared buses 0 (31), two shared buses 1 (32) and shared bus interconnect controllers 140 connected with them, one channel interface unit 111 or disk interface unit 112 has two access routes to one shared memory unit 114. Therefore, in this embodiment, one cable 4 as shown in FIG. 1 is replaced by two cables, each of which is allocated to one of the two access paths 0 (135). Thanks to this dual system, if one of the two access paths 0 (135) fails, the other access path 0 (135) can be used, permitting the system to operate uninterruptedly. During operation of the system, the cable 4 for the defective access path 0 (135) can be replaced.

Embodiment 8

Figure 34:
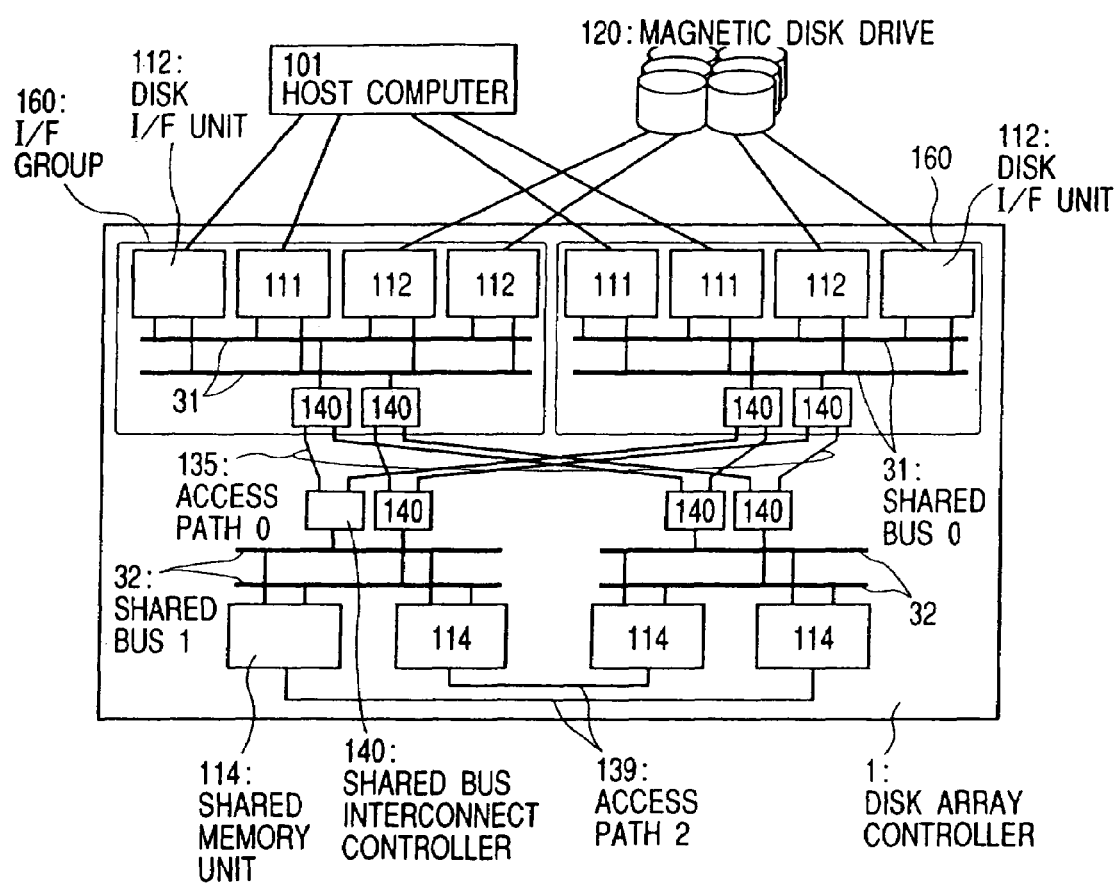
FIG. 34 shows another configuration of a disk array controller according to this invention.

FIG. 34 shows another embodiment of this invention. In the disk array controller 1 as shown in FIG. 34, two shared memory units 114 connected with two shared buses 1 (32) and two shared bus interconnect controllers 140 constitute one group. Two such groups make up shared memory. The two shared memory units in one group and those in the other group are connected via access paths 2 (139) to make a dual system. In short, this embodiment doubles the group of shared memory units 114 as shown in FIG. 5 for embodiment 7.

The configuration of the disk array controller 1 in FIG. 34 in the rack-mounted form is the same as the configuration shown in FIG. 32 for embodiment 2, except that the four shared memory units 114 are separately packaged in shared memory packages 14, which are mounted on two different memory platters 3 group by group. Therefore, in this embodiment, since one such group contains two shared memory units 114, one memory platter 3 bears two shared memory packages 14 (FIG. 32 shows only one shared memory package 14 on each platter). In this respect, this embodiment is different from embodiment 2. Another difference from embodiment 2 is that shared buses 1 (32) are wired on the memory platters 3 and two shared bus interconnect controllers are directly mounted thereon (these are not shown here).

The above-mentioned configuration produces the same effects as those of embodiments 2 and 7.

In this embodiment, the shared memory units 114 are interconnected via access paths 2 (139) to make a dual system; however, instead, the same dual system effect can be obtained by writing the same data in both the two shared memory units 114 from the channel interface units 111 or disk interface units 112. In this case, it is unnecessary to interconnect the shared memory units 114 via access paths 2 (139). However, if they are interconnected via access paths 2 (139), the data in the two shared memory units 114 can be directly cross-checked for confirmation or a similar purpose, resulting in improved reliability.

The above-said groups of shared memory units 114 may be mounted in the same way as shown in FIG. 45 for embodiment 3. In other words, each of the above groups of shared memory units 114 is mounted on each of the two areas of one memory platter 3 divided by a power supply boundary 300, to which power is supplied from separate power supplies.

Thanks to this configuration, even if a fault occurs in a shared memory package 14 in one of the areas into which the memory platter 3 is divided by the power supply boundary 300, the system can be operated using the shared memory packages 14 mounted on the other area, so the defective shared memory package 14 can be replaced without stopping the system.

Embodiment 9

Figure 20:
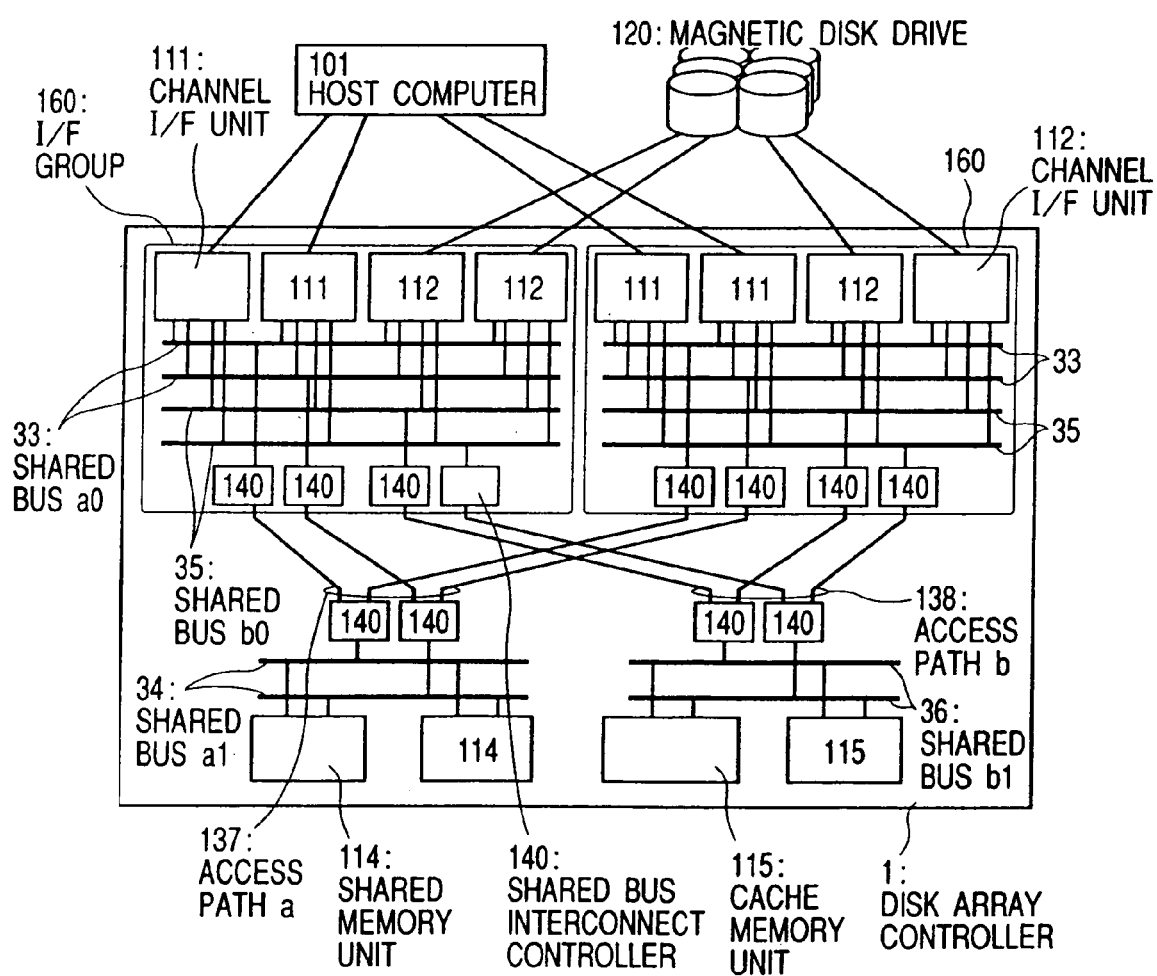
FIG. 20 shows another configuration of a disk array controller according to this invention.

FIG. 20 shows another embodiment of this invention. According to this embodiment, the cache memory units and shared memory units in the disk array controller shown in FIG. 5 for embodiment 7 are physically divided as described for embodiment 4. Also, in this embodiment, the shared buses 0 (31) in FIG. 5 are divided into shared buses b0 (35) for transmitting data from the magnetic disk drives 120 and shared buses a0 (33) for transmitting control data for the cache memory units 115 and disk array controller 1, and the channel interface units 111 and disk interface units 112 are connected to both the shared buses a0 (33) and shared buses b0 (35). Further, the shared buses 1 (32) in FIG. 5 are divided into shared buses b1 (36) for transmitting data from the magnetic disk drives 120 and shared buses a1 (34) for transmitting control data for the cache memory units 115 and disk array controller 1, and the cache memory units 115 and shared memory units 114 are connected to the shared buses b1 (36) and shared buses a1 (34), respectively. Connections are made between the shared buses a0 (33) and shared buses a1 (34), and between the shared buses b0 (35) and the shared buses b1 (36) through shared bus interconnect controllers 140, via access paths a (137) and access paths b (138), respectively.

The configuration of the disk array controller 1 in FIG. 20 in the rack-mounted form is the same as the one shown in FIG. 18 for embodiment 4, except that the two cache memory units 115 and two shared memory units 114 in FIG. 20 are separately packaged in two separate cache memory packages 15 and two shared memory packages 14, respectively, which are mounted on a memory platter 3. On the memory platter 3, the shared buses a1 (34) and shared buses b1 (36) are wired and the shared bus interconnect controllers 140 are directly mounted thereon (all these are not shown here). On each interface platter 2, the shared buses a0 (33) and shared buses b0 (35) are wired and the shared bus interconnect controllers 140 are directly mounted thereon (all these are not shown here). The cable which connects each interface platter 2 and memory platter 3 is divided into a cable a (4-3) for access path a (137) to the shared memory units 114 shown in FIG. 20 and a cable b (4—4) for access path b (138) to the cache memory units 115 in FIG. 20.

This configuration not only produces the same effects as those of embodiment 7 but also a further effect: Since the access paths from the channel interface packages 11 and disk interface packages 12 to the cache memory packages 15 or shared memory packages 14 are physically independent, it is possible to distinguish between faults related to access to the cache memory units 115 (faults in the cache memory units 115 or the shared buses b0 (35), shared buses b1 (36), shared bus interconnect controllers 140, access paths b (138) or others for access to them) and faults related to access to the shared memory units 114 (faults in the shared memory units 114 or the shared buses a0 (33), shared buses a1 (34), shared bus interconnect controllers 140, access paths a (137) or others for access to them) so that defective parts can be independently repaired without affecting other parts.

Embodiment 10

Figure 56:
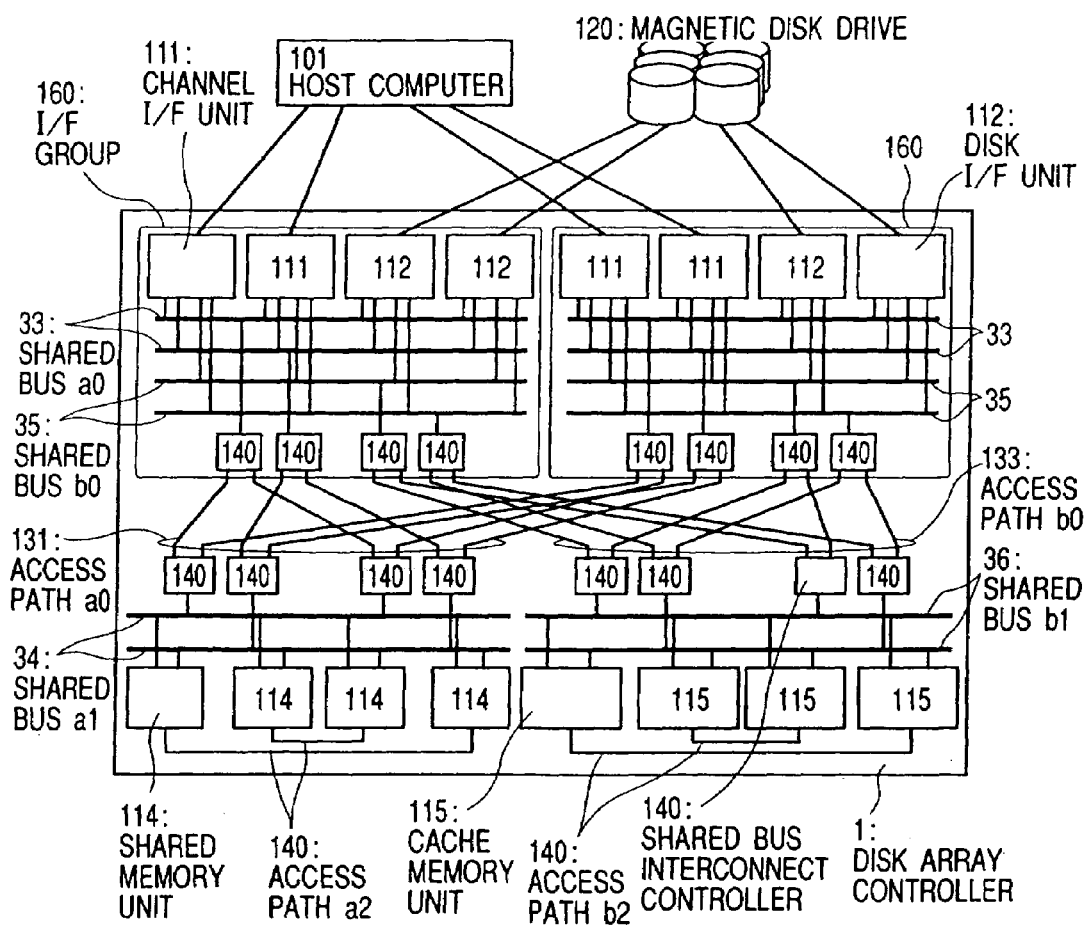
FIG. 56 shows another configuration of a disk array controller according to this invention.

FIG. 56 shows another embodiment of this invention. As shown in FIG. 56, two shared memory units 114 connected with two shared buses a1 (34), and two shared bus interconnect controllers 140, constitute one group; two such groups make up shared memory. The two shared memory units 114 in one such group and those in the other group are connected via access paths a2 (140) to make a dual system. Two cache memory units 115 connected with two shared buses b1 (36), and two shared bus interconnect controllers 140, constitute one group; two such groups make up cache memory. The two cache memory units 115 in one such group and those in the other group are connected via access paths b2 (140) to make a dual system.

In short, this embodiment doubles the group of shared memory units 114 and the group of cache memory units 115 as shown in FIG. 20 for embodiment 9.

The configuration of the disk array controller 1 in FIG. 56 in the rack-mounted form is the same as the one shown in FIG. 54 for embodiment 5, except that the four shared memory units 114 and four cache memory units 115 as shown in FIG. 56 are separately mounted in shared memory packages 14 and cache memory packages 15, respectively, and one shared memory group and one cache memory group are mounted on one memory platter 3. On each memory platter 3, shared buses a1 (34) and shared buses b1 (36) are wired and four shared bus interconnect controllers 140 are directly mounted. On each interface platter 2, shared buses a0 (33) and shared buses b0 (35) are wired and shared bus interconnect controllers 140 are directly mounted (all these are not shown here). Connection between the memory platters 3 is made by cables a2 (4-10) and b2 (4-11). One interface platter 2 is connected with the two memory platters 3 by cables a (4-3) and b (4—4). Cables a2 (4-10) are cables for access paths a2 (140) in FIG. 56 and cables b2 (4-11) are ones for access paths b2 (141).

This configuration produces the same effects as those of embodiments 5 and 9.

In this embodiment, the shared memory units 114 are interconnected via access paths a2 (140) and the cache memory units are interconnected via access paths b2 (141) to make a dual system; however, instead, the same dual system effect can be obtained by writing the same data in both the two shared memory units 114 or both the two cache memory units 115 from the channel interface units 111 or the disk interface units 112. In this case, it is unnecessary to interconnect the shared memory units 114 or cache memory units 115 via access paths a2 (140) or access paths b2 (141). However, if they are interconnected, the data in the two shared memory units 114 or two cache memory units can be directly cross-checked for confirmation or a similar purpose, resulting in improved reliability.

The groups of shared memory units 114 and the groups of cache memory units 115 may be mounted as shown in FIG. 67. Concretely, the shared memory units 114 and cache memory units 115 are separately packaged in shared memory packages 14 and cache memory packages 15, respectively. These are mounted on one of the two areas of one memory platter divided by a power supply boundary 300, where power is supplied to each area from a separate power supply. Here, the interface platters 2 are connected to the two areas of the memory platter 3 by cables a (4-3) and b (4—4). In this case, each area of the memory platter 3 bears two shared memory packages 14 and two cache memory packages 15 (though FIG. 67 shows only one package of each memory type in each area).

Thanks to this configuration, even if a fault occurs in a shared memory package 14 or cache memory package 15 in one of the areas into which the memory platter 3 is divided by the power supply boundary 300, the system can be operated using the shared memory packages 14 or the cache memory packages 15 mounted on the other area, so the defective shared memory package 14 or cache memory package 15 can be replaced without stopping the system.

Embodiment 11

Figure 6:
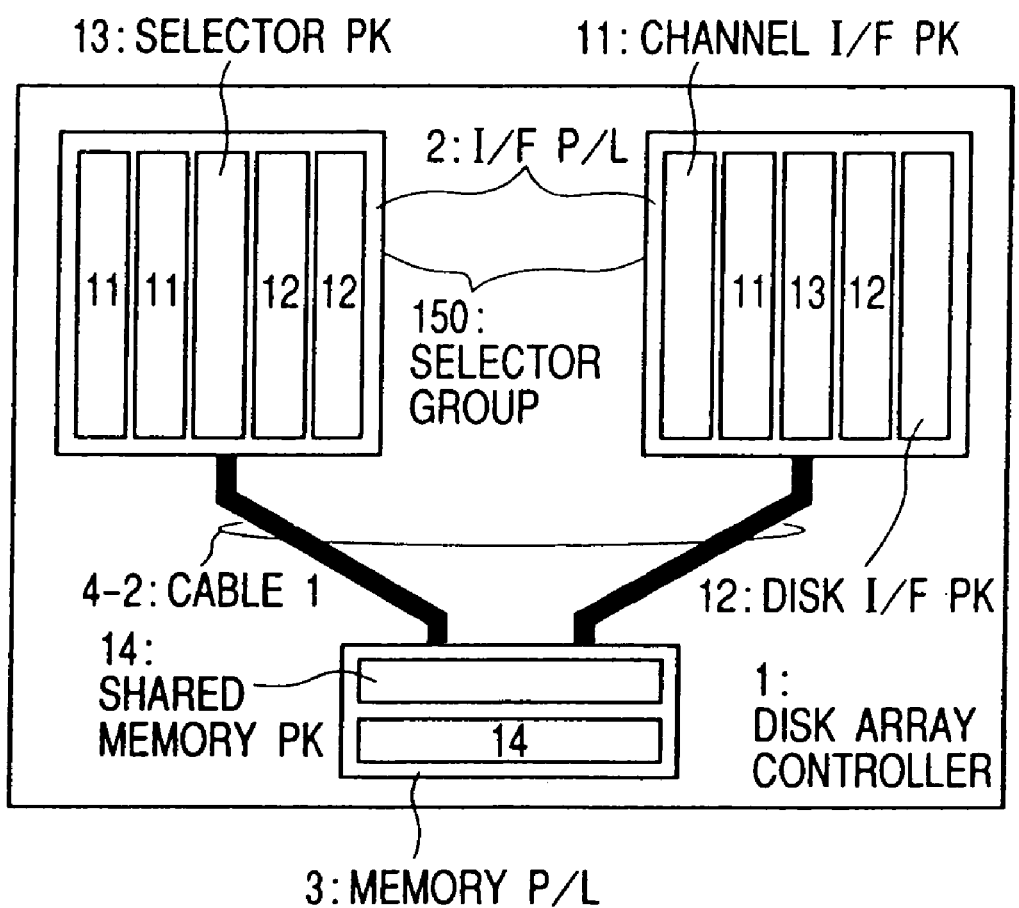
FIG. 6 shows another configuration in the rack-mounted form of a disk array controller according to this invention.
Figure 7:
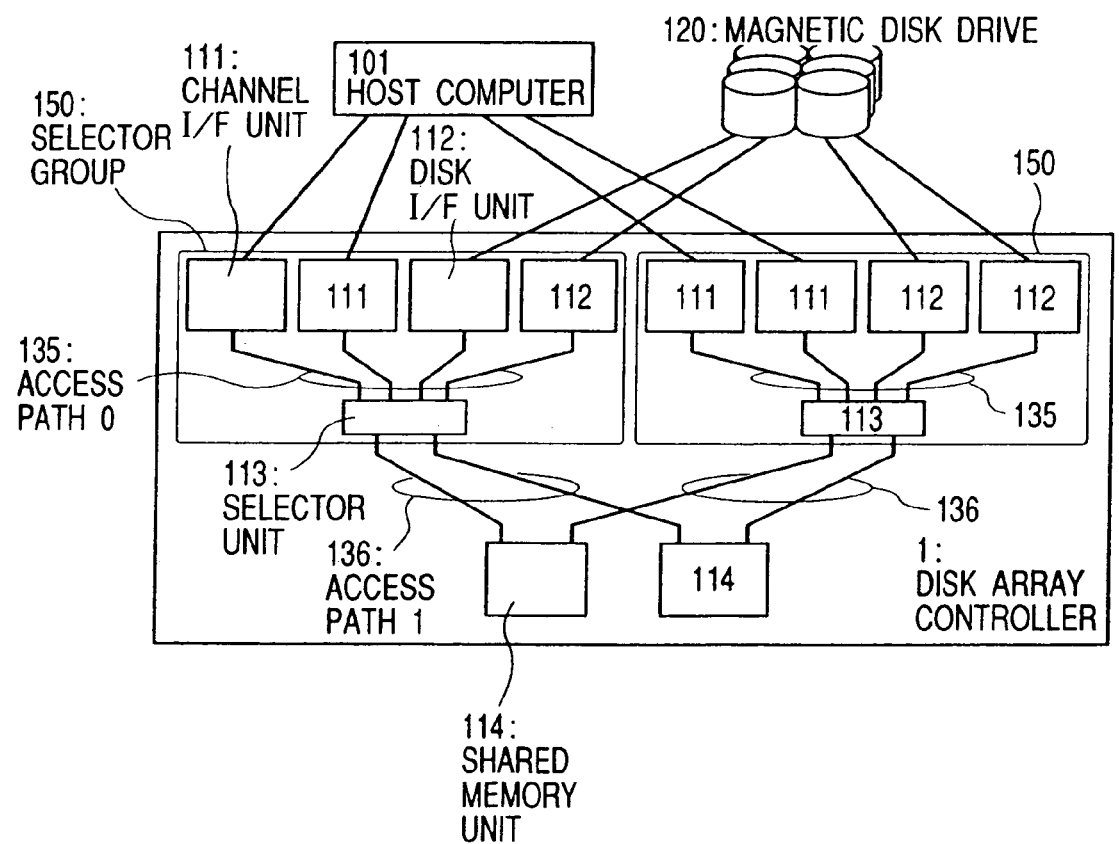
FIG. 7 shows another configuration of a disk array controller according to this invention.

FIGS. 6 and 7 show another embodiment of this invention.

FIG. 7 illustrates the configuration of a disk array controller according to this embodiment. The disk array controller 1 has channel interface units 111, disk interface units 112, selectors 113, shared memory units 114, access paths 0 (135) and access paths 1 (136).

The channel interface units 111, disk interface units 112, and shared memory units 114 have the same structures as those in embodiment 1.

Each selector unit 113 is connected with a total of four access paths 0 (135) from two channel interface units 111 and two disk interface units 112 on the basis of one path per unit. Also each selector unit 113 is connected with two access paths 1 (36), with each path being connected with one of the two shared memory units 114. One such selector unit 113 and two channel interface units 111 and two disk interface units 112 which are connected with it constitute one group, which is hereinafter called a selector group 150. In this embodiment, the disk array controller 1 has two selector groups 150 and two shared memory units 114. Due to the above-mentioned availability of access paths, each selector unit 113 selects two of the four requests transmitted via the four access paths 0 (135) from the channel interface units 111 and disk interface units 112, where the number of selected requests corresponds to the number of access paths 1 (136) to the shared memory units 114.

Here, the important thing is that the number of access paths 1 (136) from one selector unit 113 to the shared memory units 114 is smaller than the number of access paths 0 (135) from the channel interface units 111 and disk interface units 112 to one selector unit 113, and that the number of selector units 113 is smaller than the total number of channel interface units and disk interface units 112. This reduces the number of access paths to each shared memory unit 114, which means a decrease in the number of cables used, leading to cost reduction and higher implementation efficiency. In addition, the problem of LSI pin necks and package connector necks in the shared memory units can be resolved.

The number of channel interface units and disk interface units in a selector group 150 depends on the management unit for maintenance (the number of interface units subjected to each maintenance service), and other factors. One possibility is that the minimum disk array controller configuration corresponds to one selector group 150.

FIG. 6 illustrates the configuration of the disk array controller 1 in the rack-mounted form.

The channel interface units 111, disk interface units 112, selector units 113 and shared memory units 114 as shown in FIG. 7 are separately packaged in channel interface packages 11, disk interface packages 12, selector packages 13 and shared memory packages 14, respectively. One selector group 150 is mounted on one interface platter 2, and two shared memory packages 14 are mounted on a memory platter 3 different from the interface platters 2. The interface platters 2 and memory platter 3 are connected by cables 1 (4-2). The cables are cables for access paths 1 (136) as shown in FIG. 7.

Figure 8:
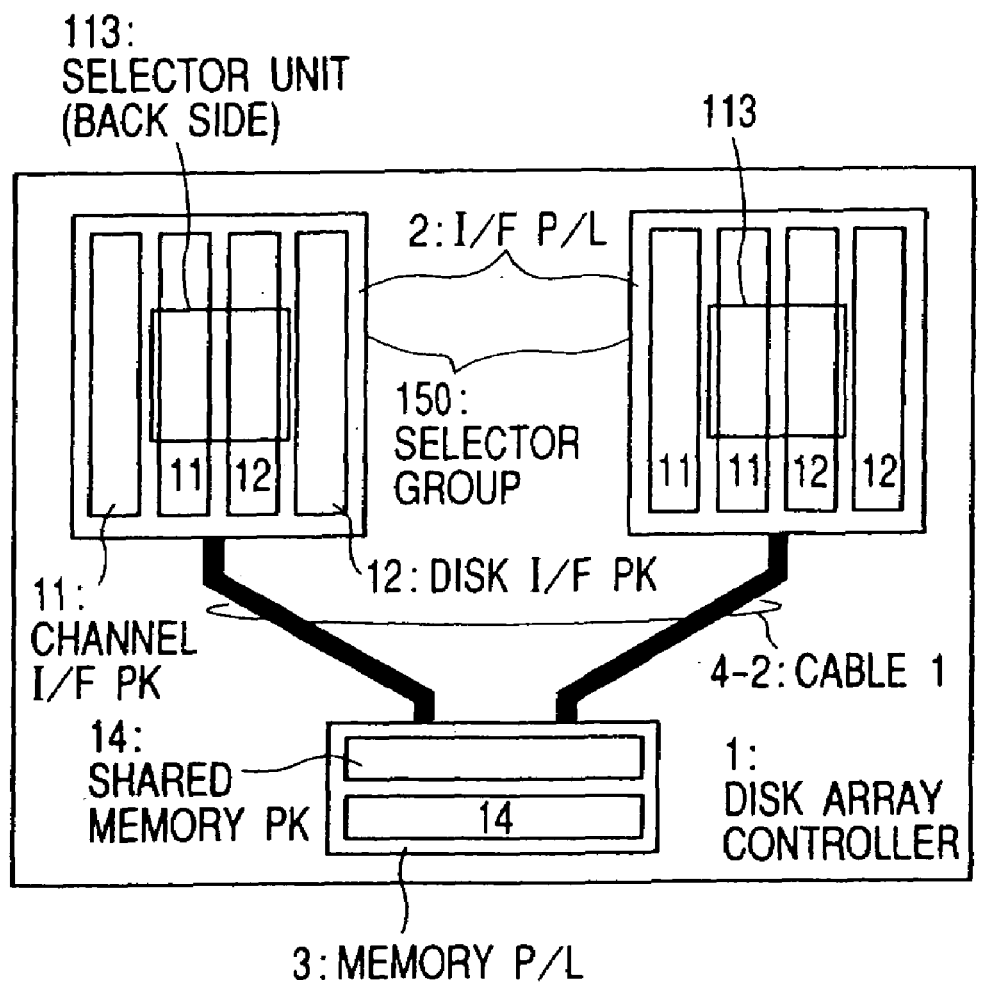
FIG. 8 shows another configuration in the rack-mounted form of a disk array controller according to this invention.

Although the selector units 113 are packaged in selector packages 13 in this example, as shown in FIG. 8 they may be mounted on the reverse of the package bearing surface of the interface platters 2 without packaging them in packages (the figure shows the backside). This causes no problem in implementing this embodiment and can reduce the required width of each interface platter by the amount equivalent to the width of the selector package 13, permitting the rack for the disk array controller 1 to be more compact.

This configuration not only produces the same effects as those of embodiment 1 but also a further effect: The use of selector units 113 reduces the number of access paths to the shared memory units 114, which means a decrease in the number of cables used, leading to cost reduction and higher implementation efficiency. In addition, the problem of LSI pin necks or package connector necks in shared memory units can be resolved.

Variations of this embodiment are introduced next.

Figure 37:
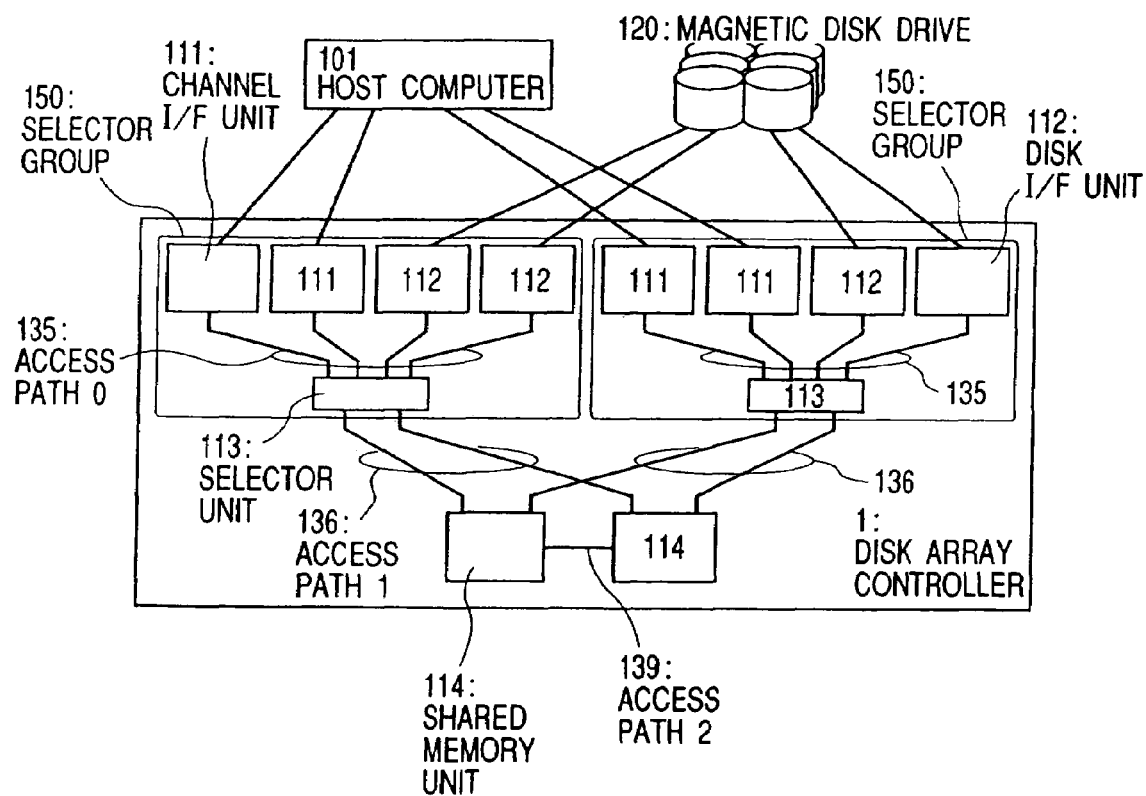
FIG. 37 shows another configuration of a disk array controller according to this invention.
Figure 38:
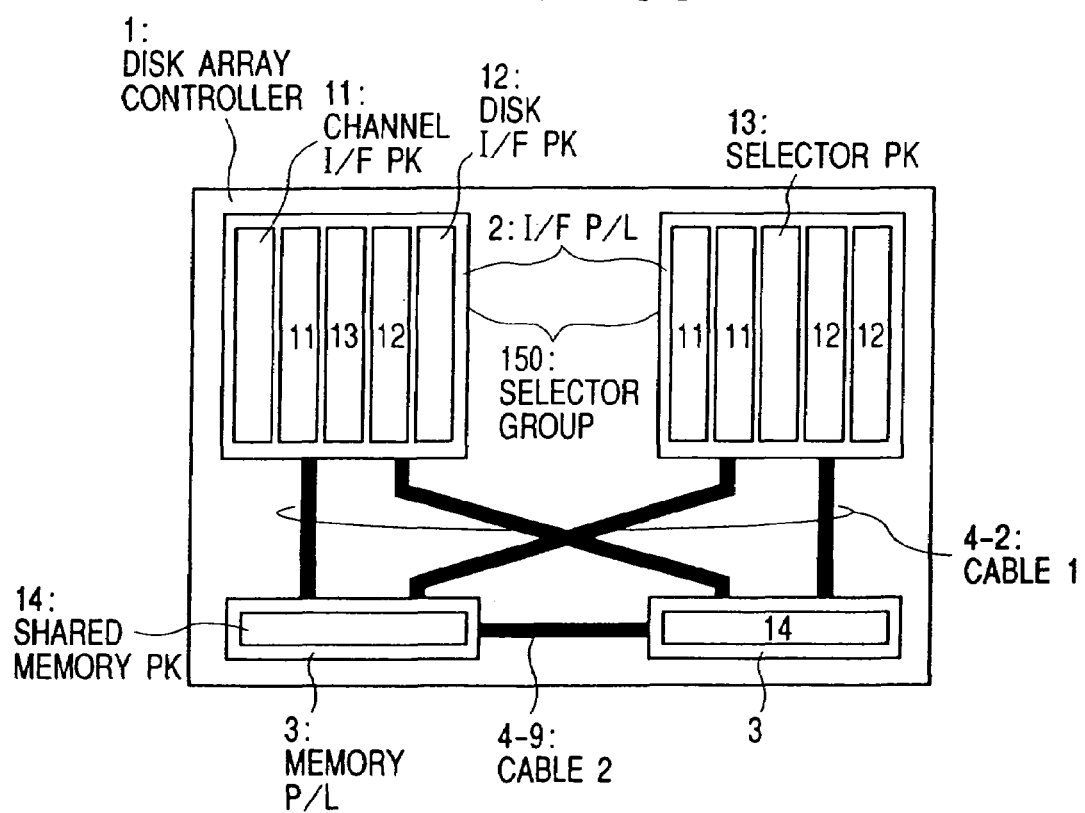
FIG. 38 shows another configuration in the rack-mounted form of a disk array controller according to this invention.

FIG. 37 shows a dual cache memory system consisting of two shared memory units 114 connected via access path 2 (139) as in embodiment 2. FIG. 38 shows the disk array controller 1 in FIG. 37 in the rack-mounted form. The two shared memory units 114 shown in FIG. 37 are separately packaged in shared memory packages 14 and the two shared memory packages 14 are mounted on different memory platters 3. The two memory platters 3 are interconnected by cable 2 (4-9), one interface platter 2 and the two memory platters 3 are connected by cable 1 (4-2). The cable 2 is a cable for the access path 2 (139) shown in FIG. 37.

This configuration produces the same effects as those of embodiment 2. In this embodiment, the shared memory units 114 are interconnected via the access path 2 (139) to make a dual system; however, instead, the same dual system effect can be obtained by writing the same data in both the two shared memory units 114 from the channel interface units 111, disk interface units 112 or selector units 113. In this case, it is unnecessary to interconnect the shared memory units 114 via the access path 2 (139). However, if they are interconnected via the access path 2 (139), the data in the two shared memory units 114 can be directly cross-checked for confirmation or a similar purpose, resulting in improved reliability.

Figure 40:
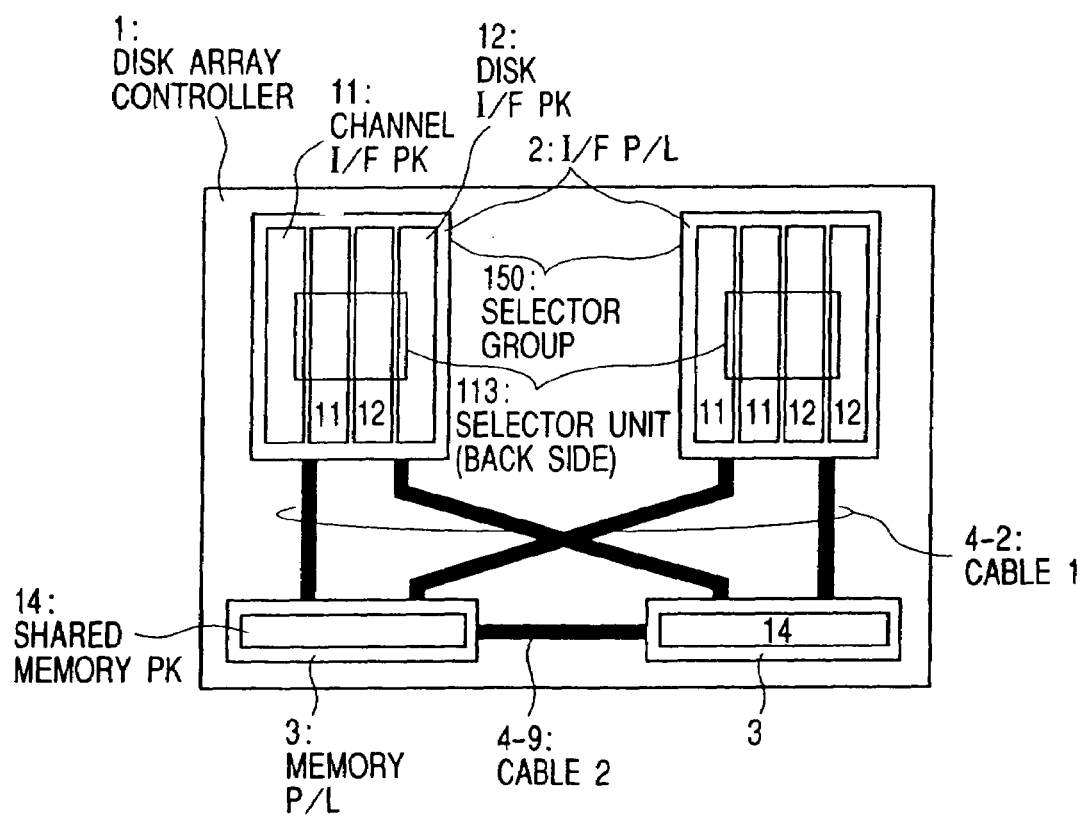
FIG. 40 shows another configuration in the rack-mounted form of a disk array controller according to this invention.
Figure 41:
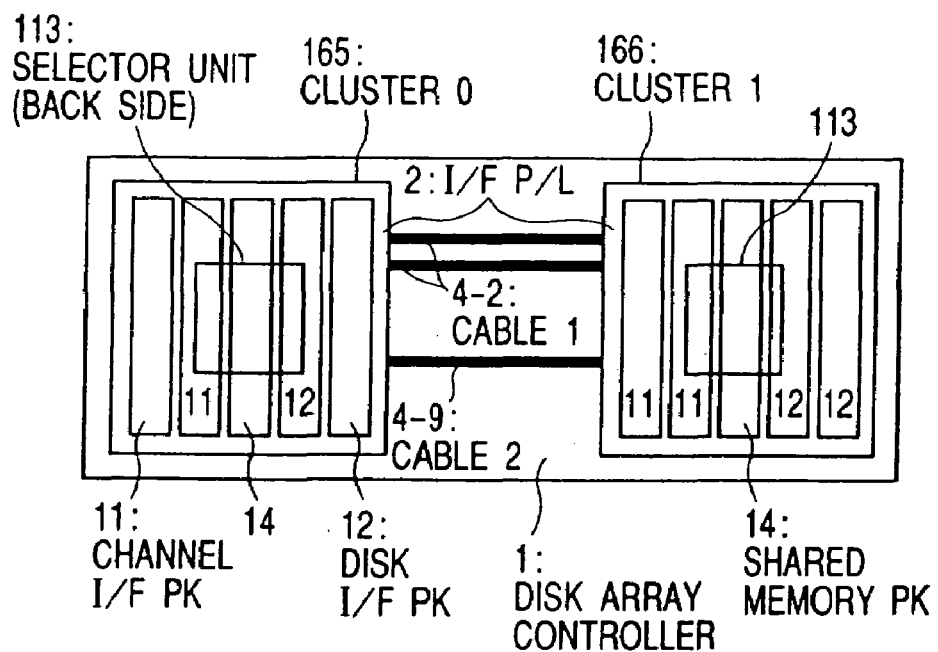
FIG. 41 shows another configuration in the rack-mounted form of a disk array controller according to this invention.

Again, in this case, as shown in FIG. 40, the selector units 113 may be mounted on the reverse of the package bearing surface of the interface platters 2 (the figure shows the backside).

Figure 47:
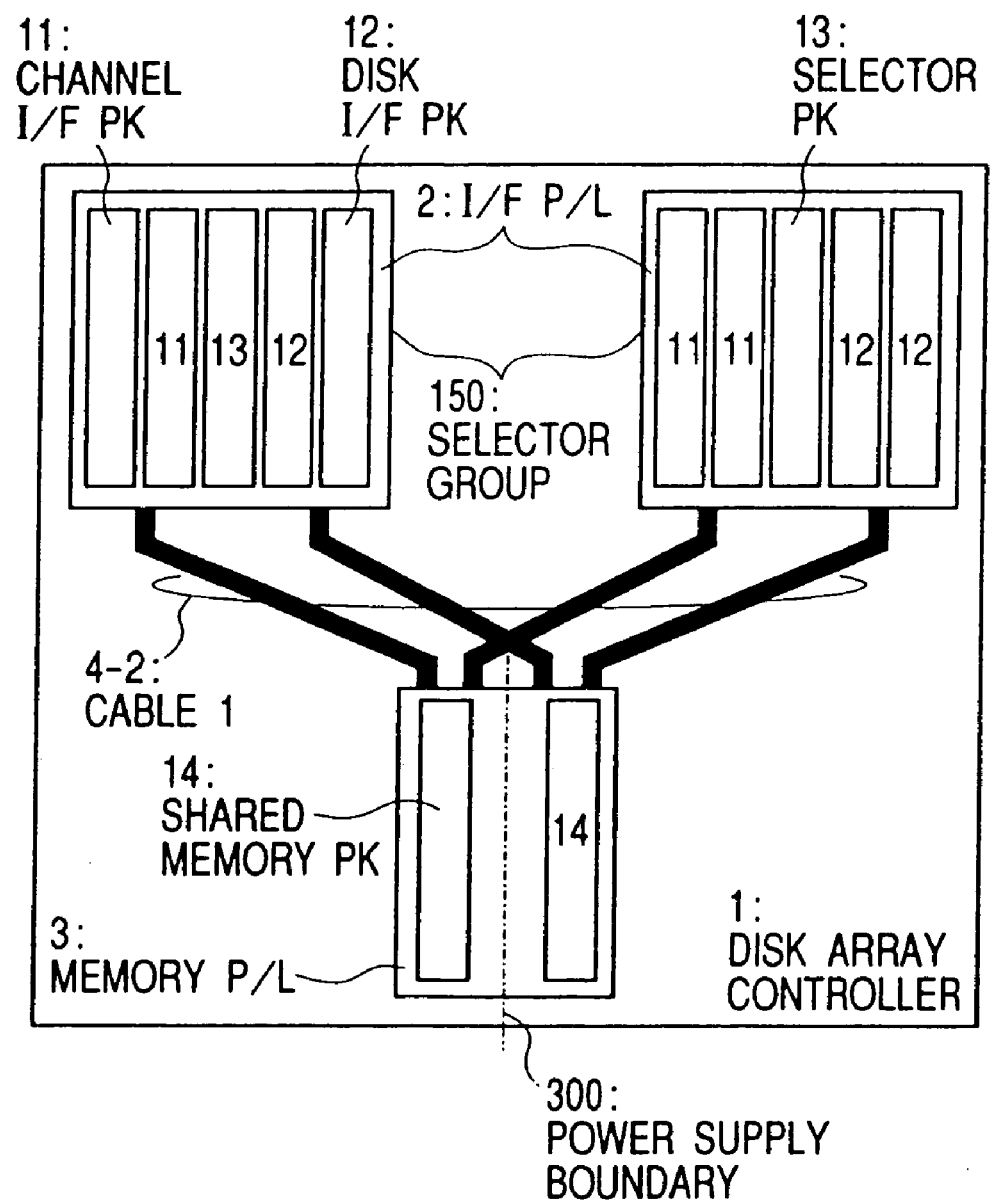
FIG. 47 shows another configuration in the rack-mounted form of a disk array controller according to this invention.

A dual shared memory system can be realized by arranging two shared memory units 114 as shown in FIG. 47. Concretely, two shared memory units 114 are separately packaged in shared memory package and the two packages are mounted on two areas of a memory platter 3 divided by a power supply boundary 300 as in embodiment 3.

This configuration produces the same effects as those of embodiment 3.

Figure 49:
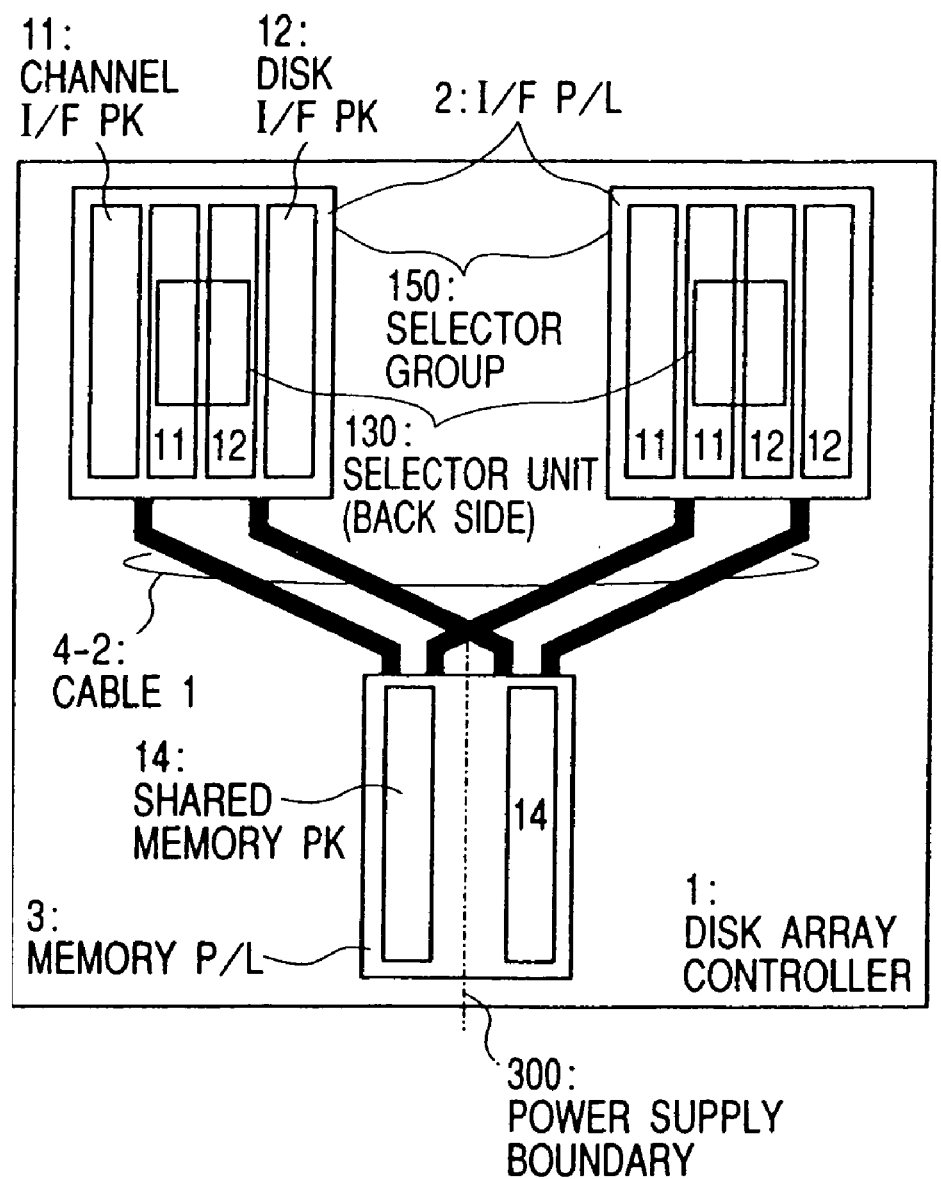
FIG. 49 shows another configuration in the rack-mounted form of a disk array controller according to this invention.
Figure 50:
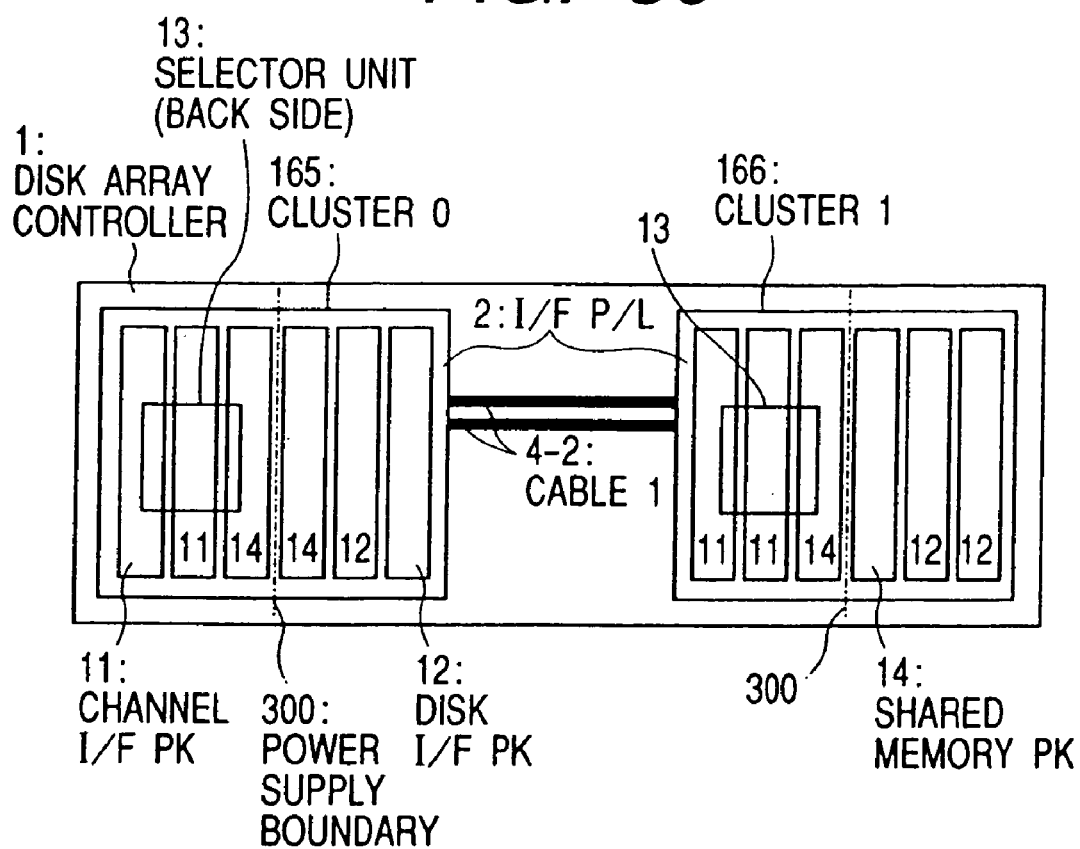
FIG. 50 shows another configuration in the rack-mounted form of a disk array controller according to this invention.

Again, in this case, as shown in FIG. 49, the selector units 113 may be mounted on the reverse of the package bearing surface of the interface platters 2 (the figure shows the backside of the platters).

Figure 23:
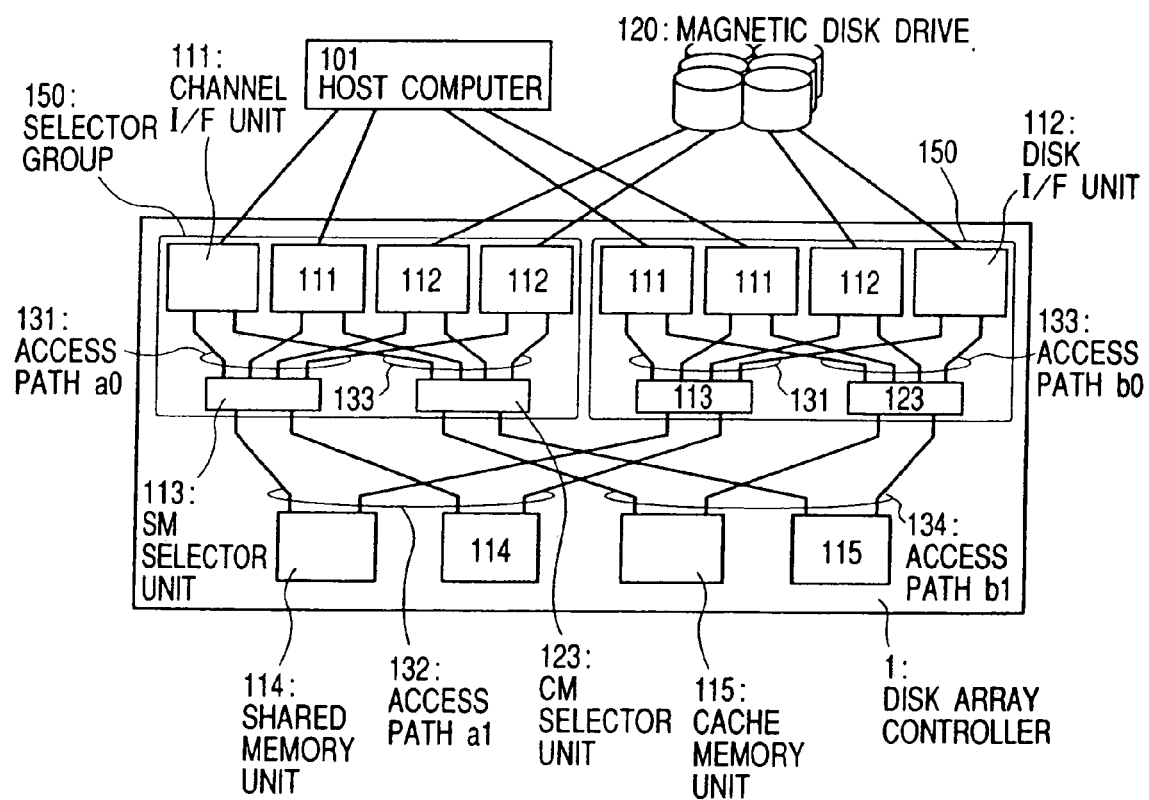
FIG. 23 shows another configuration of a disk array controller according to this invention.

FIG. 23 shows a variation of this embodiment in which cache memory units 115 for storing data to be recorded in magnetic disk drives 120, and shared memory units 114 storing control data for the cache memory units 115 and disk array controller 1 are physically divided, selectors (CM selector units 123) connected to the cache memory units 115 and selectors (SM selector units 113) connected to the shared memory units 114 are physically independent of each other and access paths a0 (131) and access paths a1 (132) to the shared memory units 114, and access paths b0 (133) and access paths b1 (134) to the cache memory units 115 are independent of each other.

Figure 24:
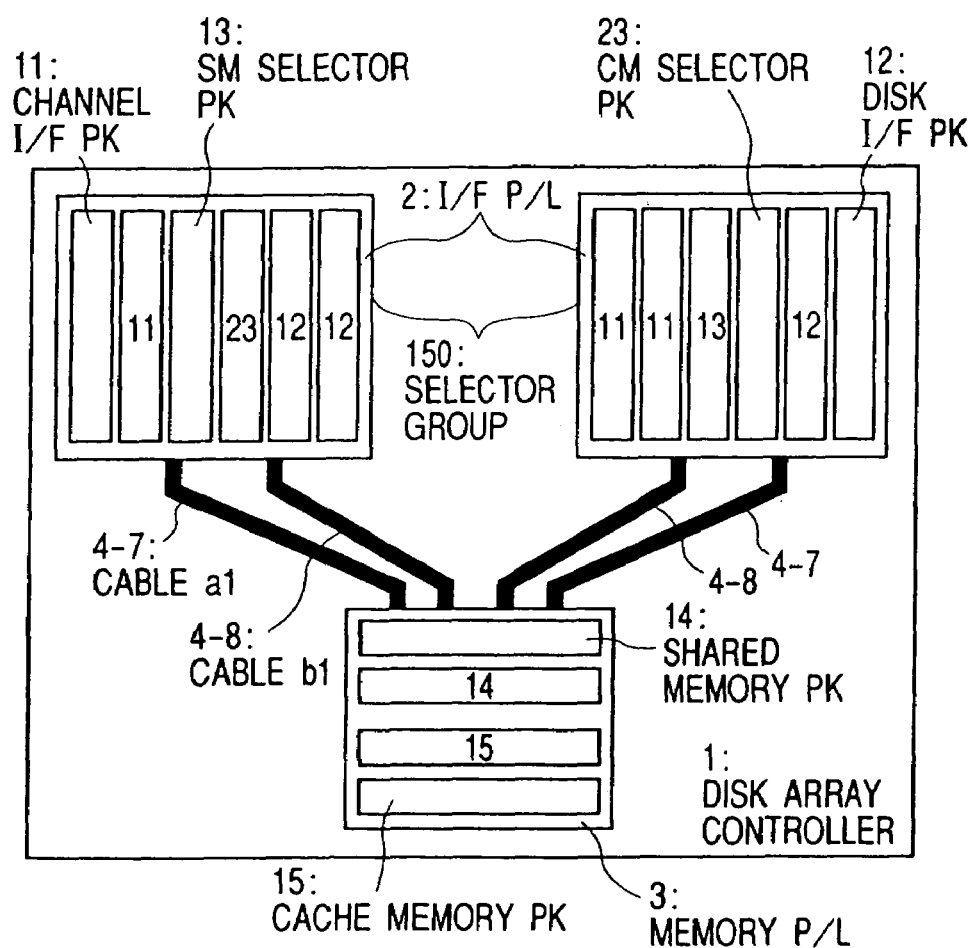
FIG. 24 shows another configuration in the rack-mounted form of a disk array controller according to this invention.

FIG. 24 illustrates the configuration of the disk array controller 1 in FIG. 23 in the rack-mounted form. Here, the SM selector units 113 and CM selector units 123 are separately packaged in SM selector packages 13 and CM selector packages 23, respectively. The cache memory units 115 and shared memory units 114 are separately packaged in cache memory unit packages 15 and shared memory packages 14, respectively, which are mounted on a memory platter 3. As shown in FIG. 24, in place of the cable 1 (4-2) which connects each interface platter 2 and the memory platter 3 in FIG. 6, cable a1 (4-7) for access path a1 (132) to the shared memory units 114 and cable b1 (4-8) for access path b1 (134) to the cache memory units 115 are used.

Since in this configuration, the access paths from the channel interface packages 11 and disk interface packages 12 to the cache memory packages 15 or shared memory packages 14 are physically independent, it is possible to distinguish between faults related to access to the cache memory units 115 (faults in the cache memory units 115, or the CM selector units 123, access paths b0 (133), access paths b1 or others for access to them) and faults related to access to the shared memory units 114 (faults in the shared memory units 114 or the SM selector units 113, access paths a0 (131), access paths a1 (132) or others for access to them) so that defective parts can be independently repaired without affecting other parts.

Figure 26:
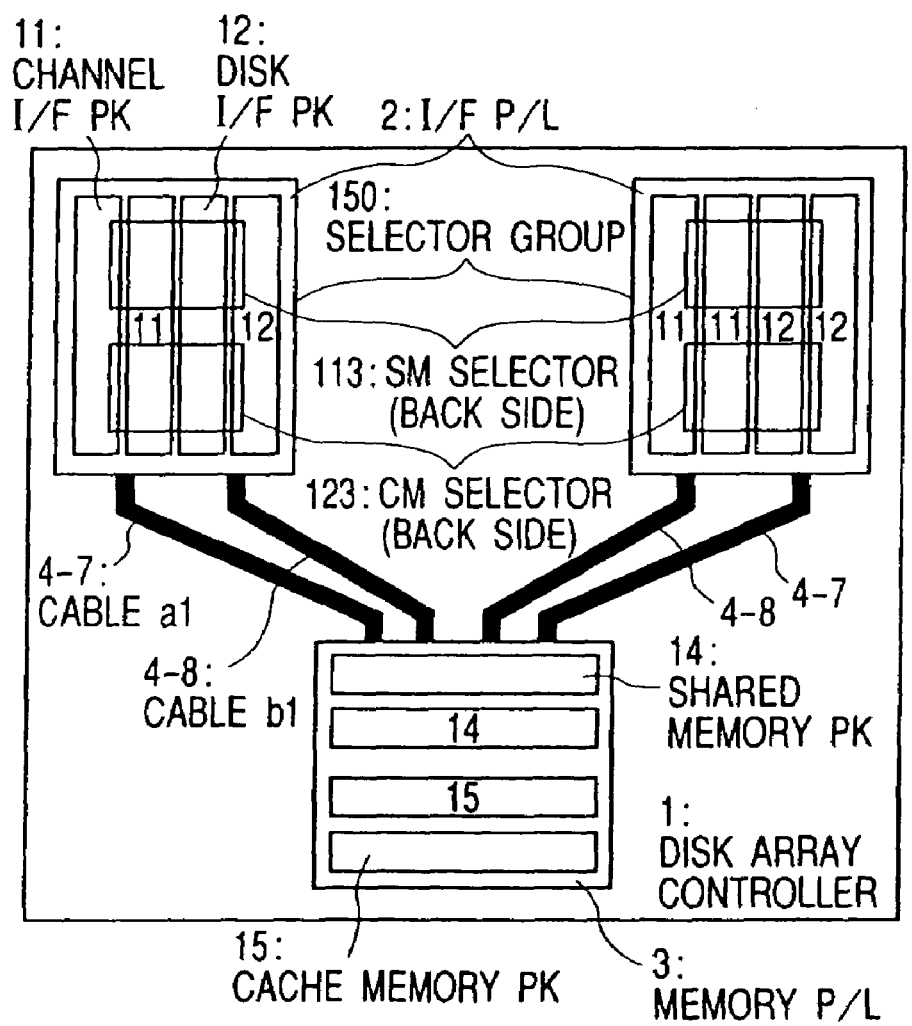
FIG. 26 shows another configuration in the rack-mounted form of a disk array controller according to this invention.
Figure 27:
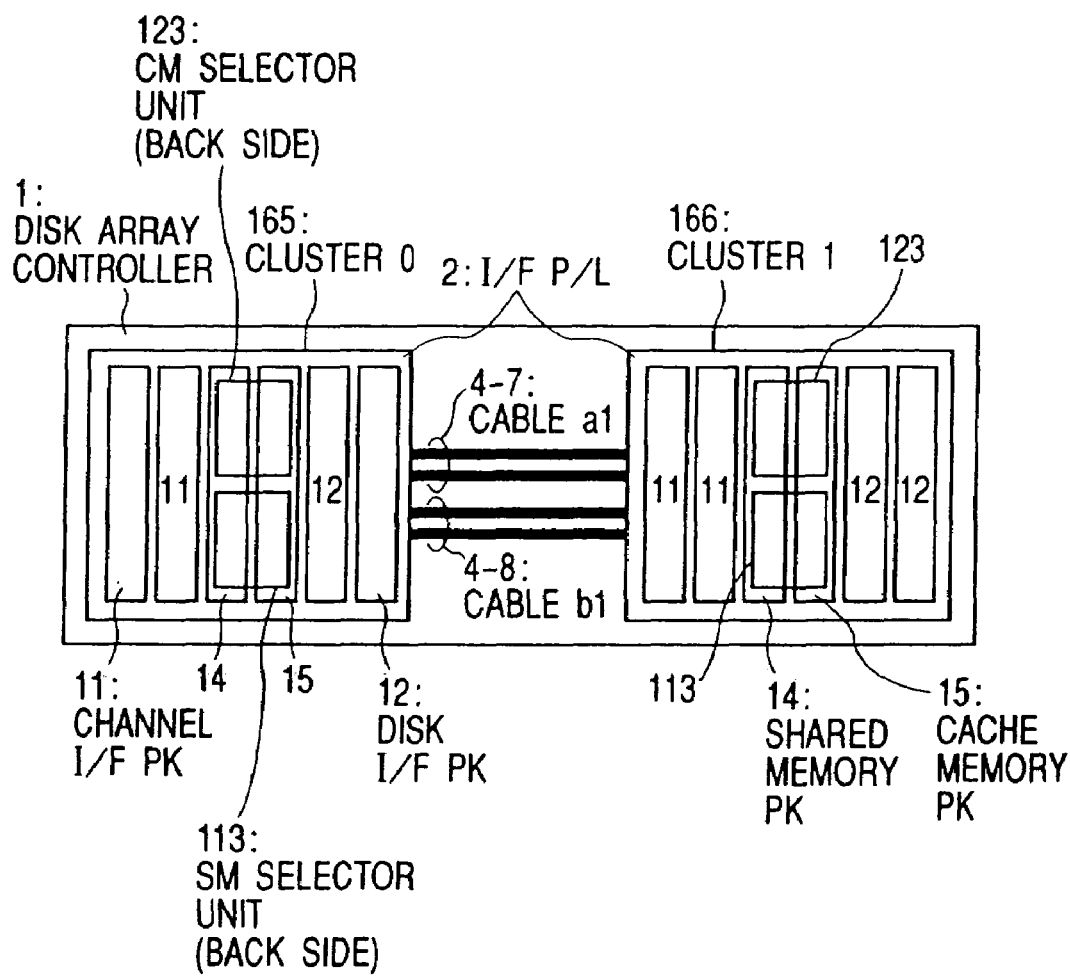
FIG. 27 shows another configuration in the rack-mounted form of a disk array controller according to this invention.

Again, in this case, as shown in FIG. 26, the SM selector units 113 and CM selector units 123 may be mounted on the reverse of the package bearing surface of the interface platters 2 (the figure shows the backside of the platters)

Figure 59:
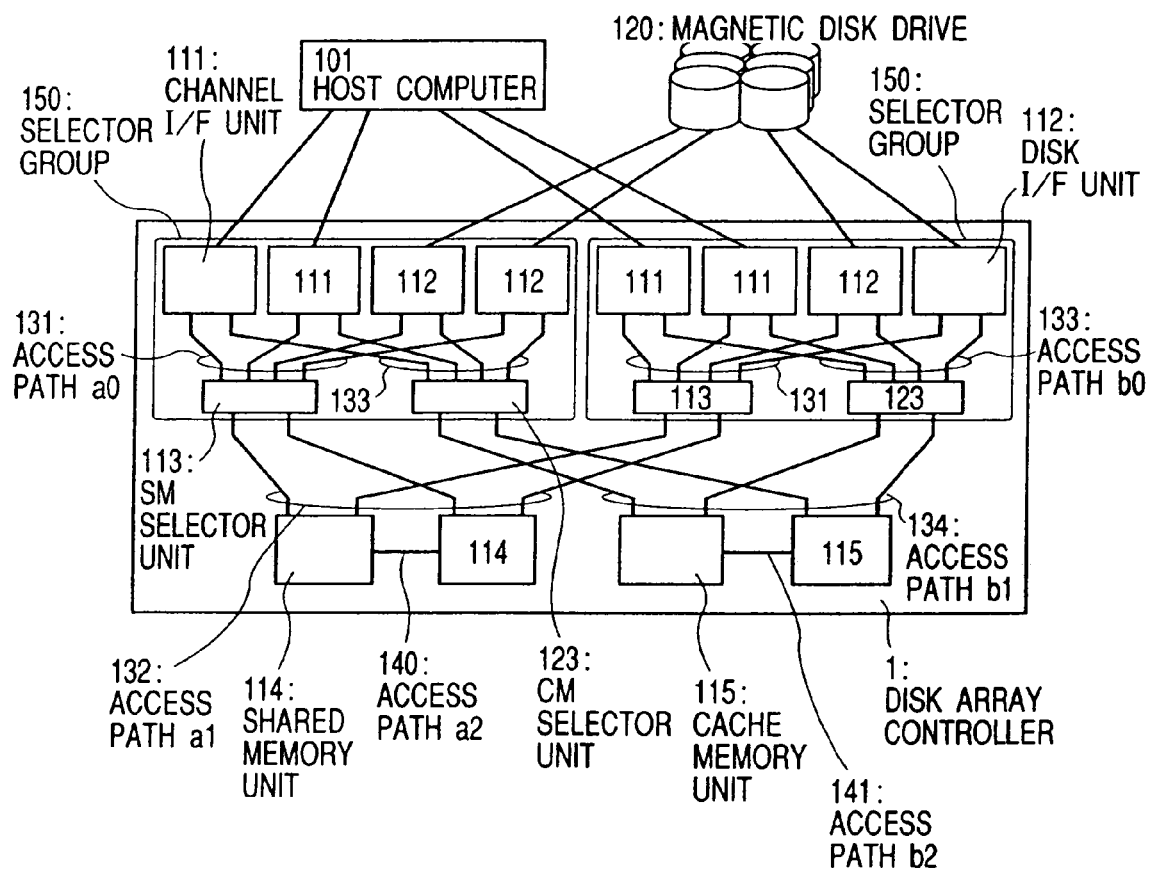
FIG. 59 shows another configuration of a disk array controller according to this invention.

FIG. 59 shows a variation of this embodiment in which two shared memory units 114 are interconnected via access path a2 (140) and two cache memory units 115 are interconnected via access path b2 (141) to make a dual system.

Figure 60:
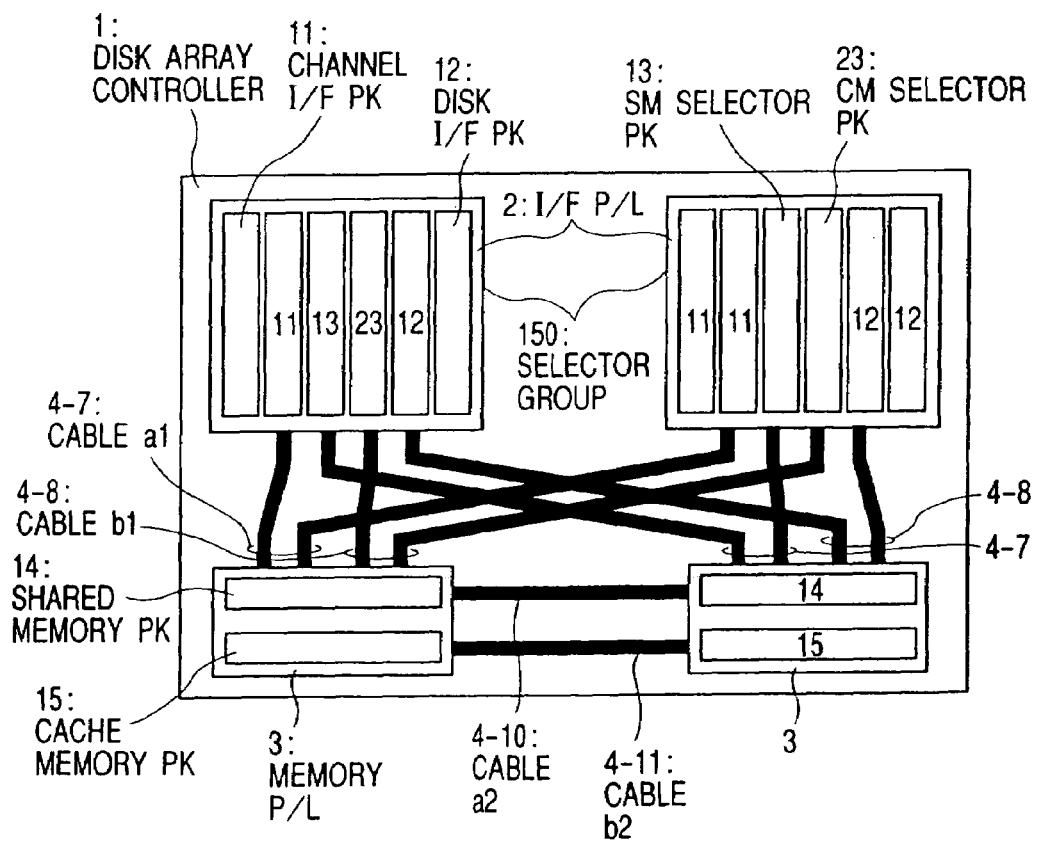
FIG. 60 shows another configuration in the rack-mounted form of a disk array controller according to this invention.

FIG. 60 illustrates the configuration of the disk array controller 1 in FIG. 59 in the rack-mounted form. As shown in FIG. 59, like embodiment 5, two shared memory units 114 and two cache memory units 115 are separately packaged in shared memory packages 14 and cache memory packages 15, respectively, and one shared memory package 14 and one cache memory package 15 are mounted on one memory platter 3, with the two memory platters 3 being interconnected by cable a2 (4-10) and cable b2 (4-11). One interface platter 2 is connected to the two memory platters 3 by cable a1 (4-7) and cable b1 (4-8). The cable a2 (4-10) and cable b2 (4-11) are cables for the access path a2 (140) and access path b2 (141) shown in FIG. 59, respectively.

This configuration produces the same effects as those of embodiment 5.

As shown in FIGS. 59 and 60, the shared memory units 114 are interconnected via access path a2 (140) and the cache memory units 115 interconnected via access path b2 (141) to make a dual system; however, instead, the same dual system effect can be obtained by writing the same data in both the two shared memory units 114 or both the two cache memory units 115 from the channel interface units 111, disk interface units 112, SM selector units 113 or CM selector units 123. In this case, it is unnecessary to interconnect the shared memory units 114 via access path a2 (140) or the cache memory units 15 via access path b2. However, if they are interconnected via access path a2 (140) or access path b2 (141), the data in the two shared memory units 114 or the two cache memory units 115 can be directly cross-checked for confirmation or a similar purpose, resulting in improved reliability.

Figure 62:
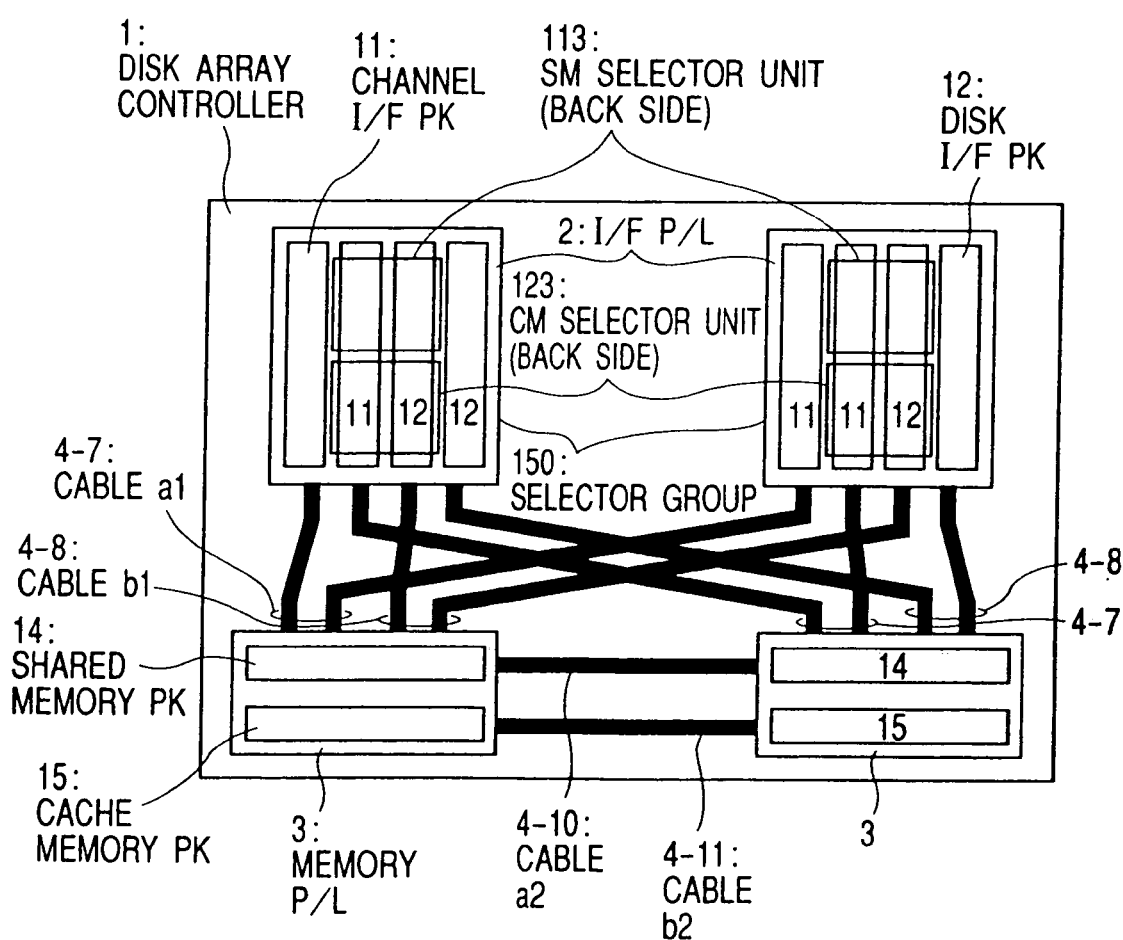
FIG. 62 shows another configuration in the rack-mounted form of a disk array controller according to this invention.
Figure 63:
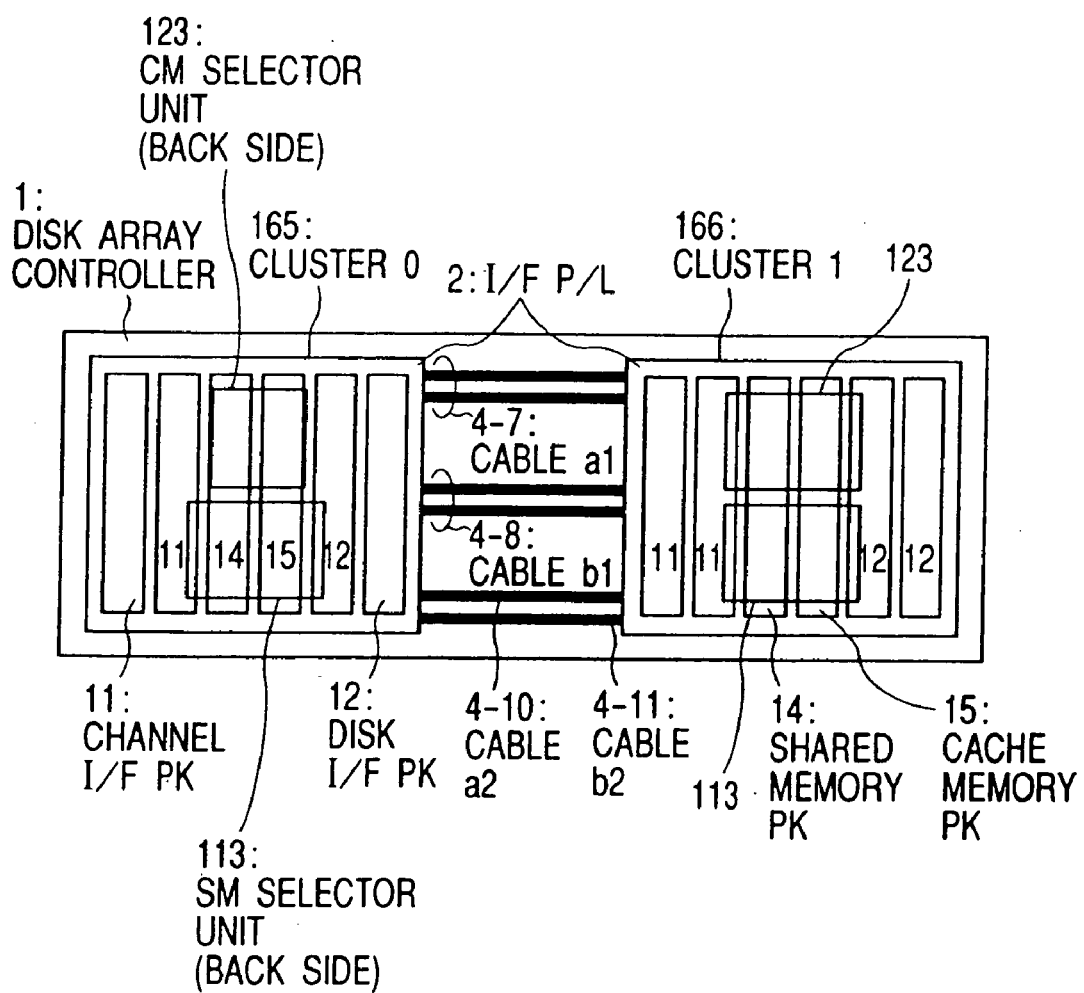
FIG. 63 shows another configuration in the rack-mounted form of a disk array controller according to this invention.

Again, in this case, as shown in FIG. 62, the SM selector units 113 and the CM selector units 123 may be mounted on the reverse of the package bearing surface of the interface platters 2 (the figure shows the backside of the platters)

Figure 69:
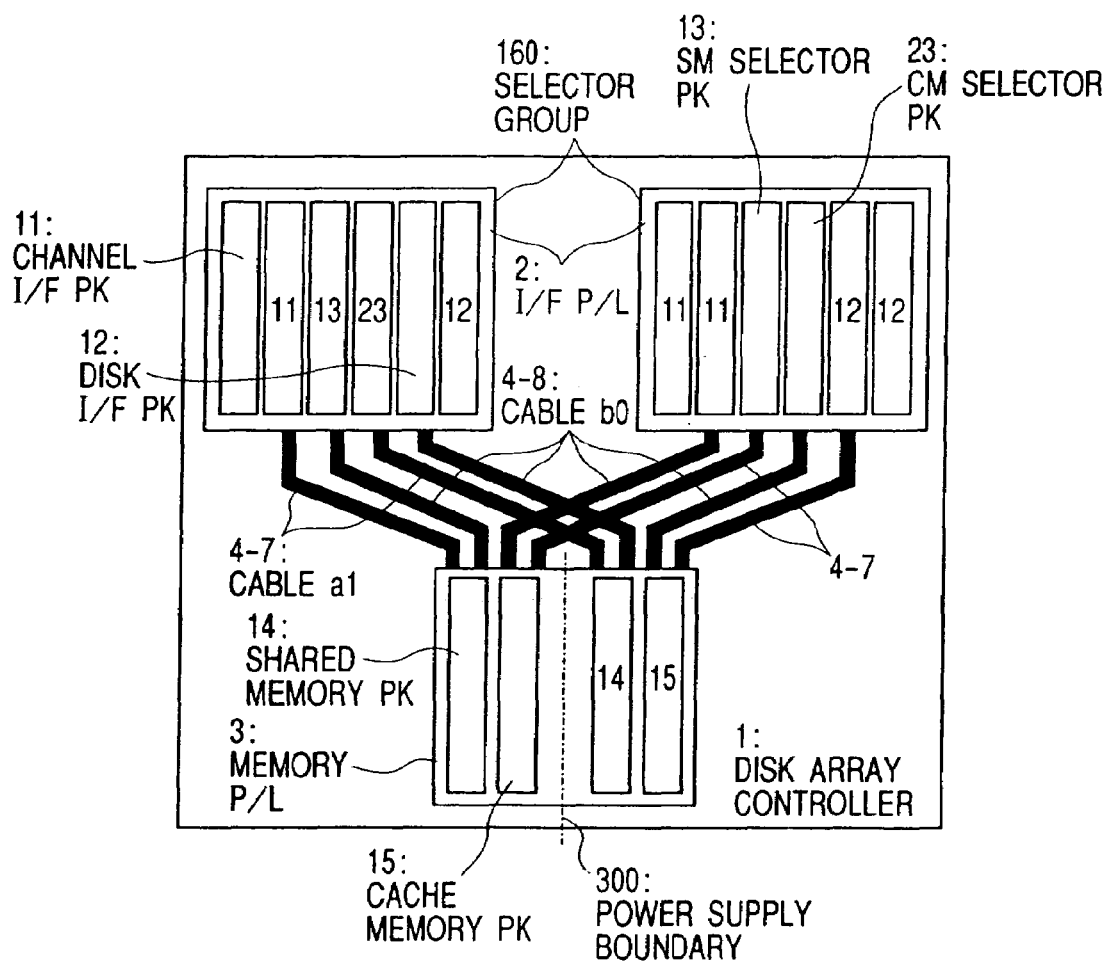
FIG. 69 shows another configuration in the rack-mounted form of a disk array controller according to this invention.

FIG. 69 is a variation of this embodiment in which two shared memory units 114 and two cache memory units 115 are mounted in the same way as in embodiment 6. In other words, they are separately packaged in shared memory packages 14 and cache memory packages 15, respectively, which are mounted on one memory platter 3 which is divided into two areas by a power supply boundary 300.

This configuration produces the same effects as those of embodiment 6.

Figure 71:
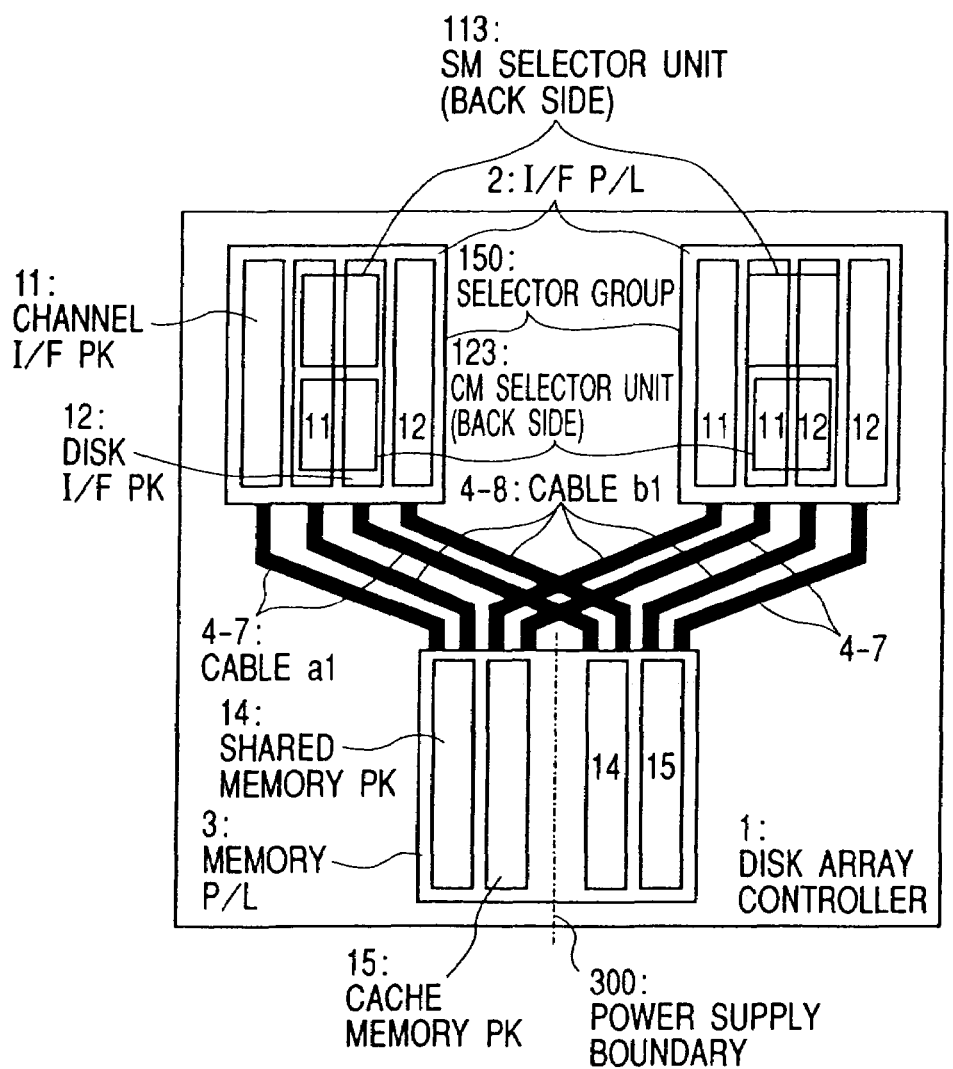
FIG. 71 shows another configuration in the rack-mounted form of a disk array controller according to this invention.
Figure 72:
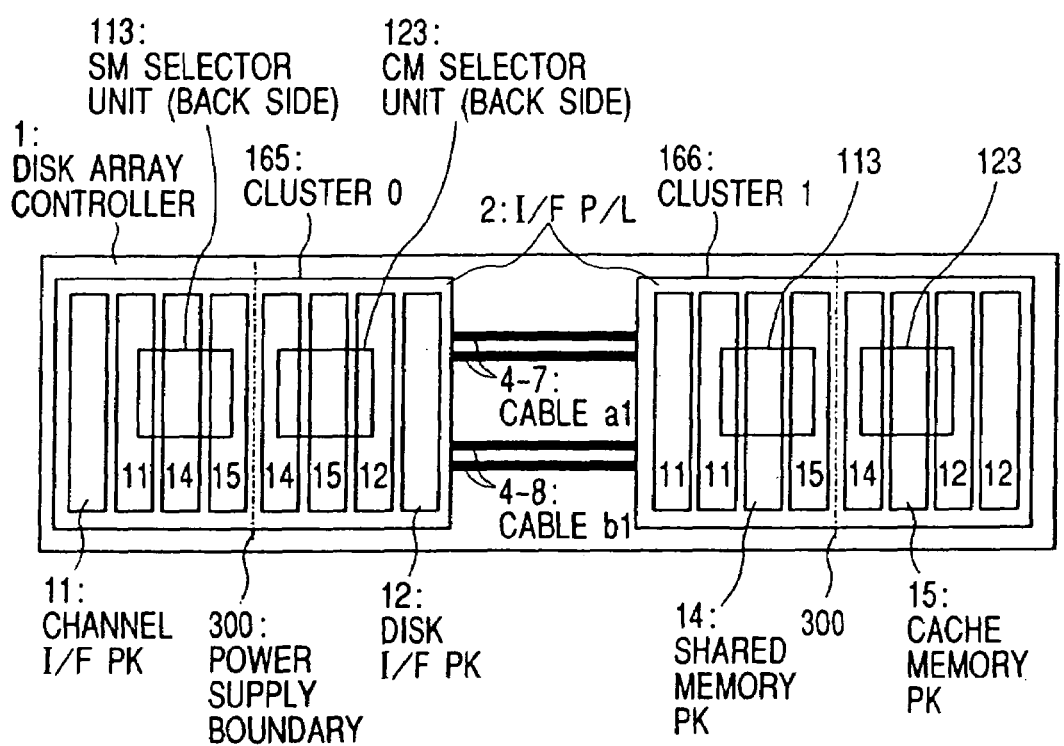
FIG. 72 shows another configuration in the rack-mounted form of a disk array controller according to this invention.

Again, in this case, as shown in FIG. 71, the SM selector units 113 and CM selector units 123 may be mounted on the reverse of the package bearing surface of the interface platters 2 (the figure shows the backside of the platters).

Embodiment 12

Figure 9:
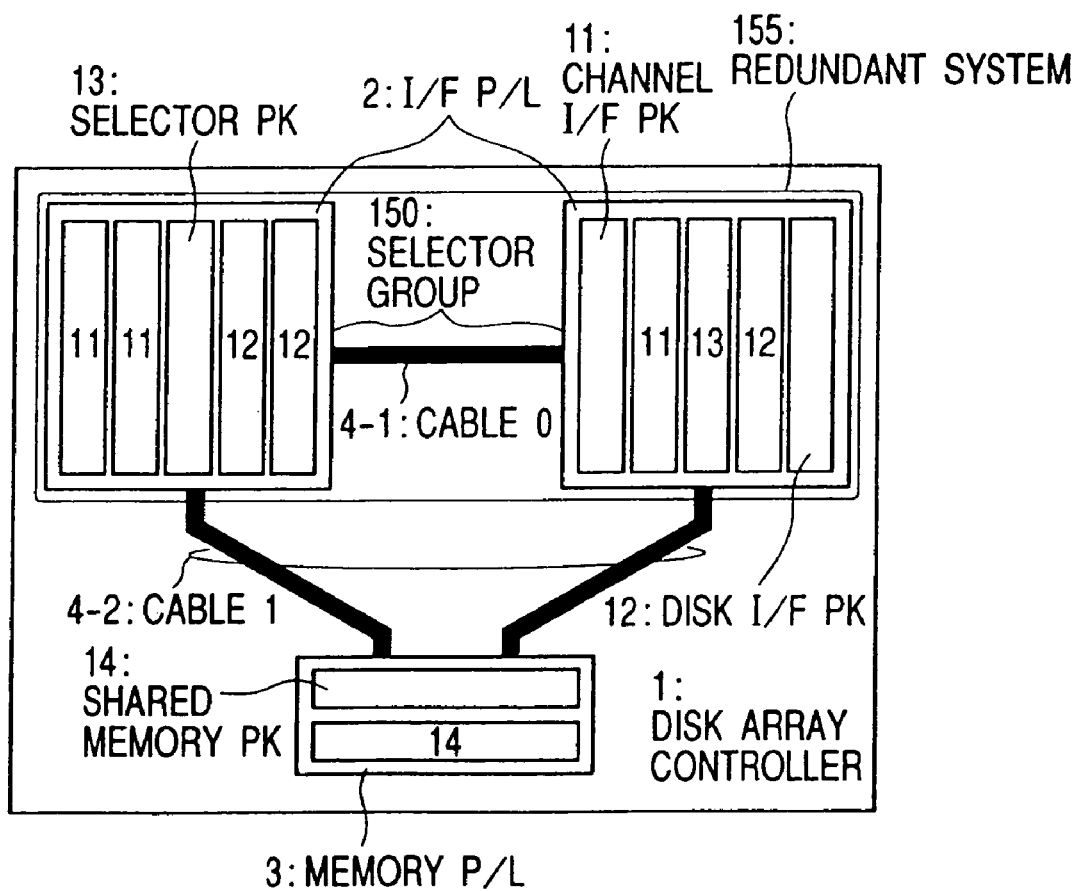
FIG. 9 shows another configuration in the rack-mounted form of a disk array controller according to this invention.
Figure 10:
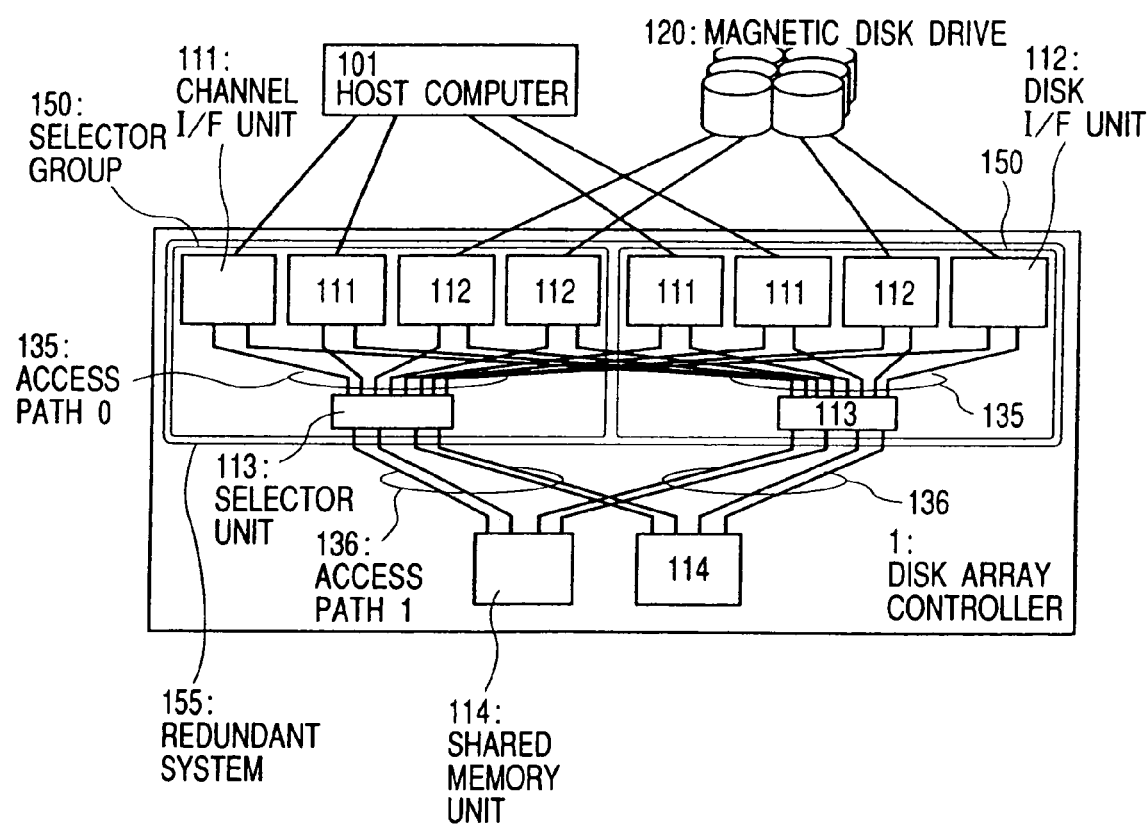
FIG. 10 shows another configuration of a disk array controller according to this invention.

FIGS. 9 and 10 show another embodiment of this invention.

FIG. 10 shows the configuration of a disk array controller according to this invention. The disk array controller 1 has channel interface units 111, disk interface units 112, selector units 113, shared memory units 114, access paths 0 (135) and access paths 1 (136). It is basically the same in structure as in embodiment 11.

The difference is as follows. In this embodiment, each of the channel interface units 111 and disk interface units 112 has two access paths 0 (135), and one of the paths is connected to the selector unit 113 in the selector group 150 it belongs to, and the other path connected to the selector unit 113 in the other selector group 150. Therefore, there are two routes for access to the shared memory units 114 from each of the channel interface units 111 or disk interface units 112. Usually the two access routes are used to share the load in a balanced way so that if one access route becomes ineffective due to a fault or other reason, the other access route can be used to operate the system uninterruptedly. A pair of selector groups which each have access paths to the selector in the other group in this way is hereinafter called a redundant system 155.

One selector unit 113 has a total of eight access paths 0 (135) on the basis of one path per unit: paths from the two channel interface units 111 and two disk interface units 112 within the group it belongs, as well as paths from the two channel interface units 111 and two disk interface units 112 within the other group. Also each selector unit 113 has a total of four access paths 1 (136) to the two shared memory units, where each shared memory unit has two access paths. Due to the above-mentioned availability of access paths, each selector unit 113 selects four of the eight requests transmitted via the eight access paths 0 (135) from the channel interface units 111 and disk interface units 112, where the number of selected requests corresponds to the number of access paths 1 (136) to the shared memory units 114. In this embodiment, the disk array controller 1 has one redundant system 155 and two shared memory units.

Here, the important thing is that the number of access paths 1 (136) from one selector unit 113 to the shared memory units 114 is smaller than the number of access paths 0 (135) from the channel interface units 111 and disk interface units 112 to one selector unit 113, and that the number of selector units 113 is smaller than the total number of channel interface units 111 and disk interface units 112. This reduces the number of access paths to each shared memory unit 114, which means a decrease in the number of cables used, leading to cost reduction. In addition, the problem of LSI pin necks or package connector necks in shared memory units can be resolved.

The number of channel interface units and the number of disk interface units within a selector group 150 depends on the management unit for maintenance (the number of interface units subjected to each maintenance service), and other factors. One possibility is that, on the assumption that the minimum disk array controller configuration constitutes one redundant system 155, a plurality of such redundant systems are provided.

FIG. 9 illustrates the configuration of the disk array controller 1 in the rack-mounted form. The channel interface units 111, disk interface units 112, selector units 113 and shared memory units 114 as shown in FIG. 10 are separately packaged in channel interface packages 11, disk interface packages 12, selector packages 13 and shared memory packages 14, respectively. One selector group 150, which consists of one selector package 13 and channel interface packages 11 and disk interface packages 12 connected with it, is mounted on one interface platter 2 and the two shared memory packages 14 are mounted on a memory platter 3 different from the interface platters 2. Each interface platter 2 and the memory platter 3 are connected by cable 1 (4-2). This cable is a cable for the access path 1 (136) which connects a selector unit 113 and a shared memory unit 114 as shown in FIG. 10. The two interface platters which constitute a redundant system are interconnected by cable 0 (4-1). This cable is a cable for the access paths 0 (135) which connect the channel interface units 111 and disk interface units 112 within one selector group 150 and the selector unit 113 within the other selector group.

Here, when two cables 0 (4-1) are used instead of one and one of them is used for access path 0 (135) to connect the interface units within one selector group 150 with the selector unit 113 within the other group 150, and the other cable is used for access path 0 (135) to connect the selector unit 113 within the former selector group 150 with the interface units within the latter selector group 150, even if one of the access paths 0 (135) fails, the cable 0 (4-1) concerned can be replaced without affecting the other access path 0 (135).

Although the selector units 113 are packaged in selector packages in this example, they may also be directly mounted on the reverse of the package bearing surface of the interface platters 2, as shown in FIG. 8, without packaging them in packages (the figure shows the back side of the platters).

When, as mentioned above, the access paths of each interface package are connected not only with the selector package 13 on the same interface platter 2 on which it is mounted, but also with the selector package 13 on the other interface platter 2 in the same redundant system, even if the selector package 13 on one of the interface platters 2 fails, the interface packages mounted on the same interface platter 2 bearing the defective selector package 13 can access the shared memory units 114 through the selector unit 113 on the other interface platter 2 and thus the defective selector package 113 can be replaced without stopping the interface units in the selector group 150 to which the defective selector unit 113 belongs. This reduces the number of system components which should be stopped in case of faults.

Variations of this embodiment are introduced below.

In these variations, the selector units 113 may be mounted on the reverse of the package bearing surface of the interface platters 2 (the figures concerned show the backside of the platters).

Figure 42:
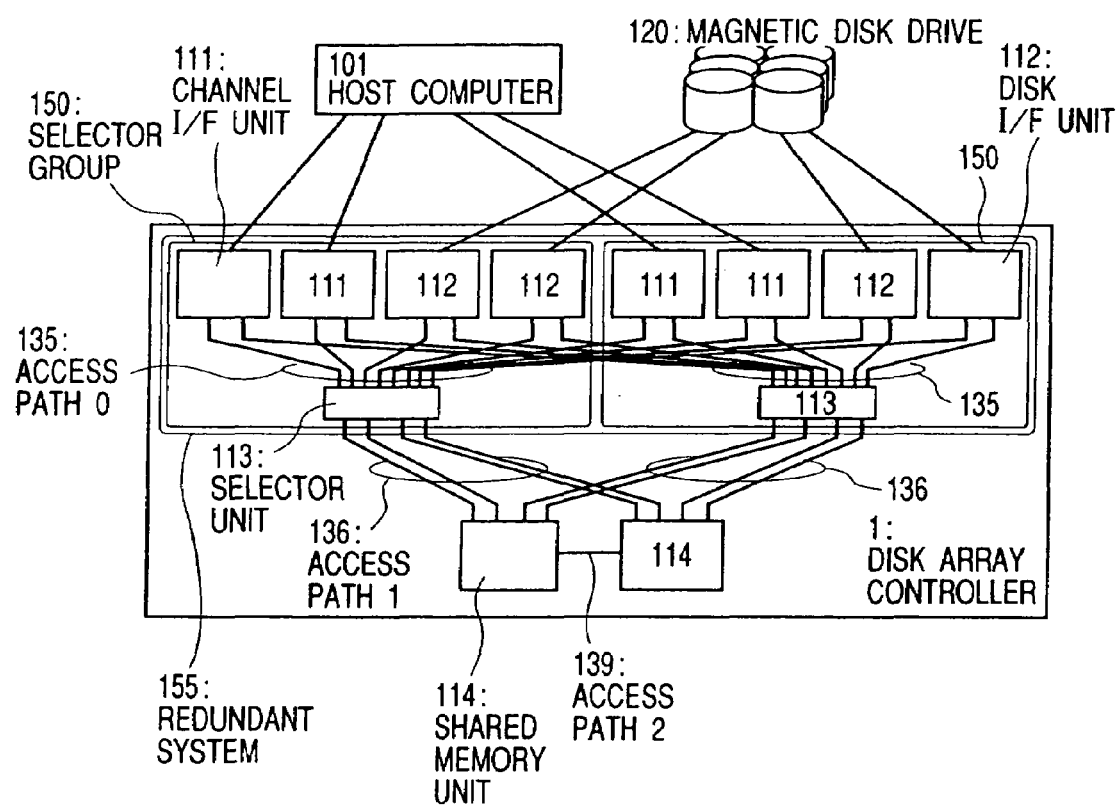
FIG. 42 shows another configuration of a disk array controller according to this invention.

FIG. 42 illustrates a variation of this embodiment in which the two shared memory units 114 are interconnected via access path 2 (139) to make a dual system as in embodiment 2.

Figure 43:
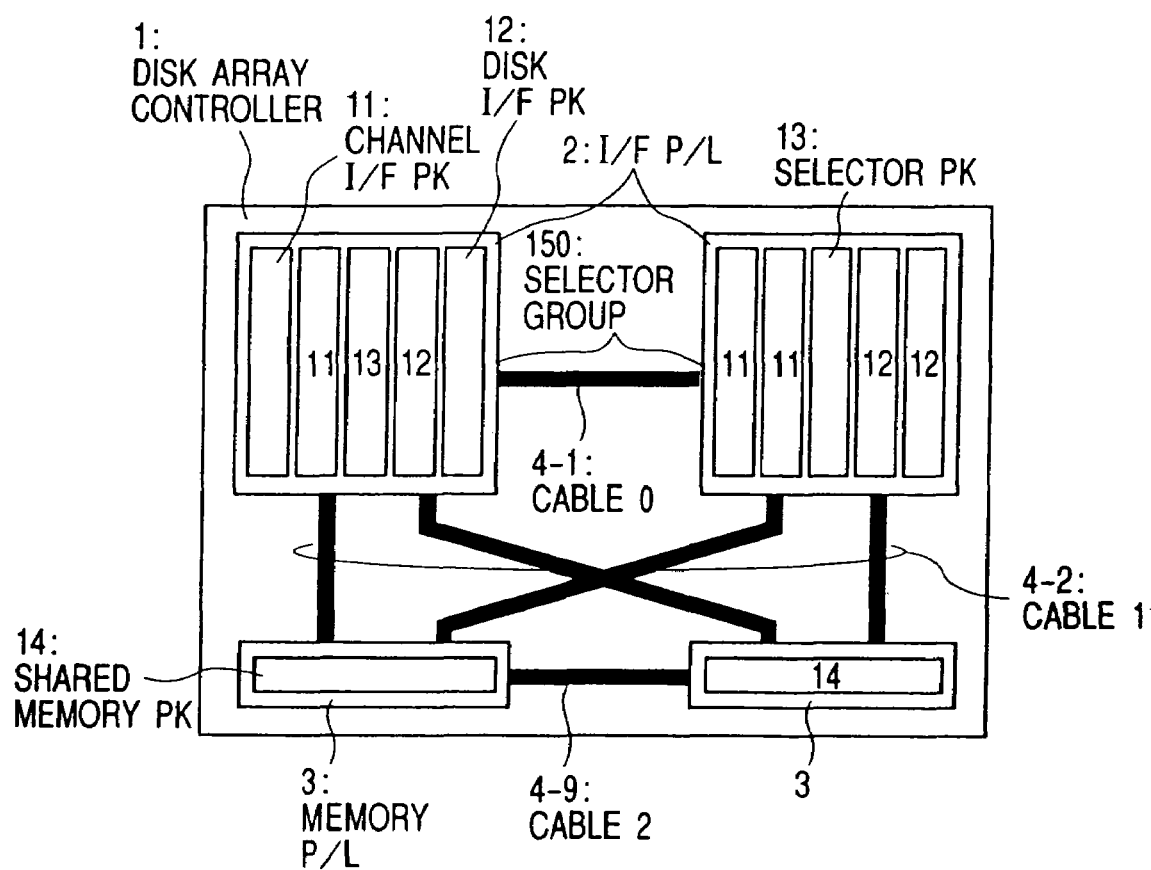
FIG. 43 shows another configuration in the rack-mounted form of a disk array controller according to this invention.

FIG. 43 illustrates the configuration of the disk array controller 1 in FIG. 42 in the rack-mounted form. Two shared memory units 114 are separately packaged in shared memory packages 14, which are mounted on different memory platters 3. The memory platters 3 are interconnected by cable 2 (4-9) and one interface platter 2 and the two memory platters 3 are connected by cable 1 (4-2). The cable 2 (4-9) is a cable for the access path 2 (139) as shown in FIG. 42.

This produces the same effects as those of embodiment 2.

In this variation, the shared memory units 114 are interconnected via access paths 2 (139) to make a dual system; however, instead, the same dual system effect can be obtained by writing the same data in both the two shared memory units 114 from the channel interface units 111, disk interface units 112 or selector units 113. In this case, it is unnecessary to interconnect the shared memory units 114 via access path 2 (139). However, if they are interconnected via access path 2 (139), the data in the two shared memory units 114 can be directly cross-checked for confirmation or a similar purpose, resulting in improved reliability.

Figure 51:
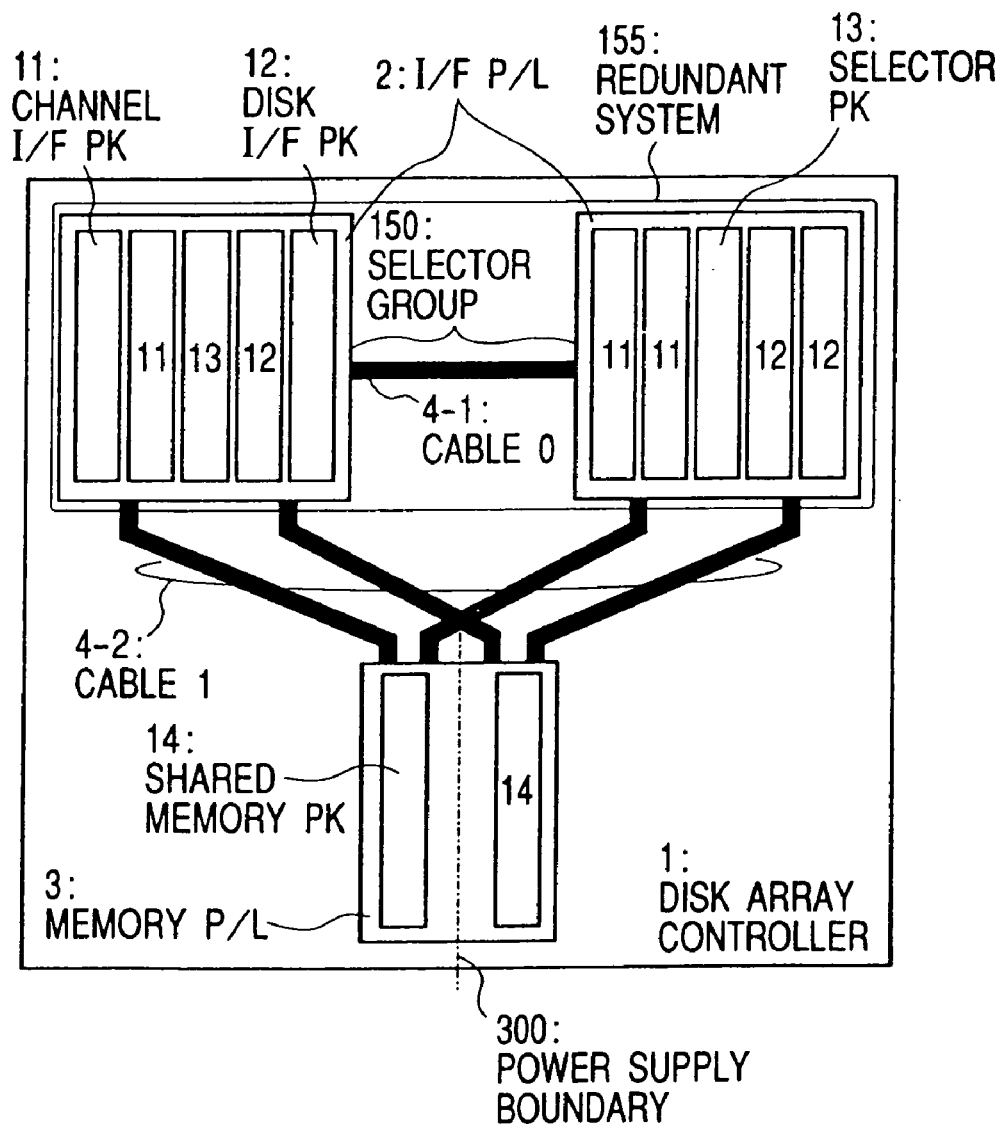
FIG. 51 shows another configuration in the rack-mounted form of a disk array controller according to this invention.

FIG. 51 shows another variation in which two shared memory units 114 make up a dual system. Like embodiment 3, two shared memory units 114 are separately packaged in shared memory packages 14, which are mounted on two areas of one memory platter 3 divided by a power supply boundary 300.

This produces the same effects as those of embodiment 3.

Figure 28:
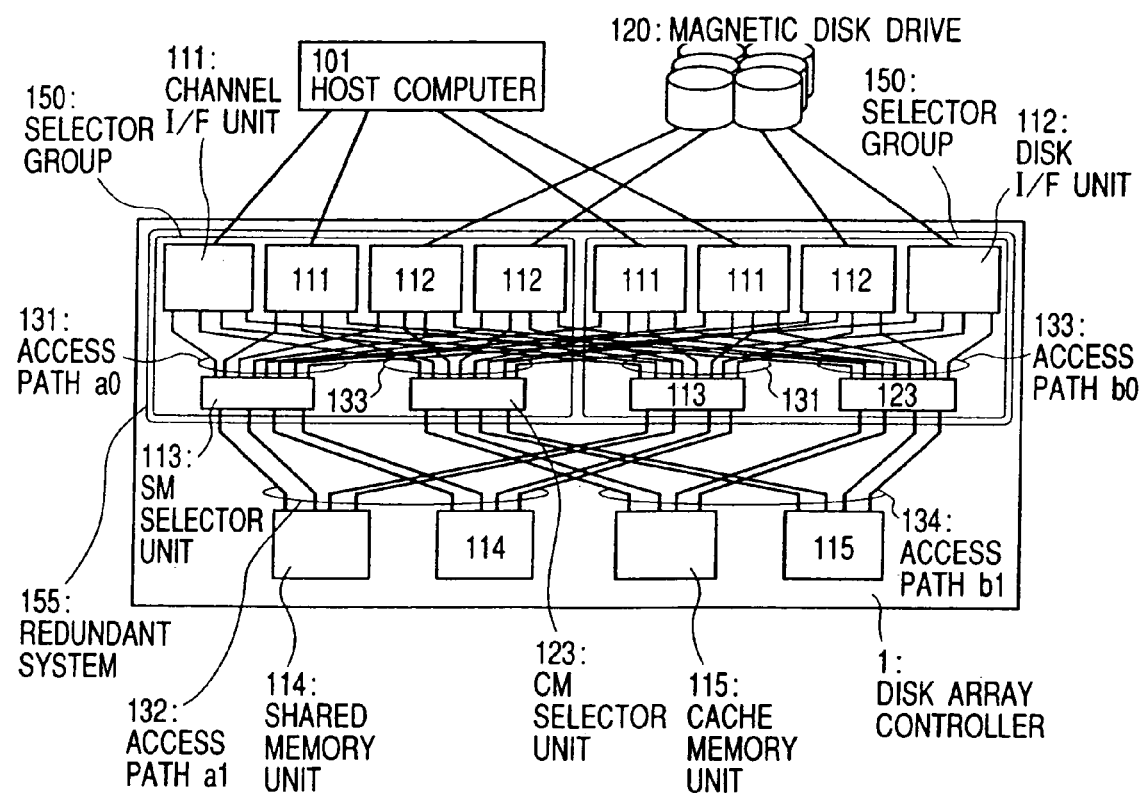
FIG. 28 shows another configuration of a disk array controller according to this invention.

FIG. 28 illustrates a variation of this embodiment in which cache memory units 115 for storing data to be recorded in magnetic disk drives 120, and shared memory units 114 for storing control data for the cache memory units 115 and the disk array controller 1 are physically independent of each other, selectors (CM selector units 123) connected to the cache memory units 115 and selectors (SM selector units 113) connected to the shared memory units 114 are physically independent of each other, and access paths a0 (131) and access paths a1 (132) to the shared memory units 114, and access paths b0 (133) and access paths b1 (134) to the cache memory units 115 are independent of each other.

Figure 29:
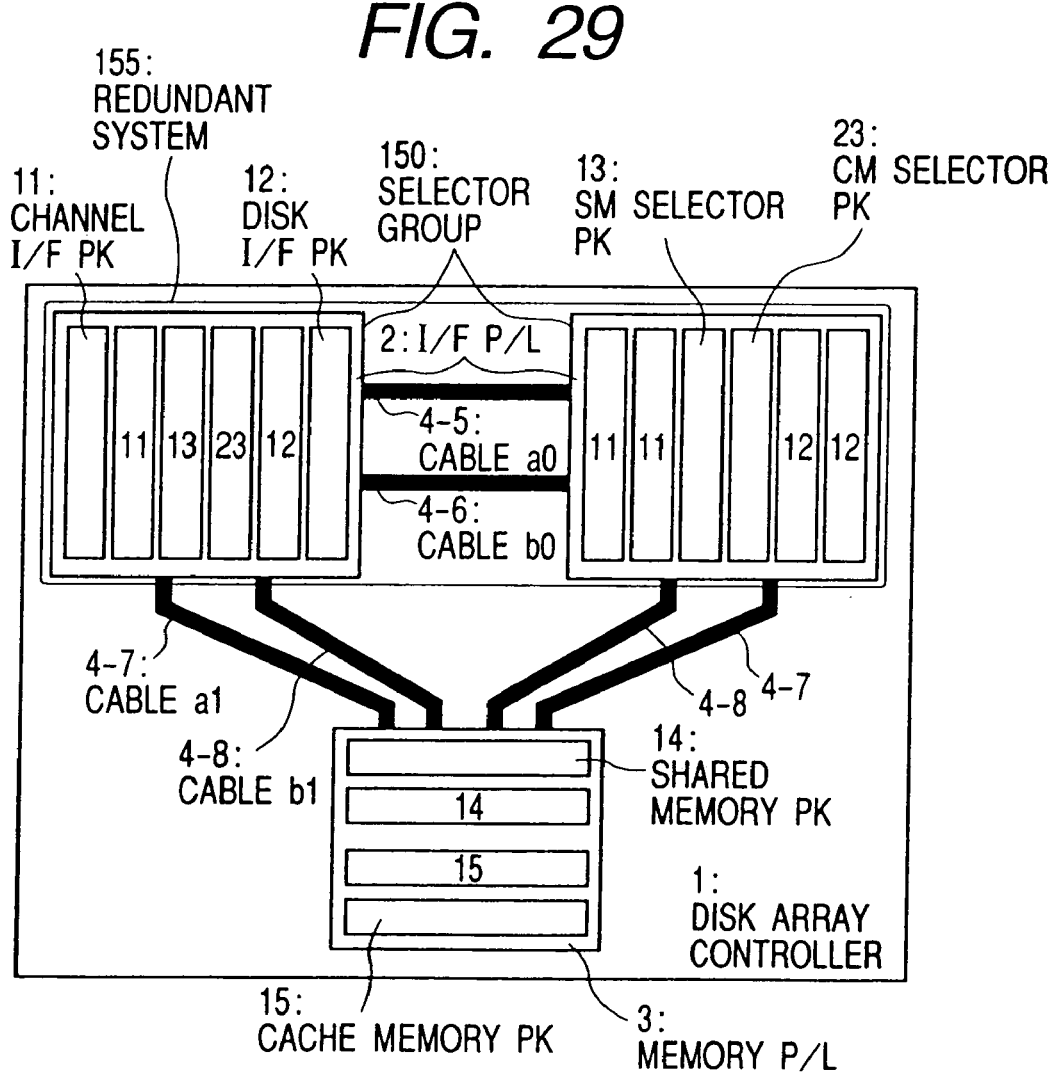
FIG. 29 shows another configuration in the rack-mounted form of a disk array controller according to this invention.

FIG. 29 illustrates the configuration of the disk array controller 1 in FIG. 28 in the rack-mounted form. Here, the SM selector units 113 and CM selector units 123 are separately packaged in SM selector packages 13 and CM selector packages 23, respectively. The cache memory units 115 and shared memory units 114 are separately packaged in cache memory unit packages 15 and shared memory packages 14, respectively, which are mounted on a memory platter 3. In place of the cable 1 (4-2) which connects each interface platter 2 and the memory platter 3 in FIG. 9, cable a1 (4-7) for access path a1 (132) to the shared memory units 114 and cable b1 (4-8) for access path b1 (134) to the cache memory units 115 are used as shown in FIG. 29. Also, in place of the cable 0 (4-1) which interconnects the interface platters 2, cable a0 (4-5) for access path a0 (131) to the shared memory units 114 and cable b0 (4-6) for access path b0 (133) to the cache memory units 115 are used.

Since in this configuration, the access paths from the channel interface packages 11 and disk interface packages 12 to the cache memory packages 15 or shared memory packages 14 are physically independent, it is possible to distinguish between faults related to access to the cache memory units 115 (faults in the cache memory units 115, or the CM selector units 123, access paths b0 (133), access paths b1 (134) or others for access to them) and faults related to access to the shared memory units 114 (faults in the shared memory units 114 or the SM selector units 113, access paths a0 (131), access paths a1 (132) or others for access to them) so that defective parts can be independently repaired without affecting other parts.

Figure 64:
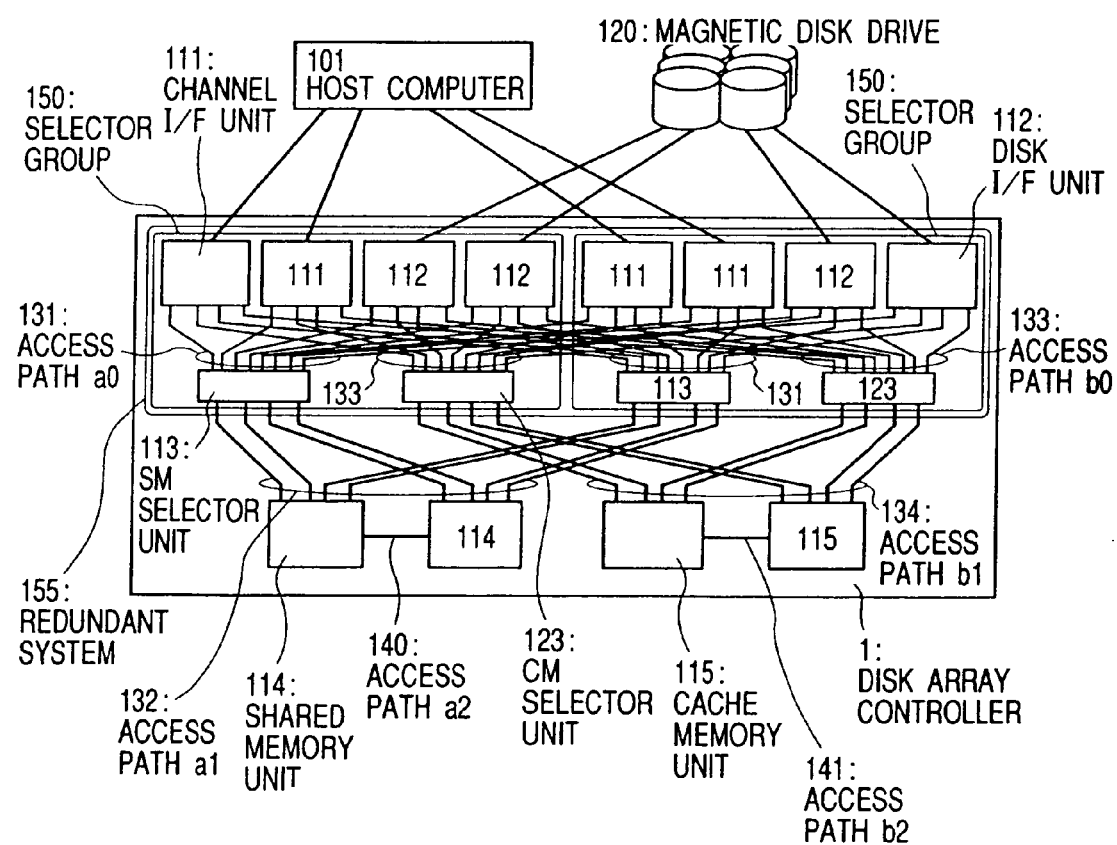
FIG. 64 shows another configuration of a disk array controller according to this invention.
Figure 65:
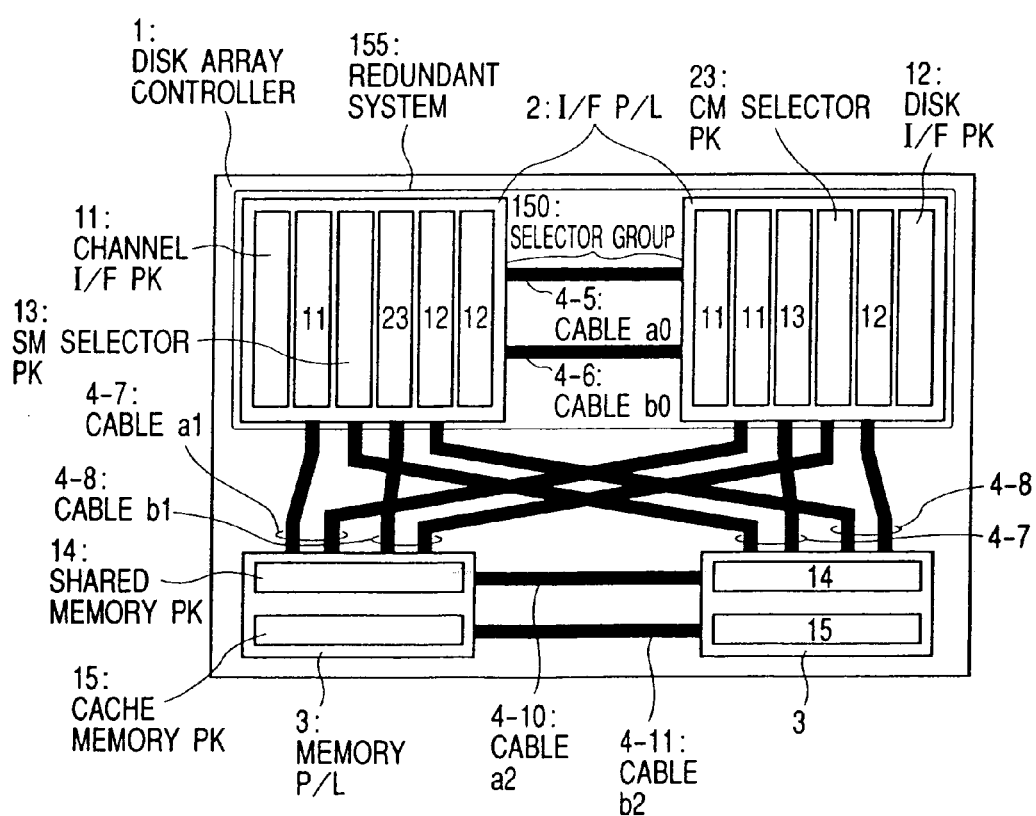
FIG. 65 shows another configuration in the rack-mounted form of a disk array controller according to this invention.

FIG. 64 shows a variation of this embodiment in which two shared memory units 114 are interconnected via access path a2 (140) and two cache memory units 115 are interconnected embodiment 5. FIG. 65 illustrates the configuration of the disk array controller 1 in FIG. 64 in the rack-mounted form. As shown in FIG. 65, two shared memory units 114 and two cache memory units 115 are separately packaged in shared memory packages 14 and cache memory packages 15, respectively, and one shared memory package 14 and one cache memory package 15 are mounted on one memory platter 3, with the two memory platters 3 being connected by cable a2 (4-10) and cable b2 (4-11). The interface platters 2 and memory platters 3 are connected by cables a1 (4-7) and cables b1 (4-8). The cable a2 (4-10) and cable b2 (4-11) are cables for access path a2 (140) and access path b2 (141), respectively.

This produces the same effects as those of embodiment 5.

In this variation, the shared memory units 114 are interconnected via access path a2 (140) and the cache memory units 115 are interconnected via access path b2 (141) to make a dual system; however, instead, the same dual system effect can be obtained by writing the same data in both the two shared memory units 114 or both the two cache memory units 115 from the channel interface units 111, disk interface units 112 or SM selector units 113 or CM selector units 123. In this case, it is unnecessary to interconnect the shared memory units 114 or the cache memory units 115 via access path a2 (140) or access path b2 (141). However, if they are interconnected via access path a2 (140) or access path b2 (141), the data in the two shared memory units 114 or the two cache memory units 115 can be directly cross-checked for confirmation or a similar purpose, resulting in improved reliability.

Figure 73:
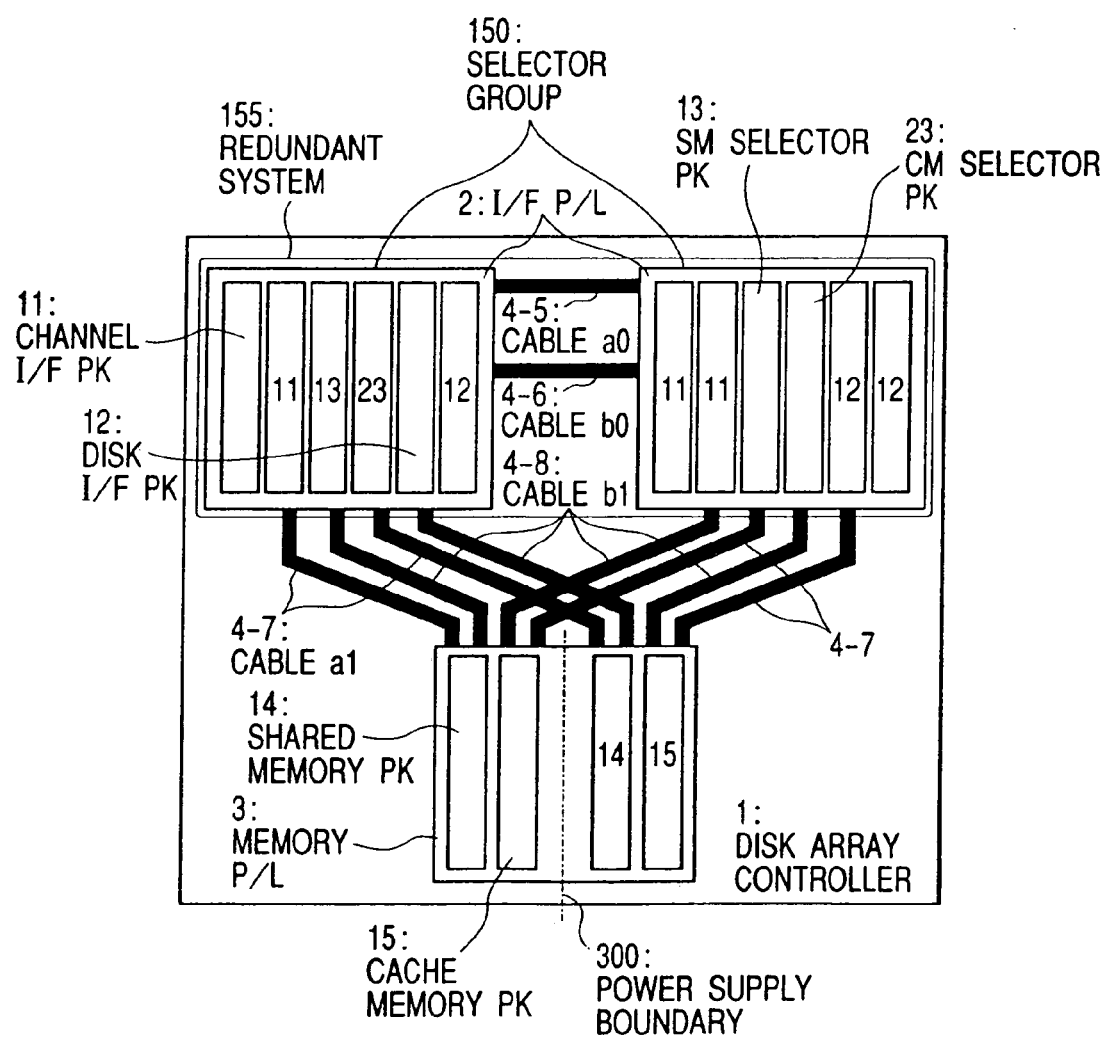
FIG. 73 shows another configuration in the rack-mounted form of a disk array controller according to this invention.

FIG. 73 shows a variation of this embodiment in which two shared memory units 114 and two cache memory units 115 are separately packaged in shared memory packages 14 and cache memory packages 15, respectively, which are mounted on one memory platter 3 which is divided into two areas by a power supply boundary 300 as in embodiment 6.

This produces the same effects as those of embodiment 6.

Embodiment 13

Figure 11:
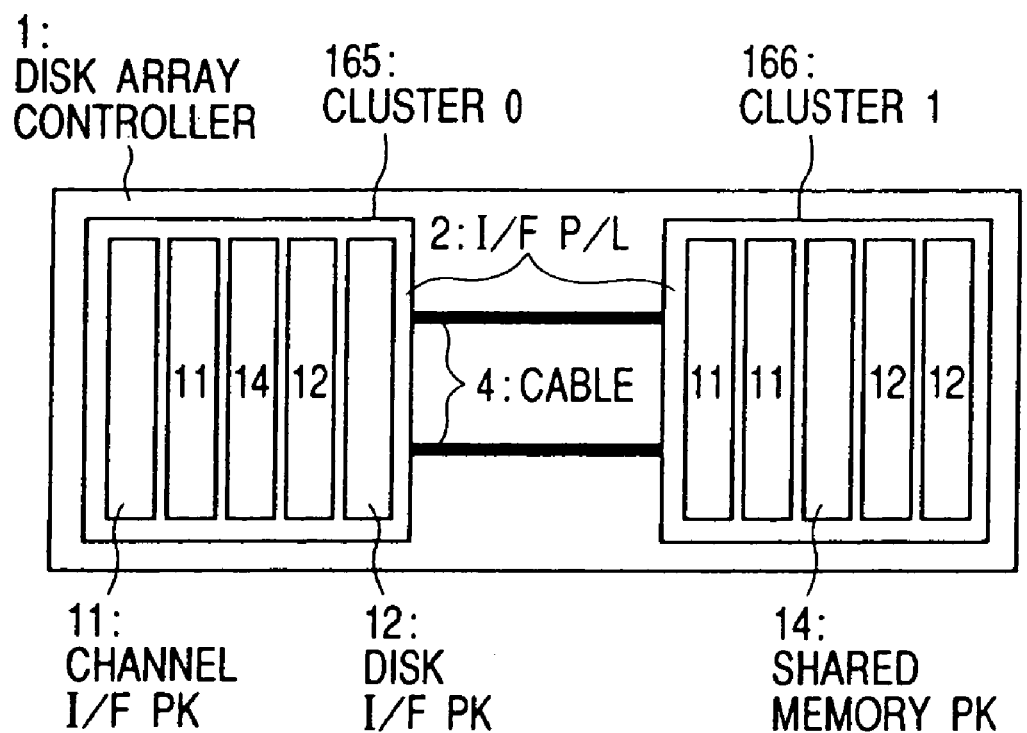
FIG. 11 shows another configuration in the rack-mounted form of a disk array controller according to this invention.

FIG. 11 shows another embodiment of this invention.

FIG. 11 illustrates one implementation of the disk array controller 1 shown in FIG. 4 for embodiment 1 in the rack-mounted form. The channel interface units 111, disk interface units 112 and shared memory units 114 as shown in FIG. 4 are separately packaged in channel interface packages 11, disk interface packages 12, and shared memory packages 14, respectively. Two channel interface packages 11, two disk interface packages 12 and one shared memory package 14, which constitute a group called a cluster (165, 166), are mounted on one interface platter 2.

Therefore, the configuration of this embodiment differs from that of embodiment 1 in FIG. 1 in that a shared memory package 14 is mounted on an interface platter 2 together with channel interface packages 11 and disk interface packages 12.

This embodiment has two clusters, cluster 0 (165) and cluster 1 (166). However, the numbers of clusters, and the number of channel interface units, disk interface units and shared memory units 113 in one cluster are not limited as of above. These numbers depend on the minimum or maximum system configuration of the disk array controller, and the minimum unit of system expansion. In other words, they depend on performance, cost, scalability and other requirements. One possibility is that one cluster is made up of a minimum disk array controller configuration.

In adding an interface platter 2, the new interface platter 2 and the existing interface platters 2 are connected by two cables 4. These cables 4 are cables for the access paths 0 (135) (shown in FIG. 4) which connect the channel interface units 111 or disk interface units 112 within one cluster, with the shared memory unit 114 within the other cluster.

Although each of the two clusters contains a shared memory package 14 in this example, it is also acceptable that one cluster contains all the shared memory packages 14 used in the disk array controller 1 while the other cluster has no shared memory package 14. This can reduce the number of cluster interconnection cables 4 shown in FIG. 11 to one, which leads to cost reduction.

The disk array controller in this embodiment uses a smaller number of cables than that in embodiment 1, leading to cost reduction and higher implementation efficiency.

FIGS. 33, 46, 19, 55 and 68 illustrate variations of this embodiment. These show other configurations of the disk array controller detailed in the description of embodiments 2 to 6. They are different from the configuration of the disk array controller in embodiments 2 to 6 simply in that a shared memory package 14 is mounted on an interface platter 2 together with channel interface packages 11 and disk interface packages 12. They will be briefly outlined below. Needless to say, they produce the same effects as those of embodiments 2 to 6.

Figure 33:
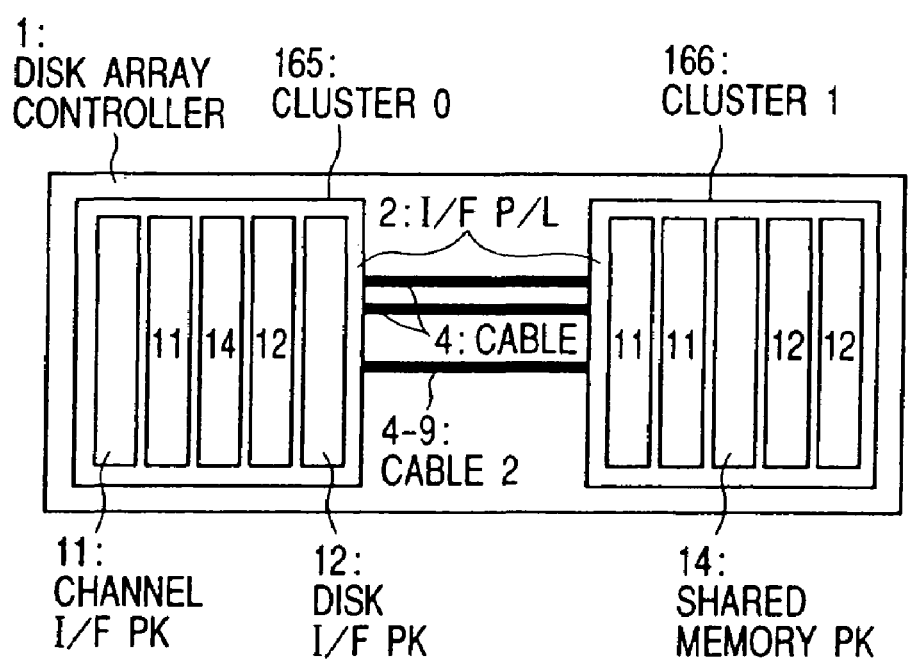
FIG. 33 shows another configuration in the rack-mounted form of a disk array controller according to this invention.

FIG. 33 shows one implementation of the disk array controller 1 shown in FIG. 31 for embodiment 2. The configuration in FIG. 33 differs from that in FIG. 32 for embodiment 2 in that one cluster contains one shared memory package 14.

Figure 46:
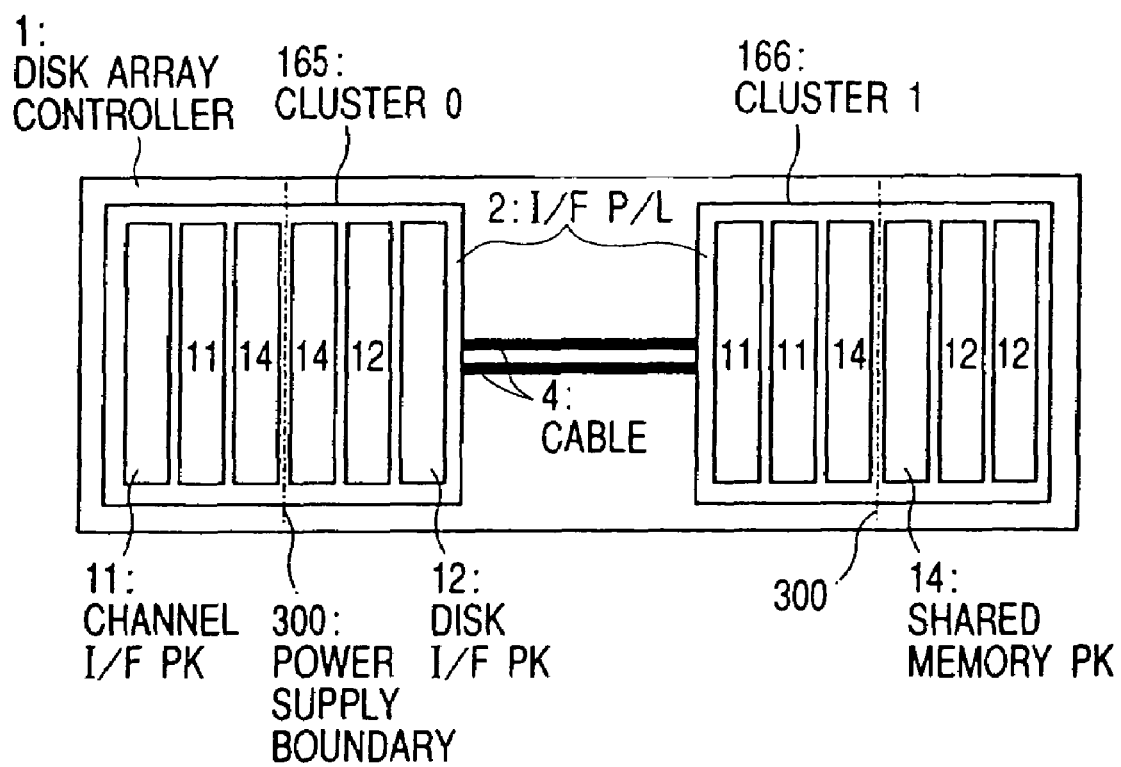
FIG. 46 shows another configuration in the rack-mounted form of a disk array controller according to this invention.

FIG. 46 shows a variation of the configuration shown in FIG. 45 for embodiment 3. Two pairs of shared memory packages 14 are mounted on different interface platters 2. Each of the interface platters is divided by a power supply boundary 300 into two areas, to which power is separately supplied from two power supplies. Each shared memory package 14 in one pair is mounted in one of the areas to which power is supplied from different power supplies.

Figure 19:
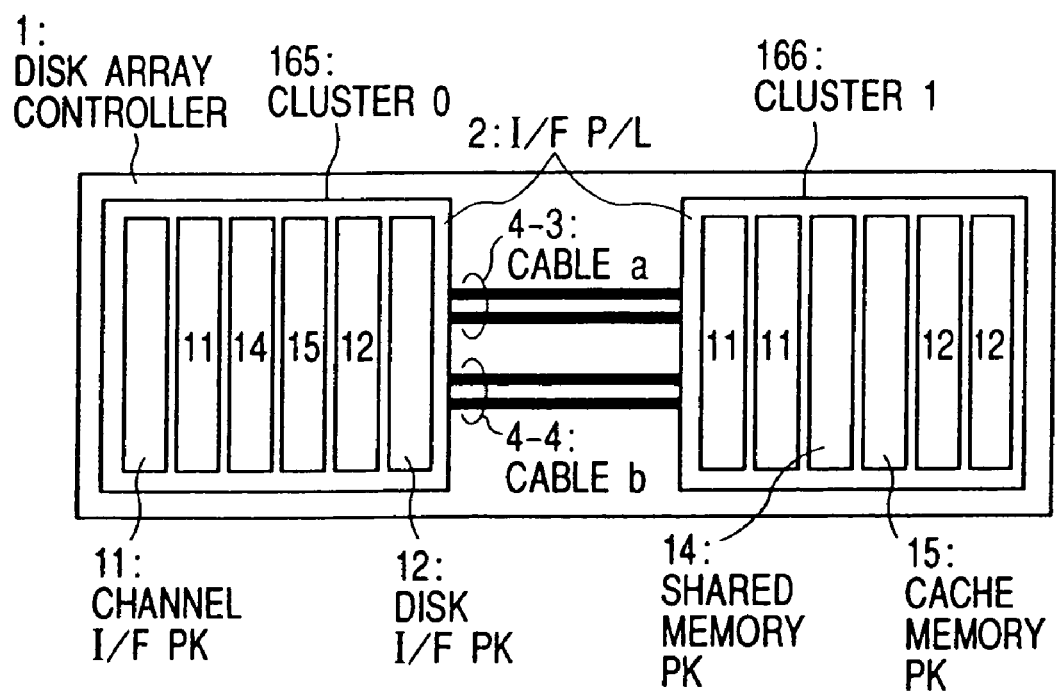
FIG. 19 shows another configuration in the rack-mounted form of a disk array controller according to this invention.

FIG. 19 illustrates one implementation of the disk array controller 1 shown in FIG. 17 for embodiment 4. FIG. 19 is different from FIG. 18 for embodiment 4 only in that a cluster contains one shared memory package 14 and one cache memory package 15.

Figure 55:
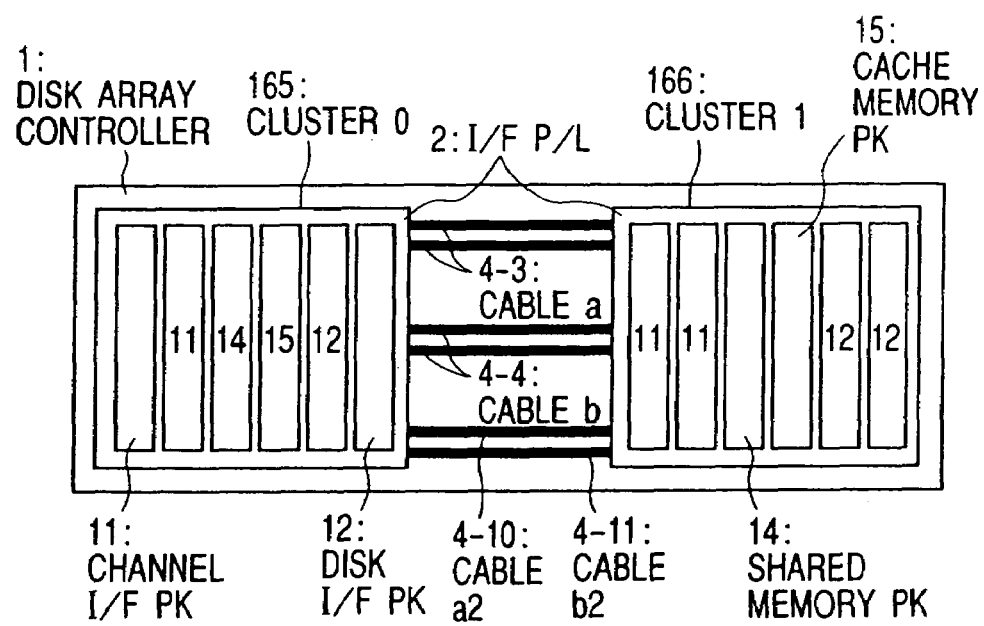
FIG. 55 shows another configuration in the rack-mounted form of a disk array controller according to this invention.

FIG. 55 illustrates one implementation of the disk array controller 1 shown in FIG. 53 for embodiment 5. FIG. 55 is different from FIG. 54 for embodiment 5 only in that a cluster contains one shared memory package 14 and one cache memory package 15.

Figure 68:
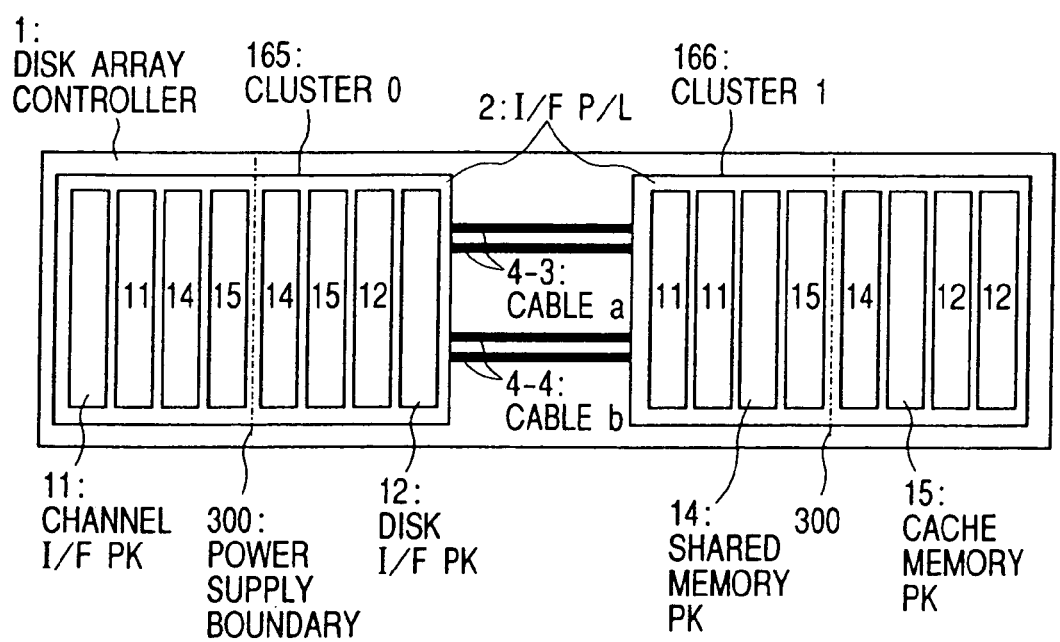
FIG. 68 shows another configuration in the rack-mounted form of a disk array controller according to this invention.

FIG. 68 shows a variation of the implementation shown in FIG. 67 for embodiment 6. Each of the interface platters is divided by a power supply boundary 300 into two areas, to which power is separately supplied from two power supplies. One shared memory package 14 and one cache memory package 15 are mounted in one of these areas energized by different power supplies.

Embodiment 14

Figure 12:
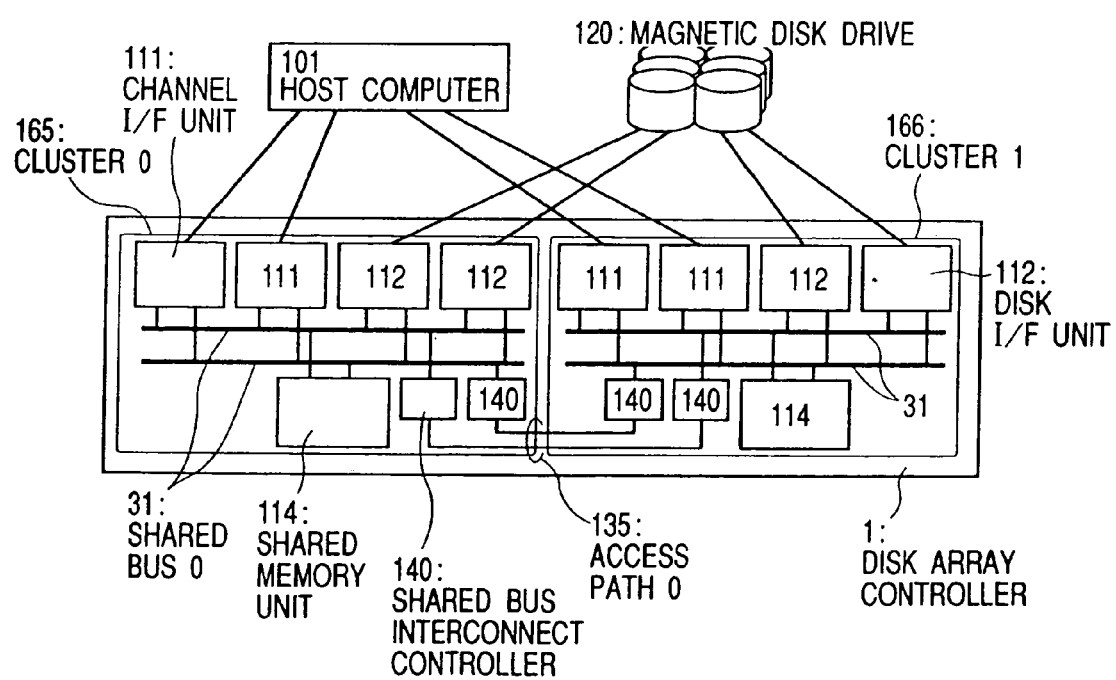
FIG. 12 shows another configuration of a disk array controller according to this invention.

FIG. 12 shows another embodiment of this invention.

FIG. 12 shows the configuration of another disk array controller according to this invention. The disk array controller 1 has the following: channel interface units 111; disk interface units 112; shared memory units 114; two shared buses 0 (31) which connect them; shared bus interconnect controllers 140 for connection of the shared buses 0 (31) from different clusters; and access paths 0 (135). The relationship among the channel interface units 111, disk interface units 112 and shared memory units 114 is the same as in embodiment 7.

In this embodiment, two channel interface units 111, two disk interface units 112, one shared memory unit 114, two shared buses 0 (31) and two shared bus interconnect controllers 140 constitute one group, which is here called a cluster. In this embodiment, the disk array controllers has two clusters (165, 166).

The shared bus interconnect controllers 140 work as follows to connect shared buses from different clusters.

For access from a channel interface unit 111 or disk interface unit 112 within one cluster to the shared memory 114 in the other cluster, the SM access circuit (not shown here) inside the channel interface unit 111 or disk interface unit 112 obtains the right to use the shared buses 0 (31) and then accesses a shared bus interconnect controller 140 connected with the shared buses 0 (31) to issue a request for access to the shared memory unit 114 within the other cluster. That shared bus interconnect controller 140 sends the access request to a shared bus interconnect controller 140 connected with the shared buses 0 (31) within the other cluster. After obtainment of the right to use the shared buses 0 (31), the shared bus interconnect controller connected with the shared buses 0 (31) within the other cluster sends the access request to the shared memory unit.

Figure 13:
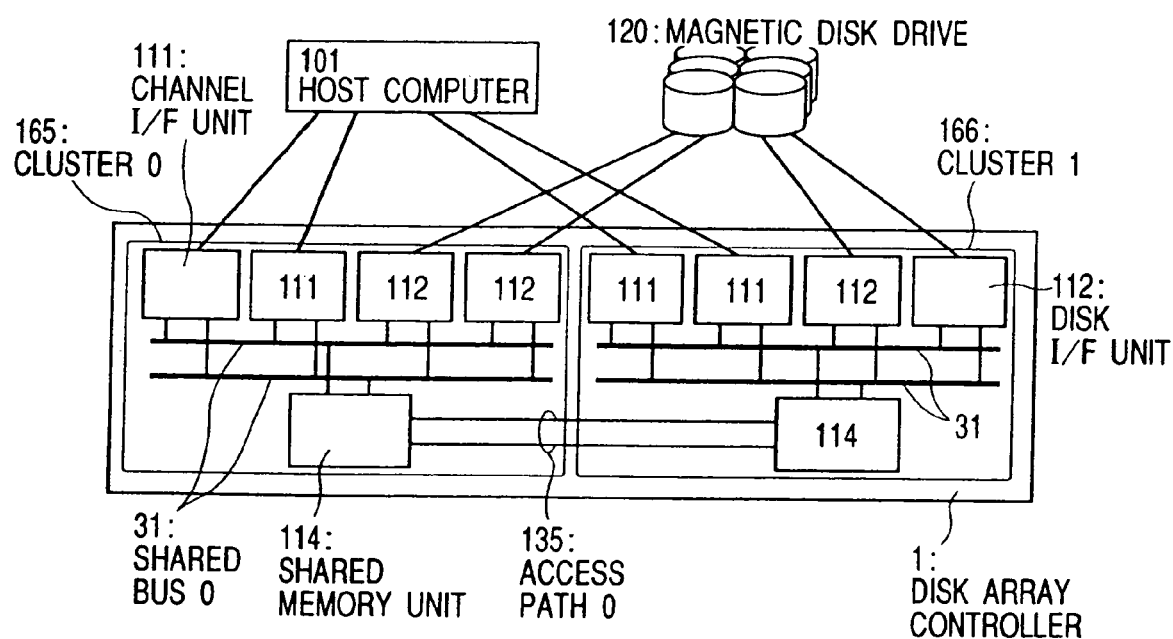
FIG. 13 shows another configuration of a disk array controller according to this invention.

For connection of the clusters, the shared memory units 114 may be interconnected via access paths 0 (135) as shown in FIG. 13. The disk array controller 1 operates as each of the channel interface units 111 and disk interface units 112 accesses the shared memory units; so, by interconnecting the shared memory units 114 as mentioned above, the channel interface units 111 and disk interface units 112 can each access the shared memory units 114.

Needless to say, the number of clusters is not limited as above.

One shared bus 0 (31) may be used instead of two. However, the use of two shared buses makes the access paths to the shared memory units 114 redundant, resulting in improved trouble resistance.

FIG. 11 shows the configuration of the disk array controller 1 in FIG. 12 or 13 in the rack-mounted form. The channel interface units 111, disk interface units 112 and shared memory units 114 as shown in FIG. 12 or 13 are separately packaged in channel interface packages 11, disk interface packages 12 and shared memory packages 14, respectively. Channel interface packages 11, disk interface packages 12 and a shared memory package 14, all of which constitute one cluster, are mounted on one interface platter 2. Shared buses 0 (31) are wired on the interface platter 2 and shared bus interconnect controllers 140 are directly mounted thereon (these are not shown in the figure). In the configuration in FIG. 13, the shared buses are wired on the interface platter 2 but the shared bus interconnect controllers 140 are not mounted thereon.

In adding an interface platter 2, the new interface platter 2 and the existing interface platters 2 are connected by two cables 4. In case of the disk array controller 1 in FIG. 12, these cables correspond to cables for the access paths 0 (135) which connect shared bus interconnect controllers 140 within one cluster, with those within the other cluster, while, in case of the disk array controller 1 in FIG. 13, they are cables for the access paths 0 (135) which connect the shared memory unit 114 within one cluster with that in the other cluster.

This configuration not only produces the same effects as those of embodiment 7 but also a further effect: Since each cluster contains a shared memory unit 114, this disk array controller is less scalable than that in embodiment 7 but the number of cables used can be decreased, leading to cost reduction and higher implementation efficiency.

Variations of this embodiment are introduced below.

Figure 35:
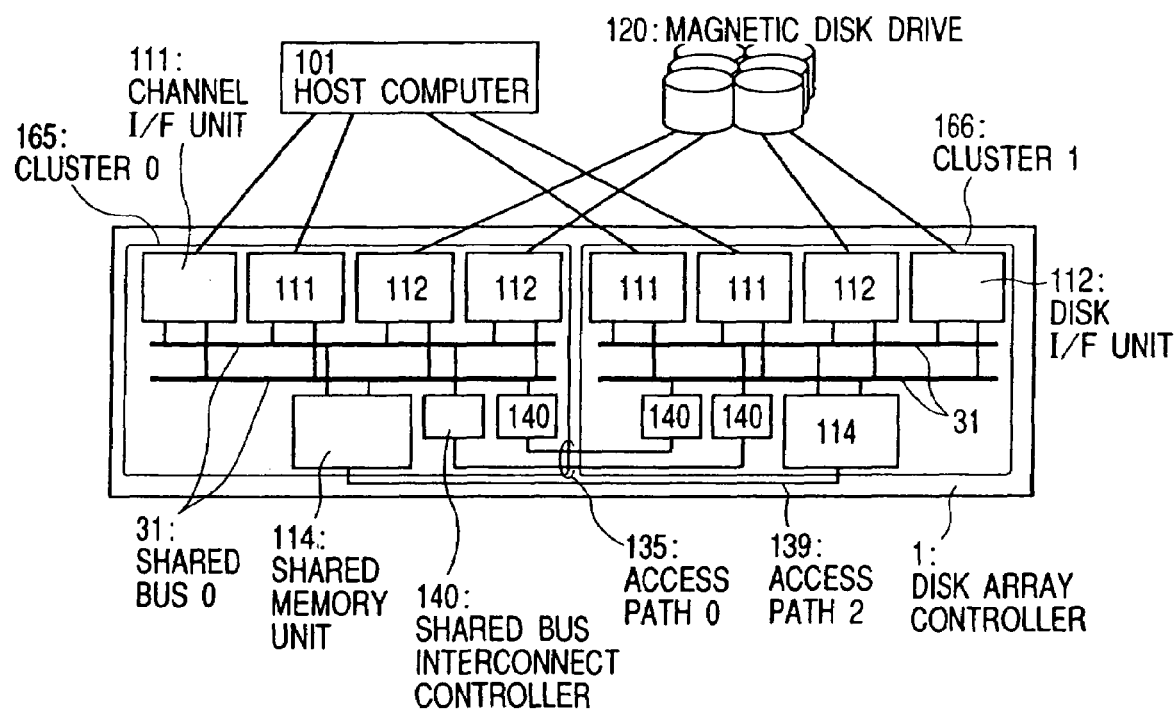
FIG. 35 shows another configuration of a disk array controller according to this invention.
Figure 36:
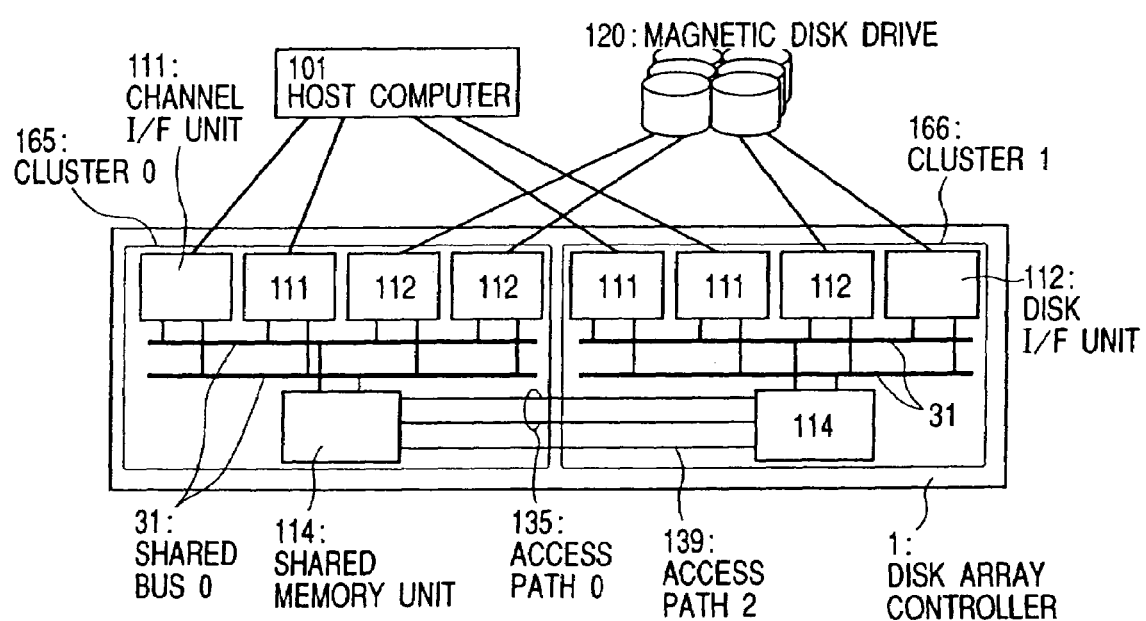
FIG. 36 shows another configuration of a disk array controller according to this invention.

FIG. 35 shows a variation of this embodiment in which, in the disk array controller 1 in FIG. 12, two shared memory units 114 are interconnected via access path 2 (139) to make a dual system as in embodiment 2. FIG. 33 illustrates the configuration of the disk array controller 1 in FIG. 35 in the rack-mounted form. Two shared memory units 114 are separately packaged in shared memory packages 14, which are mounted on different interface platters 2. The interface platters 2 are interconnected by cable 2 (4-9). The cable 2 (4-9) is a cable for access path 2 (139). In case of the disk array controller 1 in FIG. 13, the same dual system effect can be obtained by connecting the shared memory unit 114 within one cluster with that within the other cluster via access path 2 (139) as shown in FIG. 36.

It is also possible that one access path serves as both access path 0 (135) for access from a channel interface unit 111 or disk interface unit 112 within one cluster to the shared memory unit 114 within the other cluster, and the access path 2 (139) to make a dual system. It must be noted that the throughput of such an access path should be higher than the sum of the throughput of the access paths 0 (135) and that of the access path 2 (139); otherwise, the overall throughput of the disk array controller 1 would deteriorate.

This produces the same effects as those of embodiment 2.

Another possible approach to making a dual system is that one cluster contains two interconnected shared memory units 114 instead of interconnecting two shared memory units 114 of different clusters.

FIG. 46 shows a variation in which a shared memory unit 114 is added to one cluster and the two shared memory units 114 in the cluster are separately packaged in shared memory packages 14, which are mounted on the two areas of the interface platter 2 divided by a power supply boundary 300 as in embodiment 3.

This produces the same effects as those of embodiment 3.

Figure 21:
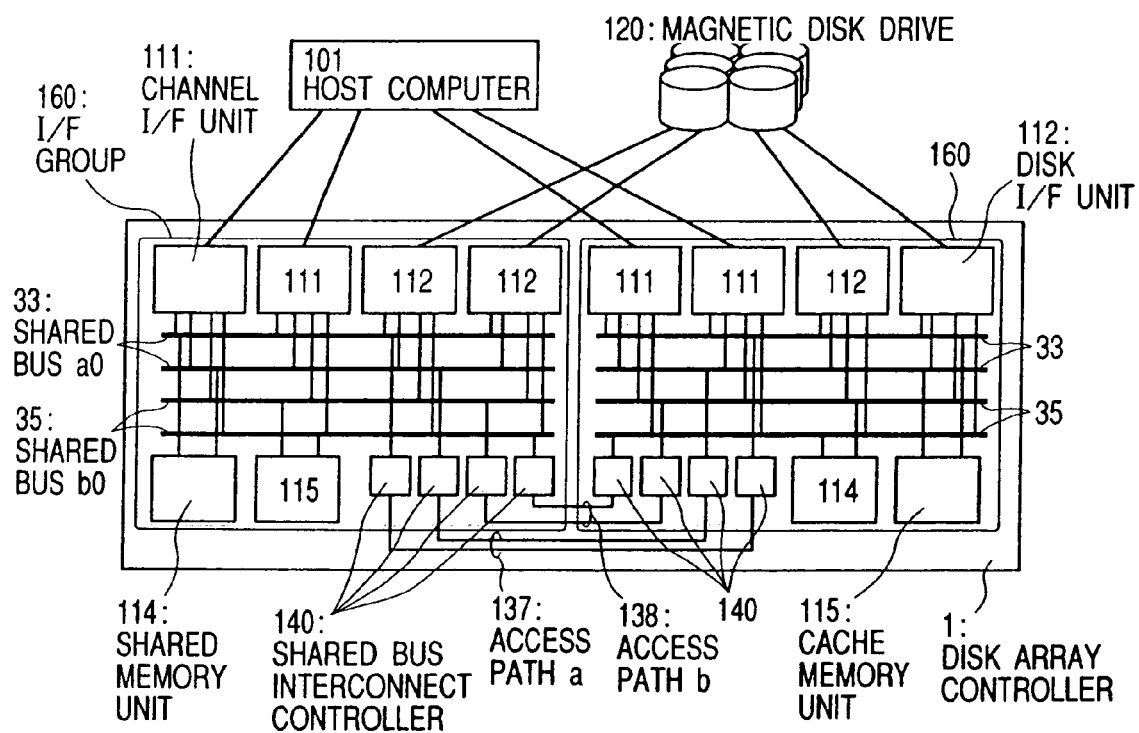
FIG. 21 shows another configuration of a disk array controller according to this invention.

FIG. 21 shows a variation of the disk array controller 1 in FIG. 12 in which the cache memory units 115 for storing data to be recorded in magnetic disk drives 120 and the shared memory units 114 for storing control data for the cache memory units 115 and disk array controller 1 are physically independent as in embodiment 4. Here, the shared buses 0 (31) shown in FIG. 12 are divided into shared buses b0 (35) for transmitting data from the magnetic disk drives 120 and shared buses a0 (33) for transmitting control data for the cache memory units 115 and disk array controller 1, and the channel interface units 111 and disk interface units 112 are connected to both the shared buses a0 (33) and shared buses b0 (35). Further, the cache memory units 115 and shared memory units 114 are connected to the shared buses b0 (35) for transmitting data from the magnetic disk drives 120 and shared buses a0 (33) for transmitting control data for the disk array controller 1, respectively. Connections are made between the shared buses a0 (33) of the different clusters and between the shared buses b0 (35) of the different clusters through shared bus interconnect controllers 140, via access paths a (137) and access paths b (138), respectively. As a variation of the disk array controller 1 in FIG. 13, as shown in FIG. 22, connections are made between the shared memory units 114 of the different clusters and between the cache memory units 115 of the different clusters via access paths a (137) and access paths b (138), respectively.

Figure 22:
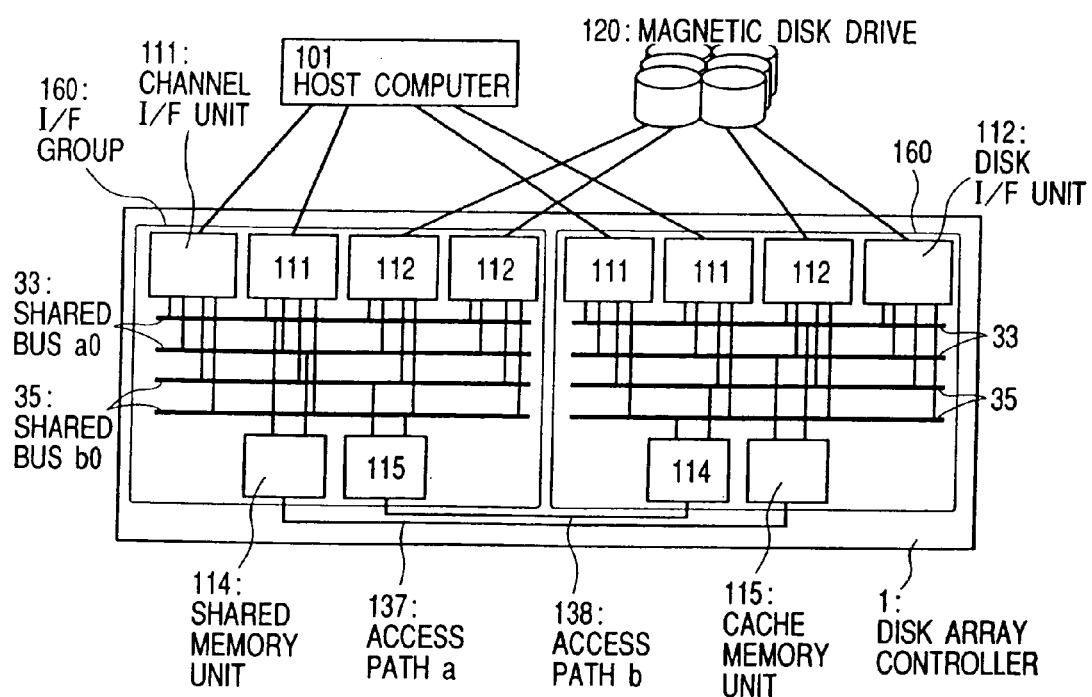
FIG. 22 shows another configuration of a disk array controller according to this invention.

FIG. 19 shows the configuration of the disk array controller 1 in FIG. 21 or FIG. 22 in the rack-mounted form. The cache memory units 115 and shared memory units 114 are separately packaged in cache memory packages 15 and shared memory packages 14, respectively, which are mounted on an interface platter 2. The cables 4 shown in FIG. 11 which interconnect interface platters 2 are divided into cables a (4-3) for access paths a (137) for connection between shared buses a0 (33) and cables b (4—4) for access paths b (138) for connection between shared buses b0 (35) as shown in FIG. 19.

This produces the same effects as those of embodiment 4.

Figure 57:
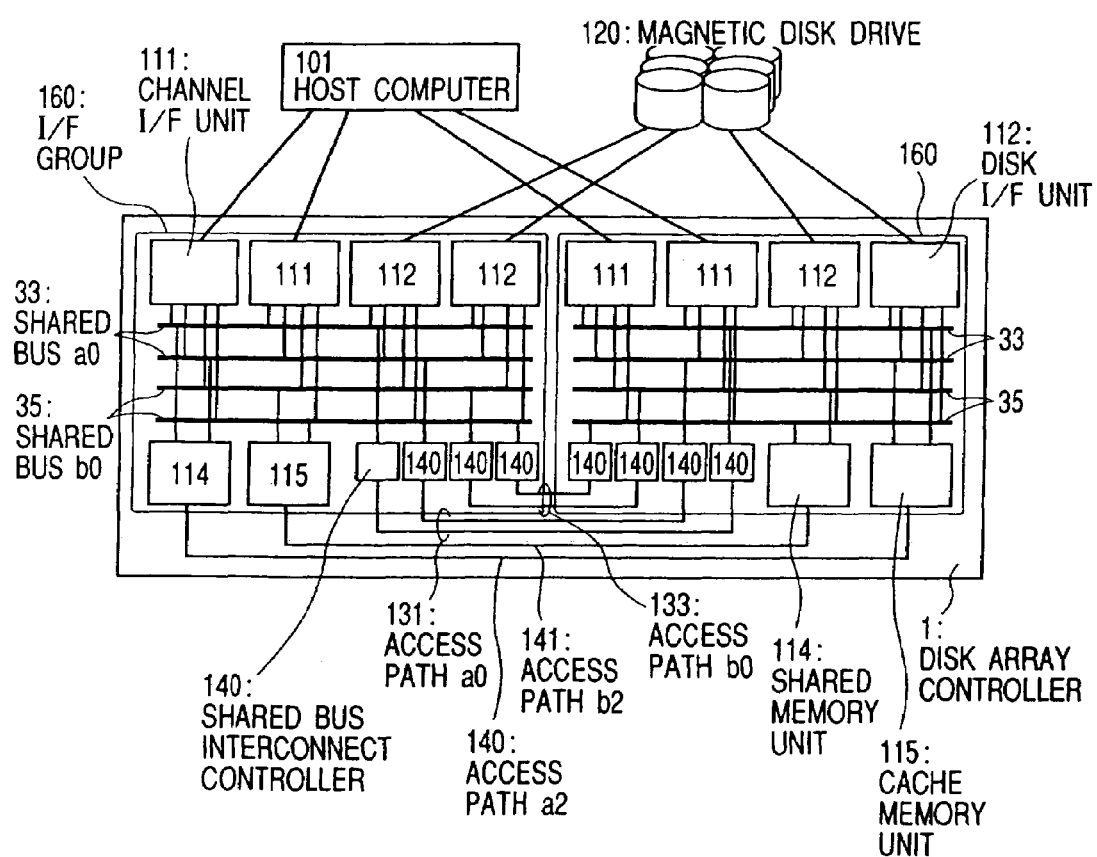
FIG. 57 shows another configuration of a disk array controller according to this invention.
Figure 58:
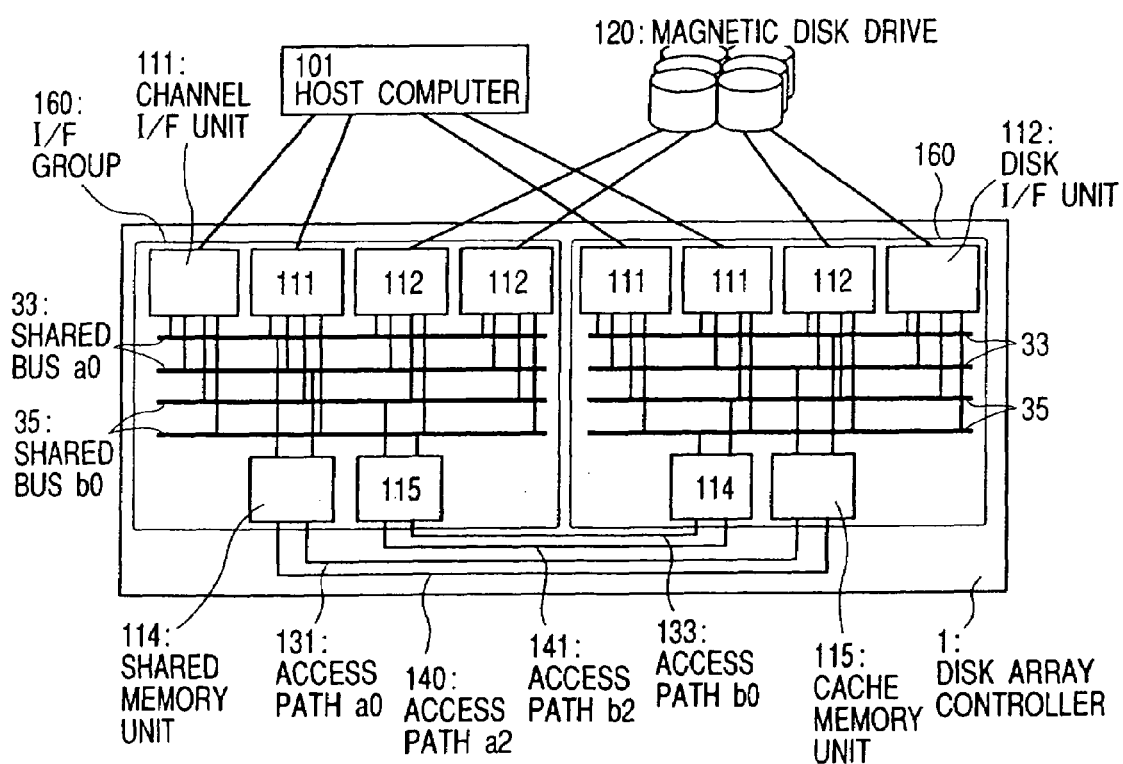
FIG. 58 shows another configuration of a disk array controller according to this invention.

FIG. 57 shows a variation of the disk array controller 1 in FIG. 12 in which the two shared memory units 114 are interconnected via access path a2 (140) and the two cache memory units 115 are interconnected via access path b2 (141) as in embodiment 5. As a variation of the disk array controller 1 in FIG. 13, access path a2 (140) and access path b2 (141) for a dual system should be provided as shown in FIG. 58. It is also possible that one access path serves as both access path a0 (131) for access from a channel interface unit 111 or disk interface unit 112 within one cluster to the shared memory unit 114 within the other cluster, and the access path a2 (140) to make a dual system. It is also possible that one access path serves as both access path b0 (133) for access from a channel interface unit 111 or disk interface unit 112 within one cluster to the cache memory unit 115 within the other cluster, and the access path b2 (141) to make a dual system. In that case, it must be noted that the throughput of such an access path for the shared memory units should be higher than the sum of the throughput of the access path a0 (131) and that of the access path a2 (140), and the throughput of such an access path for the cache memory units should be higher than the sum of the throughput of the access path b0 (133) and that of the access path b2 (141); otherwise, the overall throughput of the disk array controller 1 would deteriorate.

FIG. 55 shows the configuration of the disk array controller 1 in FIG. 57 or FIG. 58 in the rack-mounted form. The shared memory units 114 and cache memory units 115 are separately packaged in shared memory packages 14 and cache memory packages 15, respectively, which are mounted on different interface platters 2, with the interface platters 2 being interconnected by cable a2 (4-10) and cable b2 (4-11). The cable a2 (4-10) is a cable for the access path a2 (140) and the cable b2 (4-11) is a cable for the access path b2 (141).

This produces the same effects as those of embodiment 5.

Another possible approach to making a dual system is that one cluster contains two interconnected shared memory units 114 and two interconnected cache memory units 115 instead of interconnecting two shared memory units 114 and two cache memory units 115 of different clusters as in FIGS. 57 and 58.

FIG. 68 shows a variation which uses two pairs of interconnected shared memory packages 14 and two pairs of interconnected cache memory packages 15, where one shared memory package and one cache memory package are mounted on each of the two areas of the interface platter 2 divided by a power supply boundary 300 as in embodiment 6.

This produces the same effects as those of embodiment 6.

Embodiment 15

Figure 14:
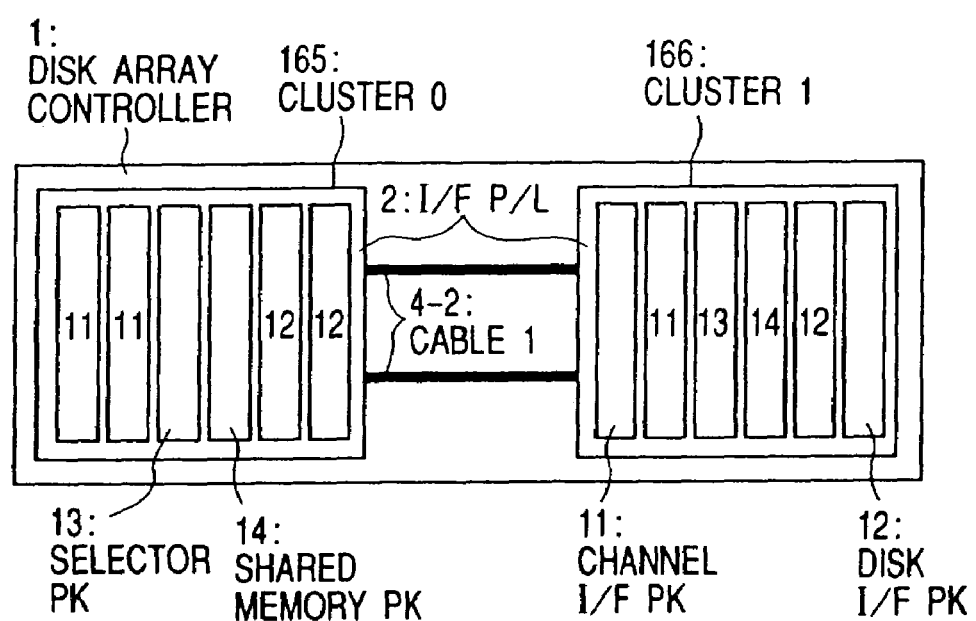
FIG. 14 shows another configuration in the rack-mounted form of a disk array controller according to this invention.

FIG. 14 shows another embodiment of this invention.

FIG. 14 shows one configuration of the disk array controller 1 shown in FIG. 7 for embodiment 11 in the rack-mounted form. A selector group 150, which consists of one selector package 13, and channel interface packages 11 and disk interface packages 12 which are connected with it, and one shared memory package 14 are mounted on one interface platter 2. All these on the platter constitute one cluster as defined earlier.

In adding an interface platter 2, the new interface platter 2 and the existing interface platters 2 are connected by two cables 1 (4-2). These cables 1 (4-2) are cables for the access paths 1 (136) which connect the selector unit 113 within one cluster, with the shared memory unit 114 within the other cluster. In short, the configuration of this embodiment is different from the configuration of embodiment 11 shown in FIG. 6 in that each shared memory package is mounted on an interface platter 2.

Figure 15:
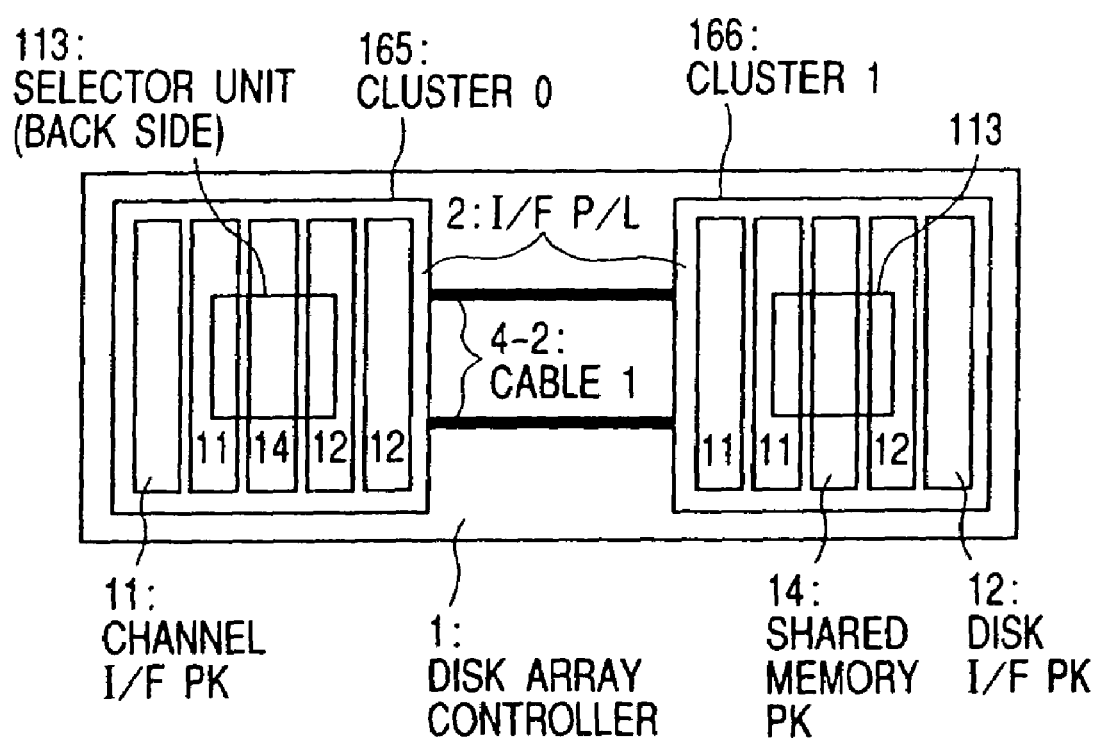
FIG. 15 shows another configuration in the rack-mounted form of a disk array controller according to this invention.

Although the selector units 113 are mounted in selector packages 13 in this example, they may be directly mounted on the reverse of the package bearing surface of the interface platters 2 without packaging them in packages as shown in FIG. 15 (the figure shows the backside of the platters). This reduces the required width of each interface platter 2 by the amount equivalent to the width of the selector package 13, permitting the rack for the disk array controller 1 to be more compact.

Although each of the two clusters contains a shared memory package 14 in this example, it is also acceptable that one cluster contains all the shared memory packages 14 used in the disk array controller 1 while the other cluster has no shared memory package 14. This can decrease the number of cluster interconnection cables 1 (4-2) shown in FIG. 14 to one, which leads to cost reduction.

This configuration not only produces the same effects as those of embodiment 11 but also a further effect: Since each cluster contains a shared memory unit 114, this disk array controller is less scalable than that of embodiment 11 but the number of cables used can be decreased, leading to cost reduction and higher implementation efficiency.

Variations of this embodiment are introduced below. These variations are different from the variations of embodiment 11 only in that shared memory packages 14 are mounted on interface platters 2; they are briefly outlined next.

In these variations, it is also acceptable that the selector packages 113 are directly mounted on the reverse of the package bearing surface of the interface platters 2, without packaging them in packages (the figure shows the backside of the platters).

Figure 39:
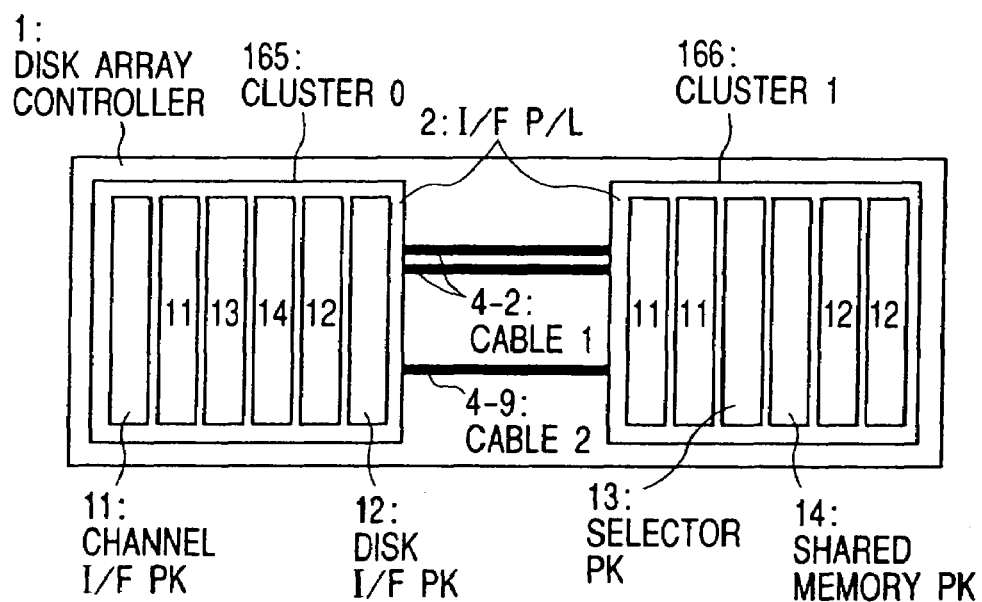
FIG. 39 shows another configuration in the rack-mounted form of a disk array controller according to this invention.

FIG. 39 illustrates a configuration in the rack-mounted form of the disk array controller 1 of embodiment 11 in FIG. 37. In this variation, two shared memory units 114 are interconnected in the same way as in embodiment 2.

This produces the same effects as those of embodiment 2.

In this variation, the shared memory units 114 are interconnected via access path 2 (139) to make a dual system; however, instead, the same dual system effect can be obtained by writing the same data in both the shared memory units 114 from the channel interface units 111, disk interface units 112 or selector units 113. In this case, it is unnecessary to interconnect the shared memory units 114 via access path 2 (139). However, if they are interconnected via access path 2 (139), the data in the two shared memory units 114 can be directly cross-checked for confirmation or a similar purpose, resulting in improved reliability.

Figure 48:
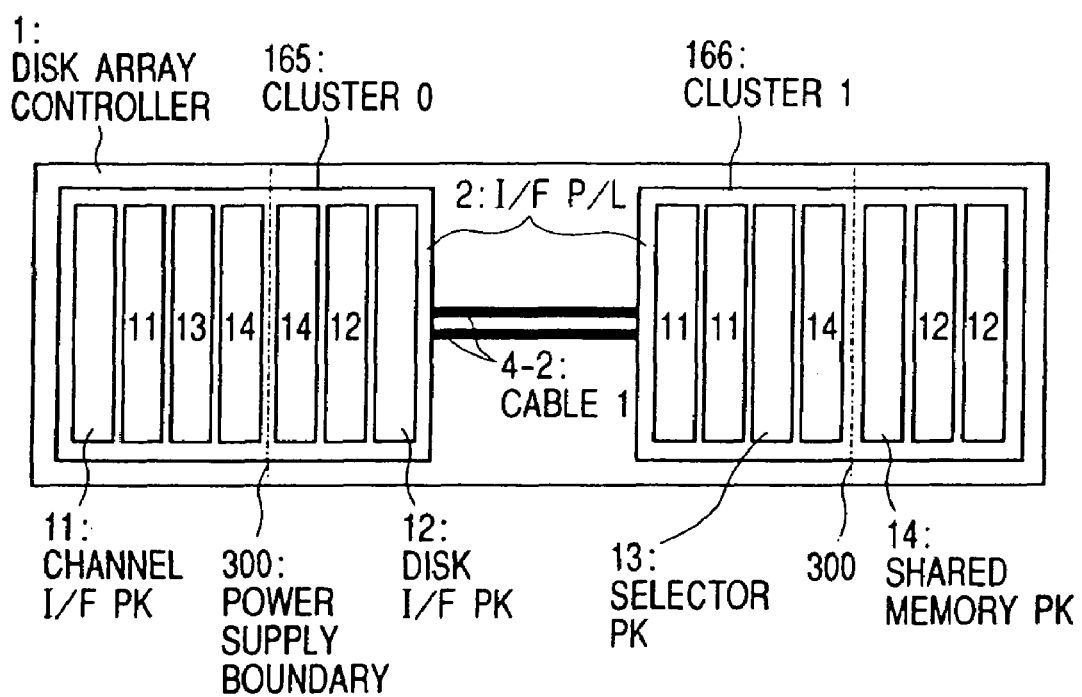
FIG. 48 shows another configuration in the rack-mounted form of a disk array controller according to this invention.

FIG. 48 shows a variation in which a shared memory unit 114 is added to one cluster and the two shared memory units 114 in the cluster are separately packaged in shared memory packages 14, which are mounted on the two areas of the interface platter 2 divided by a power supply boundary 300 as in embodiment 3.

This produces the same effects as those of embodiment 3.

Although each of the two clusters contains shared memory packages 14 in this example, it is also acceptable that one cluster contains all the shared memory packages 14 used in the disk array controller 1 while the other cluster has no shared memory packages 14. This can decrease the number of cluster interconnection cables 1 (4-2) in FIG. 48 to one, which leads to cost reduction and higher implementation efficiency.

FIG. 23 shows a variation in which, as in embodiment 4, each shared memory unit 114 of the disk array controller 1 in FIG. 7 is physically divided into a cache memory unit 115 for storing data to be recorded in magnetic disk drives 120, and a shared memory unit 114 for storing control data for the cache memory unit 115 and disk array controller 1. Selectors (CM selector units 123) connected to the cache memory units 115, and selectors (SM selector units 113) connected to the shared memory units 114 are physically independent, and access paths a0 (131) and access paths a1 (132) to the shared memory units 114, and access paths b0 (133) and access paths b1 (134) to the cache memory units 115, are independent of each other.

This produces the same effects as those of embodiment 4.

Figure 25:
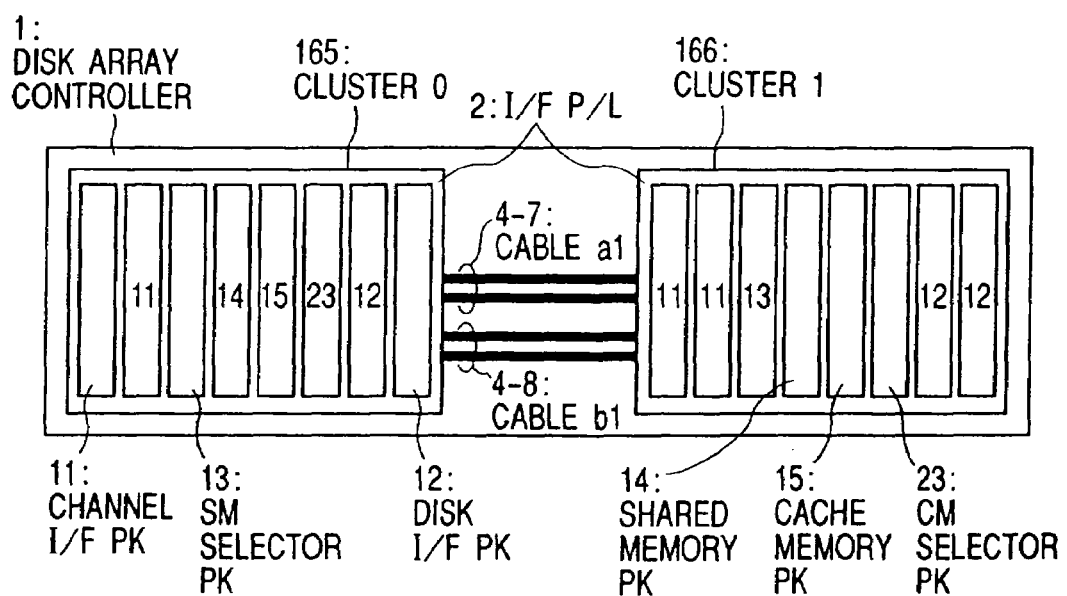
FIG. 25 shows another configuration in the rack-mounted form of a disk array controller according to this invention.

Although each of the two clusters contains a shared memory package 14 and a cache memory package 15 in this example, it is also acceptable that one cluster contains all the shared memory packages 14 and cache memory packages 15 used in the disk array controller 1 while the other cluster has no shared memory package 14 nor cache memory package 15. This can decrease the number of cluster interconnection cables a1 (4-7) and the number of cables b1 (4-8) shown in FIG. 25 to one, which leads to cost reduction.

FIG. 59 shows a variation in which two shared memory units 114 are interconnected via access path a2 (140) and two cache memory units 115 are interconnected via access path b2 (141) to make a dual system.

Figure 61:
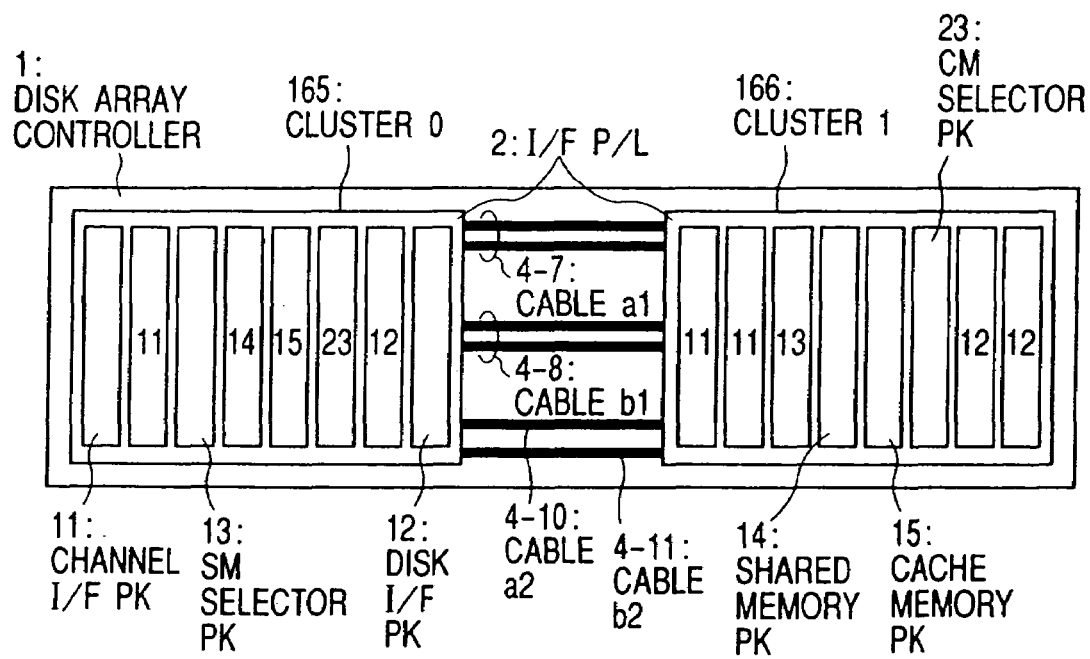
FIG. 61 shows another configuration in the rack-mounted form of a disk array controller according to this invention.

FIG. 61 shows the configuration of the disk array controller 1 in FIG. 59 in the rack-mounted form. One shared memory package 14 and one cache memory package 15 are mounted on an interface platter 2, with the interface platters 2 being interconnected by cable a2 (4-10) and cable b2 (4-11). The cable a2 (4-10) is a cable for the access path a2 (140) and the cable b2 (4-11) is a cable for the access path b2 (141).

This produces the same effects as those of embodiment 5.

In this variation, the shared memory units 114 are interconnected via access path a2 (140) and the cache memory units 115 via access path b2 (141) to make a dual system; however, instead, the same dual system effect can be obtained by writing the same data in both the shared memory units 114 or both the cache memory units 115 from the channel interface units 111, disk interface units 112 or SM selector units 113 or CM selector units 123. In this case, it is unnecessary to interconnect the shared memory units 114 via access path a2 (140) or the cache memory units 115 via access path b2 (141). However, if they are interconnected via access path a2 (140) or b2 (141), the data in the two shared memory units 114 or two cache memory units 115 can be directly cross-checked for confirmation or a similar purpose, resulting in improved reliability.

Figure 70:
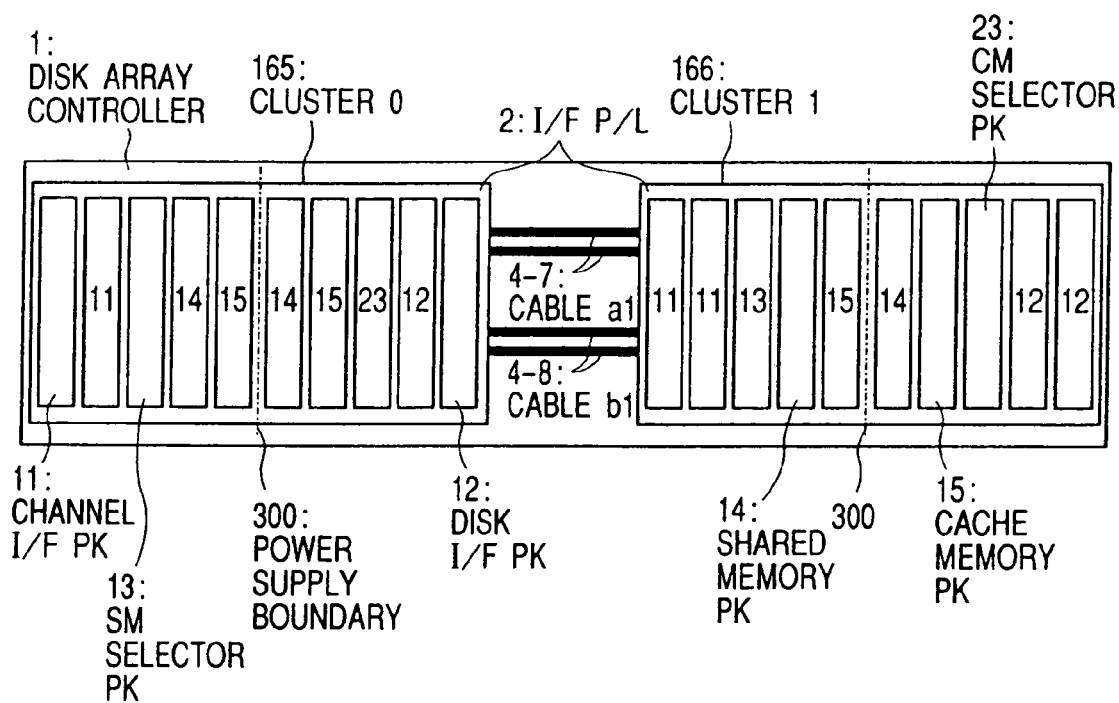
FIG. 70 shows another configuration in the rack-mounted form of a disk array controller according to this invention.

FIG. 70 shows a variation in which two shared memory packages 14 and two cache memory packages 15 are contained in one cluster instead of one memory package 14 and one cache memory package 15 in each of the clusters shown in FIG. 59, where one set which consists of one shared memory package 14 and one cache memory package 15 is mounted on each of the two areas of the interface platter 2 divided by a power supply boundary 300.

This produces the same effects as those of embodiment 6.

It is also acceptable that one cluster contains all the shared memory packages 14 and cache memory packages used in the disk array controller 1 while the other cluster has no shared memory package 14 nor cache memory package 15. This can decrease the number of cluster interconnection cables a1 (4-7) and the number of cables b1 (4-8) shown in FIG. 70 to one, which leads to cost reduction.

Embodiment 16

Figure 16:
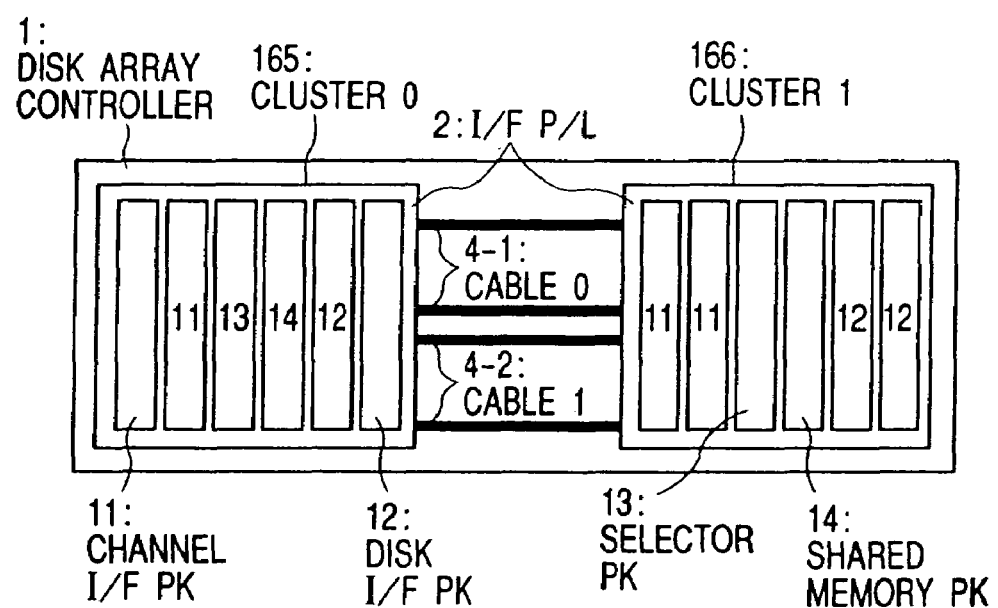
FIG. 16 show another configuration in the rack-mounted form of a disk array controller according to this invention.

FIG. 16 shows another embodiment of this invention.

FIG. 16 illustrates one configuration in the rack-mounted form of the disk array controller 1 of embodiment 12 shown in FIG. 10. This configuration is different from that of embodiment 12 in FIG. 9 in that the shared memory units in FIG. 10 are contained in clusters.

In this configuration, as compared to the configuration in FIG. 9, the number of access paths 1 (136) which connect the selector units (113) and shared memory units 114 can be decreased, which decreases the number of cables used in the disk array controller housed in the rack, leading to cost reduction.

Although the selector units 113 are packaged in selector packages 13 in this example, they may be directly mounted on the reverse of the package bearing surface of the interface platters 2 without packaging them in packages (the figure shows the backside of the platters). This reduces the required width of each interface platter 2 by the amount equivalent to the width of the selector package 13, permitting the rack for the disk array controller 1 to be more compact.

Although each of the two clusters contains a shared memory package 14 in this example, it is also acceptable that one cluster contains all the shared memory packages 14 used in the disk array controller 1 while the other cluster has no shared memory package 14. This can decrease the number of cluster interconnection cables 1 (4-2) shown in FIG. 16 to one, which leads to cost reduction.

Variations of this embodiment are introduced below. These variations are different from the variations of embodiment 12 only in that shared memory units 114 are contained in clusters; they are briefly outlined next.

Again, by mounting the selector units 113 directly on the reverse of the package bearing surface of the interface platters 2 (the figure shows the backside of the platters), the required width of each interface platter 2 can be reduced, permitting the rack for the disk array controller 1 to be more compact.

Figure 44:
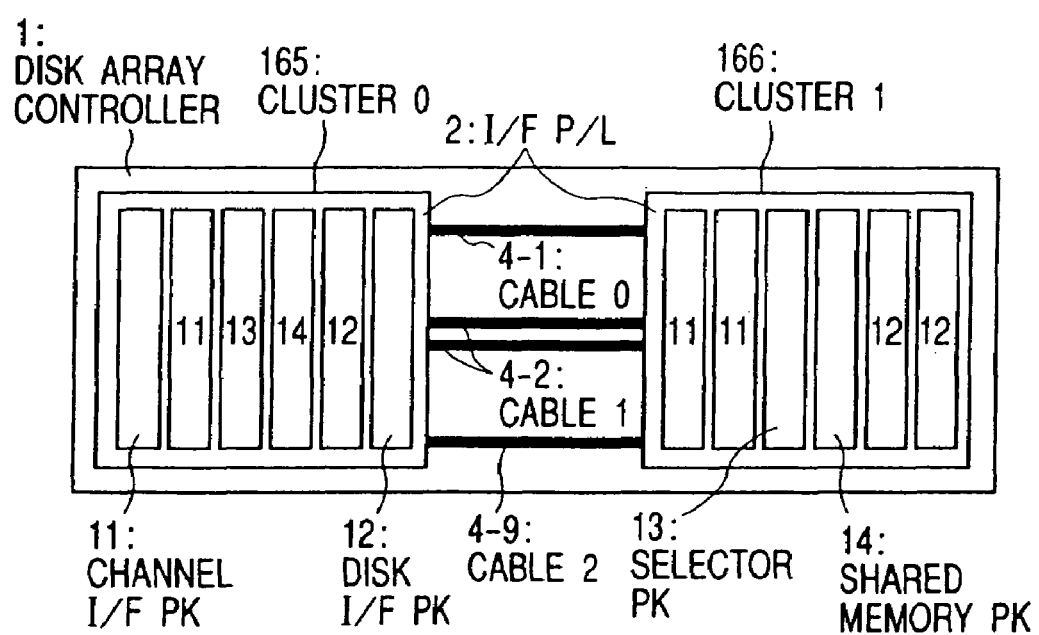
FIG. 44 shows another configuration in the rack-mounted form of a disk array controller according to this invention.

FIG. 44 shows a variation of the disk array controller 1 in FIG. 42, in which two shared memory units 114 are separately packaged in shared memory packages 14, which are mounted on different interface platters 2.

Also, the same dual system effect can be obtained by writing the same data in both the shared memory units 114 from the channel interface units 111, disk interface units 112 or selector units 113. In this case, it is unnecessary to interconnect the shared memory units 114 via access path 2 (139). However, if they are interconnected via access path 2 (139), the data in the two shared memory units 114 can be directly cross-checked for confirmation or a similar purpose, resulting in improved reliability.

Figure 52:
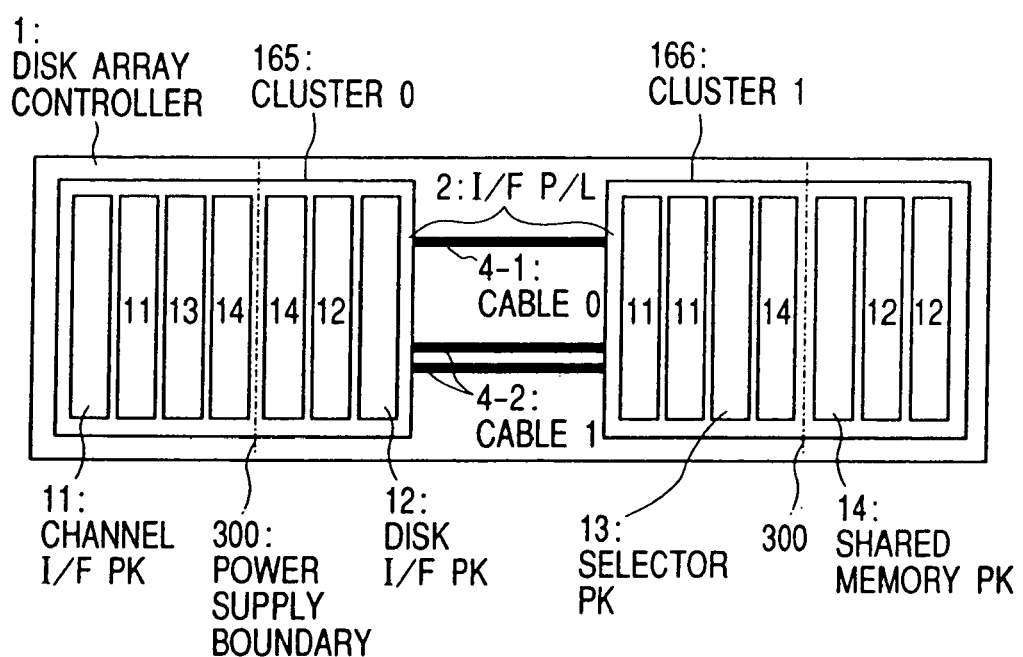
FIG. 52 shows another configuration in the rack-mounted form of a disk array controller according to this invention.

FIG. 52 shows a variation of the configuration in FIG. 42 in which one cluster contains two shared memory packages 14 instead of one, where one shared memory package 14 in a dual system is mounted on each of the two areas of each interface platter 2 divided by a power supply boundary 300 as in embodiment 3.

Although each of the two clusters contains shared memory packages 14 in this example, it is also acceptable that one of the two clusters contains all the shared memory packages 14 used in the disk array controller 1 while the other cluster has no shared memory packages 14.

Figure 30:
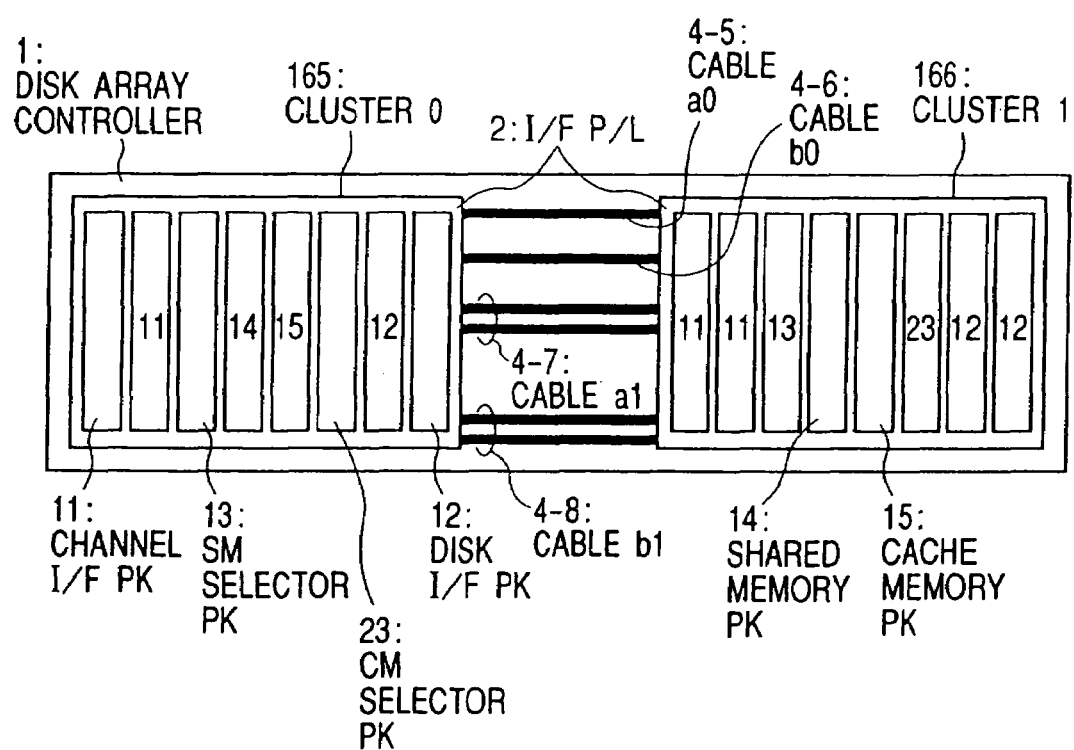
FIG. 30 shows another configuration in the rack-mounted form of a disk array controller according to this invention.

FIG. 30 illustrates a variation in which, as in embodiment 4, each shared memory unit 114 is physically divided into a cache memory unit 115 for storing data to be recorded in magnetic disk drives 120, and a shared memory unit 114 for storing control data for the cache memory unit 115 and the disk array controller 1.

Since in this configuration, the access paths from the channel interface packages 11 and disk interface packages 12 to the cache memory packages 15 or shared memory packages 14 are physically independent, it is possible to distinguish between two types of faults, faults related to access to the cache memory units 115 (faults in the cache memory units 115, or the CM selector units 123, access paths b0 (133), access paths b1 (134) or others for access to them) and faults related to access to the shared memory units 114 (faults in the shared memory units 114 or the SM selector units 113, access paths a0 (131), access paths a1 or others for access to them) so that defective parts can be independently repaired without affecting other parts.

Although each of the two clusters contains a shared memory package 14 and a cache memory package 15 in this example, it is also acceptable that one cluster contains all the shared memory packages 14 and cache memory packages 15 used in the disk array controller 1 while the other cluster has no shared memory package 14 nor cache memory package 15.

Figure 66:
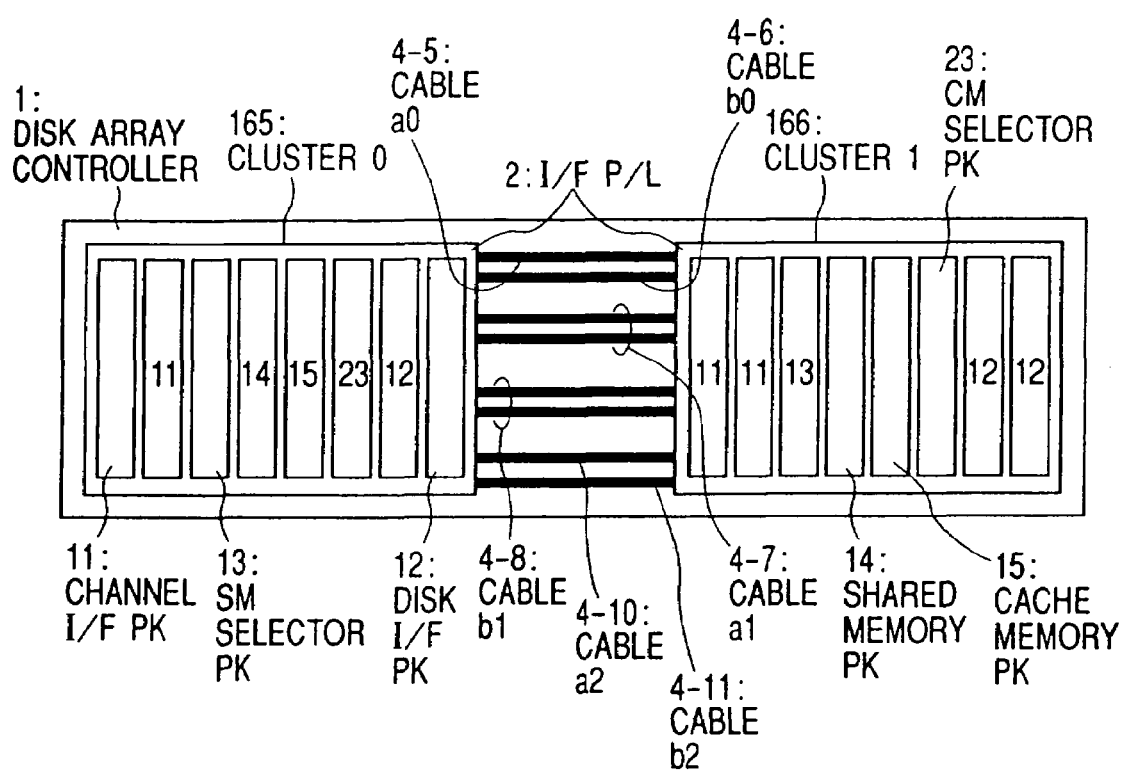
FIG. 66 shows another configuration in the rack-mounted form of a disk array controller according to this invention.

FIG. 66 shows a variation in which two shared memory units 114 are interconnected via access path a2 (140) and two cache memory units 115 via access path b2 (141) as in embodiment 5.

This produces the same effects as those of embodiment 5.

In this embodiment, the shared memory units 114 are interconnected via access path a2 (140) and the cache memory units 115 via access path b2 (141) to make a dual system; however, instead, the same dual system effect can be obtained by writing the same data in both the shared memory units 114 or both the cache memory units 115 from the channel interface units 111, disk interface units 112, or SM selector units 113 or CM selector units 123. In this case, it is unnecessary to interconnect the shared memory units 114 or cache memory units via access path a2 (140) or access path b2 (141). However, if they are interconnected with access path a2 (140) or access path b2 (141), the data in the two shared memory units 114 or the two cache memory units 115 can be directly cross-checked for confirmation or a similar purpose, resulting in improved reliability.

Figure 74:
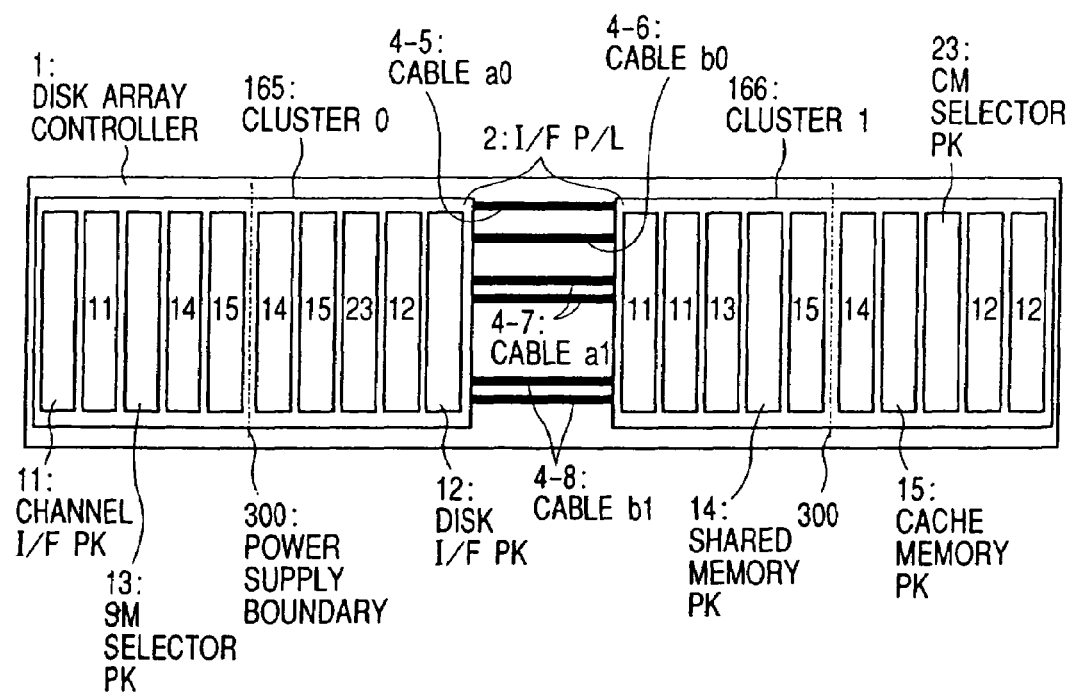
FIG. 74 shows another configuration in the rack-mounted form of a disk array controller according to this invention.

FIG. 74 shows a variation in which one cluster contains two shared memory packages 14 and two cache memory packages 15, where a set which consists of one shared memory package 14 and one cache memory package 15 is mounted on each of the two areas of the interface platter 2 divided by a power supply boundary 300, as in embodiment 6.

This produces the same effects as those of embodiment 6.

Although each of the two clusters contains shared memory packages 14 and cache memory packages 15 in this example, it is also acceptable that one cluster contains all the shared memory packages 14 and cache memory packages 15 used in the disk array controller 1 while the other cluster has no shared memory package 14 nor cache memory package 15.

Embodiment 17

Figure 75:
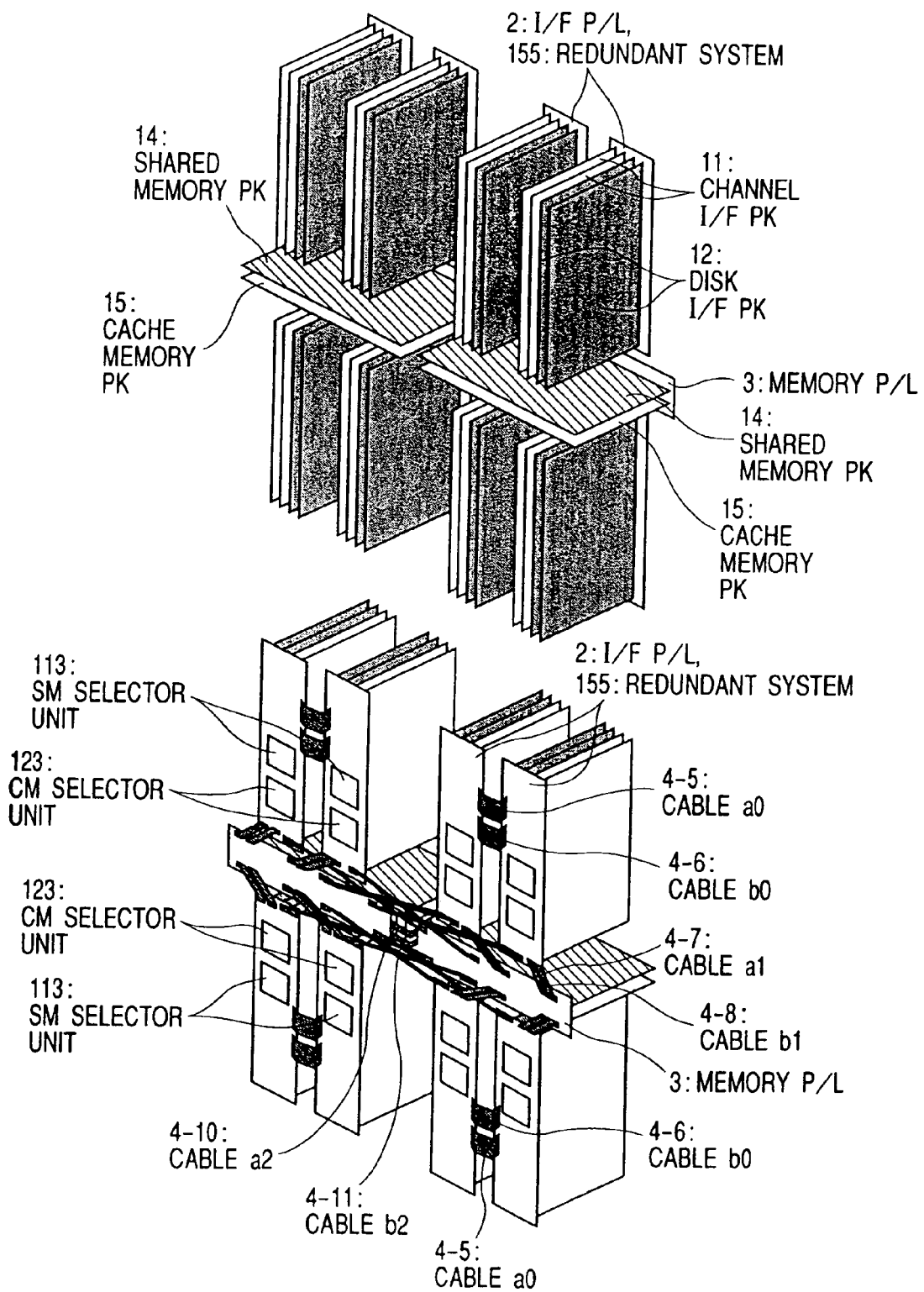
FIG. 75 shows one form of implementation of platters in a disk array controller according to this invention.
Figure 77:
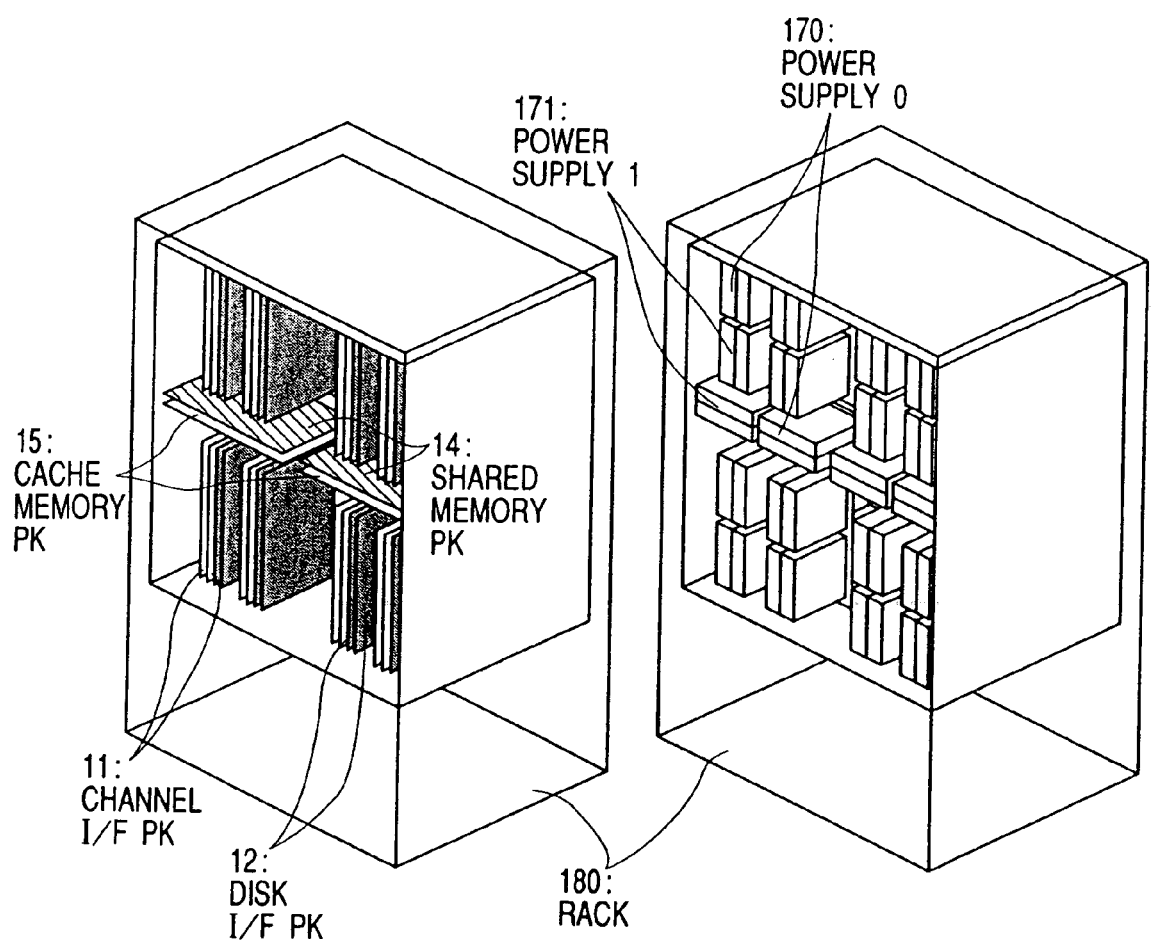
FIG. 77 shows a rack housing a disk array controller according to this invention.

FIGS. 75 and 77 show another embodiment in which the disk array controller 1 of embodiment 12 in FIG. 64 is mounted in the rack.

FIG. 75 illustrates how packages are mounted on platters and how the platters are positioned and interconnected. Each interface platter 2 bears two channel interface packages 11 and two disk interface packages 12, which constitute one selector group 150. The selector units (SM selector units) 113 connected to the shared memory packages, and the selector units (CM selector units) 123 connected to the cache memory packages are mounted on the backside of the interface platters 2. This arrangement can decrease the required width of the interface platters 2. Two interface platters make up a redundant system 155.

The disk array controller 1 has eight interface platters 2 which make up four redundant systems 155. One memory platter 3 bears one shared memory package 14 and two cache memory packages 15. To make a dual memory system, two memory platters 3 are provided.

Between two interface platters which constitute a redundant system, the channel interface packages 11 and disk interface packages 12 are connected with the SM selector units 113 and CM selector units 123 by cable a0 (4-5) and cable b0 (4-6), respectively.

Here, when two cables a0 (4-5) and two cables b0 (4-6) are used and one of the two cables is used for the access path to connect the interface units within one selector group 150 with the selector units within the other selector group 150, and the other cable is used for the access path to connect the selector units within the former selector group 150 with the interface units within the latter selector group 150, even if one of the access paths fails, the cable a0 (4-5) or cable b0 (4-6) can be replaced without affecting the other access path.

Each interface platter 2 is connected with four cables from two memory platters 3, where one cable a1 (4-7) and one cable b1 (4-8) come from each memory platter. This means that each memory platter is connected with a total of 16 cables from eight interface platters 2, where one cable a1 (4-7) and one cable b1 (4-8) come from each interface platter. The memory platters 3 are interconnected by cable a2 (4-10) and cable b2 (4-11).

Connectors for the cables which interconnect the platters are located on the backside of the platters, where the inter-platter cables are connected. This eliminates the need for detouring the inter-platter cables around the cables (not shown) for connection with the host computer 101 at the sub edge side of the channel interface packages 11 (opposite to the side where the packages are connected with the platters) or the cables (not shown) for connection with the magnetic disk drives 120 at the sub edge side of the disk interface packages 12, shortening the required cable length.

As mentioned earlier, the cables used here are expensive. Data transmission at high frequencies by cables could cause noise, which often makes the implementation difficult. For this reason, to shorten the cable length offers a great advantage.

In this embodiment, the interface platters 2 and memory platters 3 are virtually perpendicular to each other. This makes it possible to locate the connectors for the cables which connect the interface platters 2 and memory platters 3 so that the cables can be shortened as shown in FIG. 75.

FIG. 75 shows that the interface platters 2 are vertical to the horizontal plane and the memory platters 3 are parallel to the horizontal plane; however, they may be oriented vice versa.

Also as shown in FIG. 75, the interface platters 2 may be located so that the memory platters 3 are sandwiched by them. This can also shorten the cables which connect the interface and memory platters.

FIG. 77 shows the platters in FIG. 75 which is housed in the rack 180. The platters bearing the packages are located on the front side in the rack and power supplies 0 (170) and 1 (171) are located behind them.

The power supplies 0 (170) and 1 (171) are separately connected with the platters, which facilitates power supply control during platter replacement.

As shown in FIG. 77, power may be supplied to each platter from a dual power supply system consisting of a power supply 0 (170) and a power supply 1 (171). When such a dual power supply system is used, even if one of the power supplies fails, the other power supply is used; therefore, it is unnecessary to shut down the packages on the platter which has been energized by the defective power supply, decreasing the number of system components to be stopped in case of failure.

Embodiment 18

Figure 76:
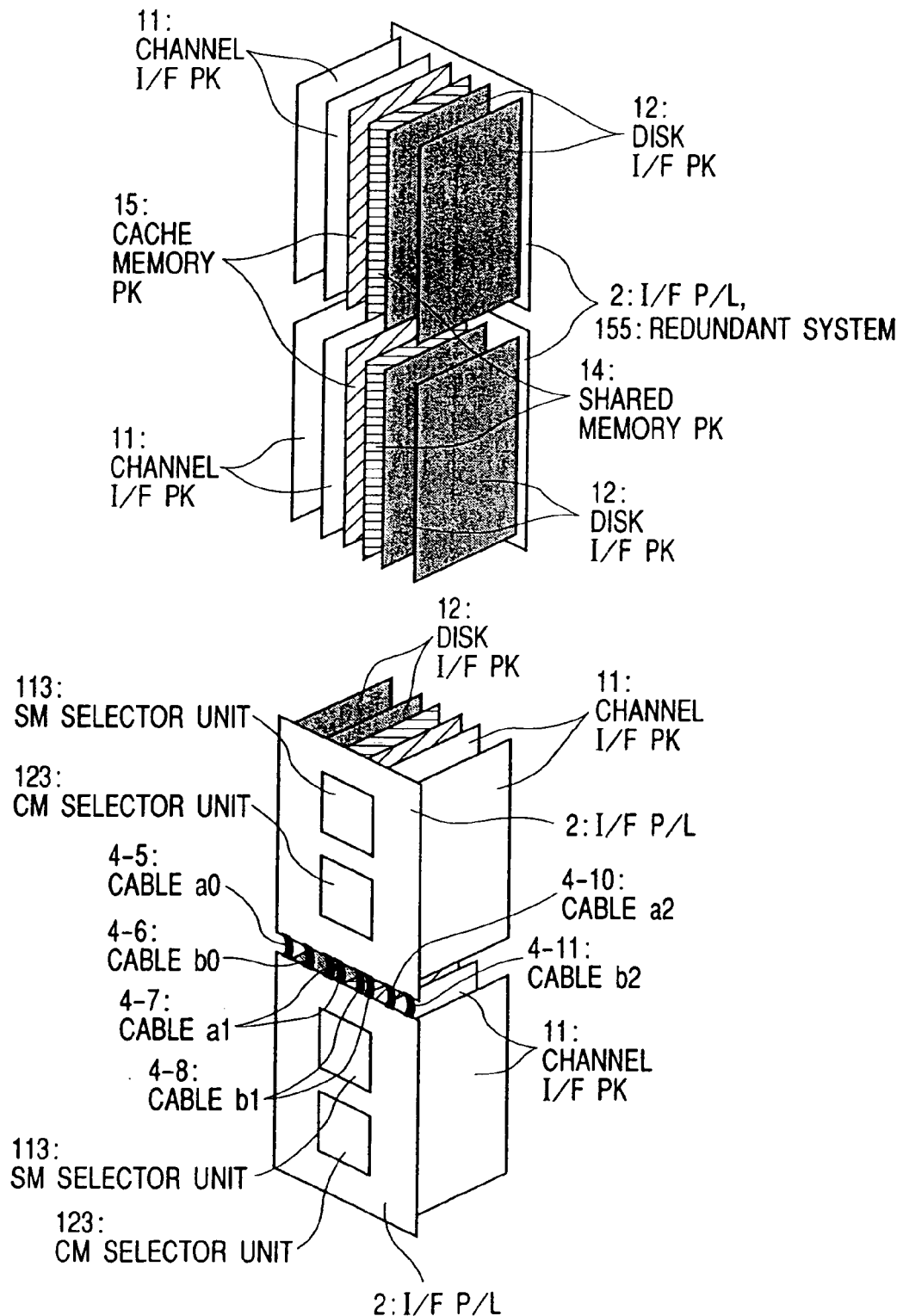
FIG. 76 shows another form of implementation of platters in a disk array controller according to this invention.
Figure 78:
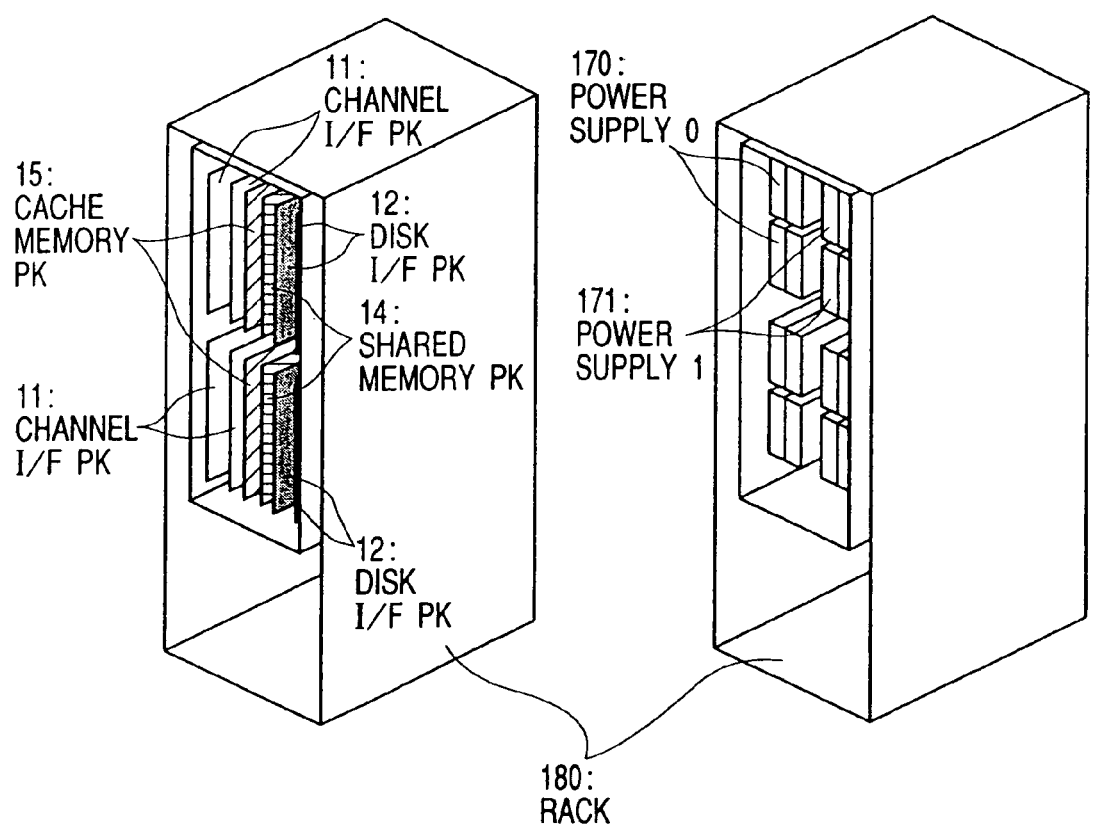
FIG. 78 shows another type of rack housing a disk array controller according to this invention.

FIGS. 76 and 78 show an embodiment in which the disk array controller 1 of embodiment 12 in FIG. 28 is mounted in the rack.

FIG. 76 illustrates how packages are mounted on platters and how the platters are positioned and interconnected. Each interface platter 2 bears two channel interface packages 11 and two disk interface packages 12, which constitute one selector group 150, as well as one shared memory package 14 and one cache memory package 15. The selector units (SM selector units) 113 connected to the shared memory packages, and the selector units (CM selector units) 123 connected to the cache memory packages are mounted on the backside of the interface platters 2. This can reduce the required width of the interface platters 2. Two interface platters make up a redundant system 155. The disk array controller 1 has two interface platters 2 which make up one redundant system 155.

Between two interface platters which constitute a redundant system 155, the channel interface packages 11 and disk interface packages 12 are connected with the SM selector units 113 and CM selector units 123 by cable a0 (4-5) and cable b0 (4-6), respectively.

Here, when two cables a0 (4-5) and two cables b0 (4-6) are used and one of the two cables is used for the access path to connect the interface units within one selector group 150 with the selector units within the other group 150 and the other cable is used for the access path to connect the selector units within the former selector group 150 with the interface units within the latter selector group 150, even if one of the access paths fails, the cable a0 (4-5) or cable b0 (4-6) can be replaced without affecting the other access path.

Between the platters, the SM selector units 113 and CM selector units 123 are connected with the shared memory units 114 and cache memory units 115 by two cables a1 (4-7) and two cables b1 (4-8), respectively. The two shared memory units 113 as a dual system and the two cache memory units 115 as a dual system are interconnected by cable a2 (4-10) and cable b2 (4-11), respectively. Therefore, the two interface platters are interconnected by a total of eight cables. However, the number of cables which can be used here is not limited as above.

Connectors for the cables which interconnect the platters are located on the backside of the platters, where the inter-platter cables are connected. This eliminates the need for detouring the inter-platter cables around the cables (not shown) for connection with the host computer 101 at the sub edge side of the channel interface packages 11 (opposite to the side where the packages are connected with the platters) or the cables (not shown) for connection with the magnetic disk drives 120 at the sub edge side of the disk interface packages 12, shortening the required cable length.

The interface platters 2 may be vertically arranged as shown in FIG. 76. This arrangement can shorten the cable length required to interconnect the platters.

FIG. 78 shows the platters in FIG. 76 which is housed in the rack 180. The platters bearing the packages are located on the front side in the rack and power supplies 0 (170) and 1 (171) are located behind them.

The power supplies 0 (170) and 1 (171) are separately connected with the platters, which facilitates power supply control during platter replacement.

As shown in FIG. 78, power may be supplied to each platter from a dual power supply system consisting of one power supply 0 (170) and one power supply 1 (171). When such a dual power supply system is used, even if one of the power supplies fails, the other power supply can be used; therefore, it is unnecessary to shut down the packages on the platter which has been energized by the defective power supply, decreasing the number of system components to be stopped in case of failure.

Embodiment 19

Figure 79:
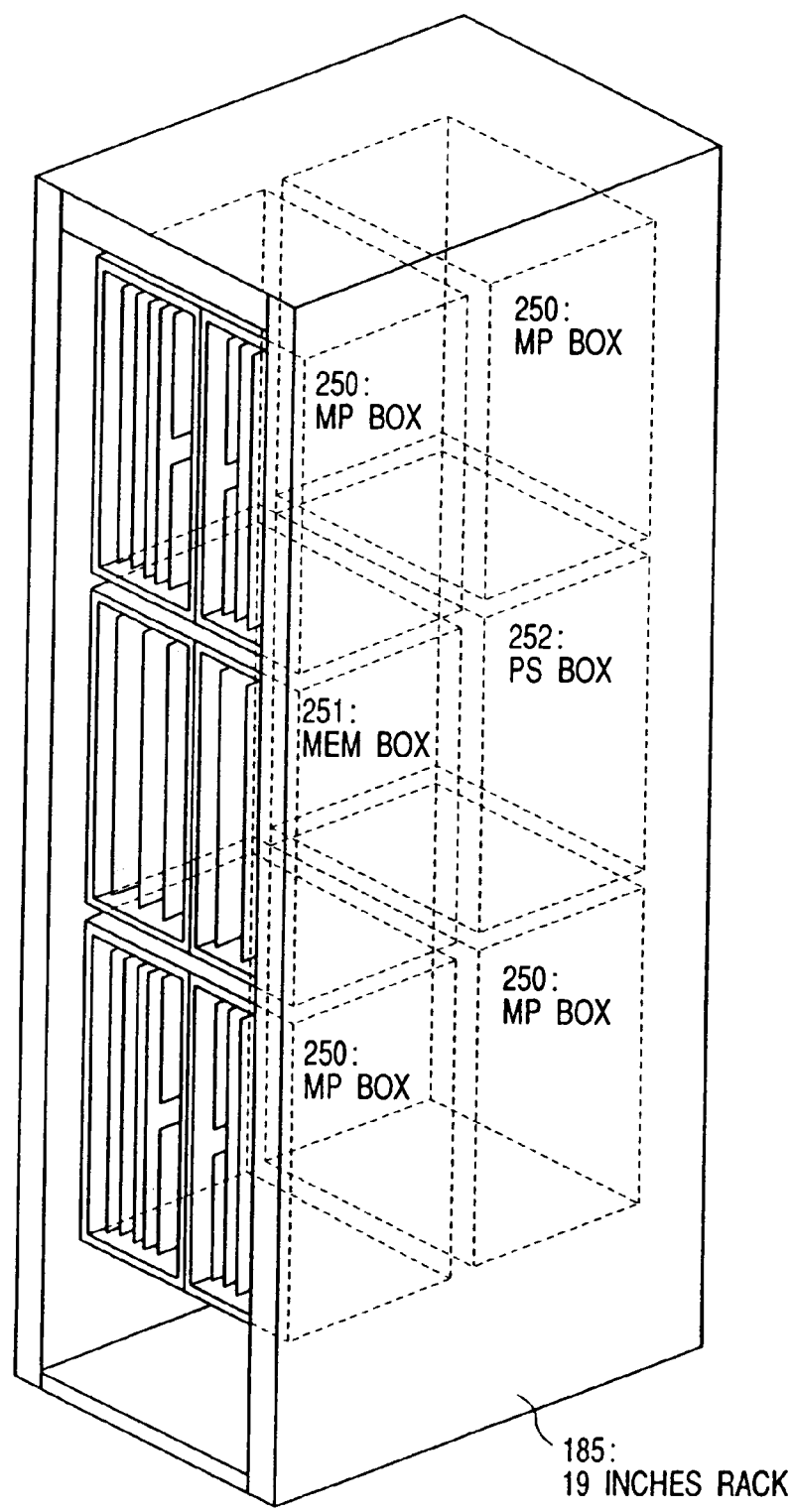
FIG. 79 shows another type of rack housing a disk array controller according to this invention.
Figure 80:
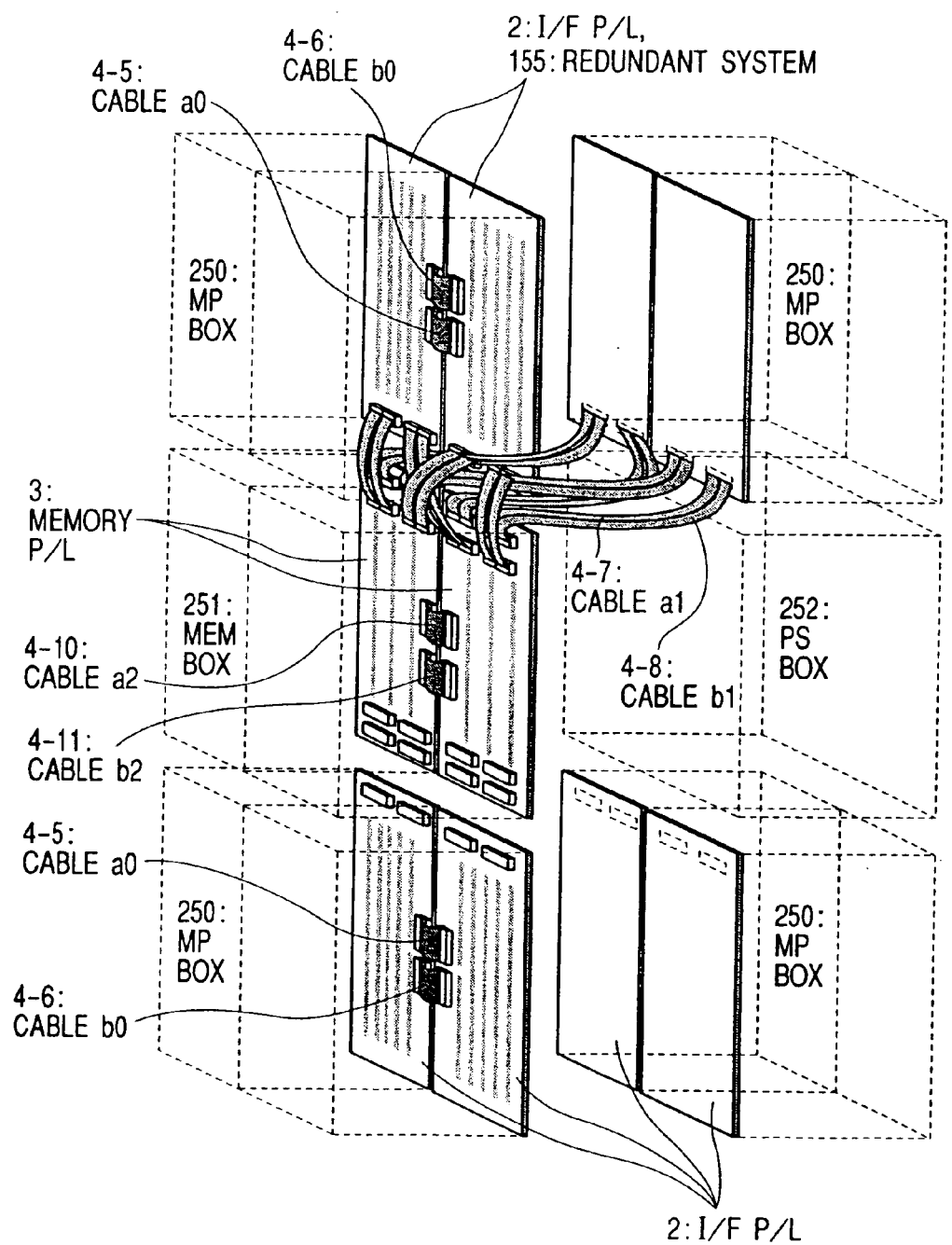
FIG. 80 shows connections between platters in a disk array controller according to this invention.

FIGS. 79 and 80 show another embodiment in which the disk array controller 1 of embodiment 12 in FIG. 28 is mounted in what is called a 19-inch rack (185).

FIG. 79 illustrates the disk array controller 1 housed in a 19-inch rack 185. Each MP box 250 houses channel interface packages 11, disk interface packages 12, a shared memory (SM) selector package 13 and a cache memory (CM) selector package 23. Shared memory packages 14 and cache memory packages 15 are housed in an MEM box 251. All power supplies are housed in a PS box 252. Thus, the disk array controller 1 consists of four MP boxes 250, one MEM box 251 and one PS box 252.

Figure 81:
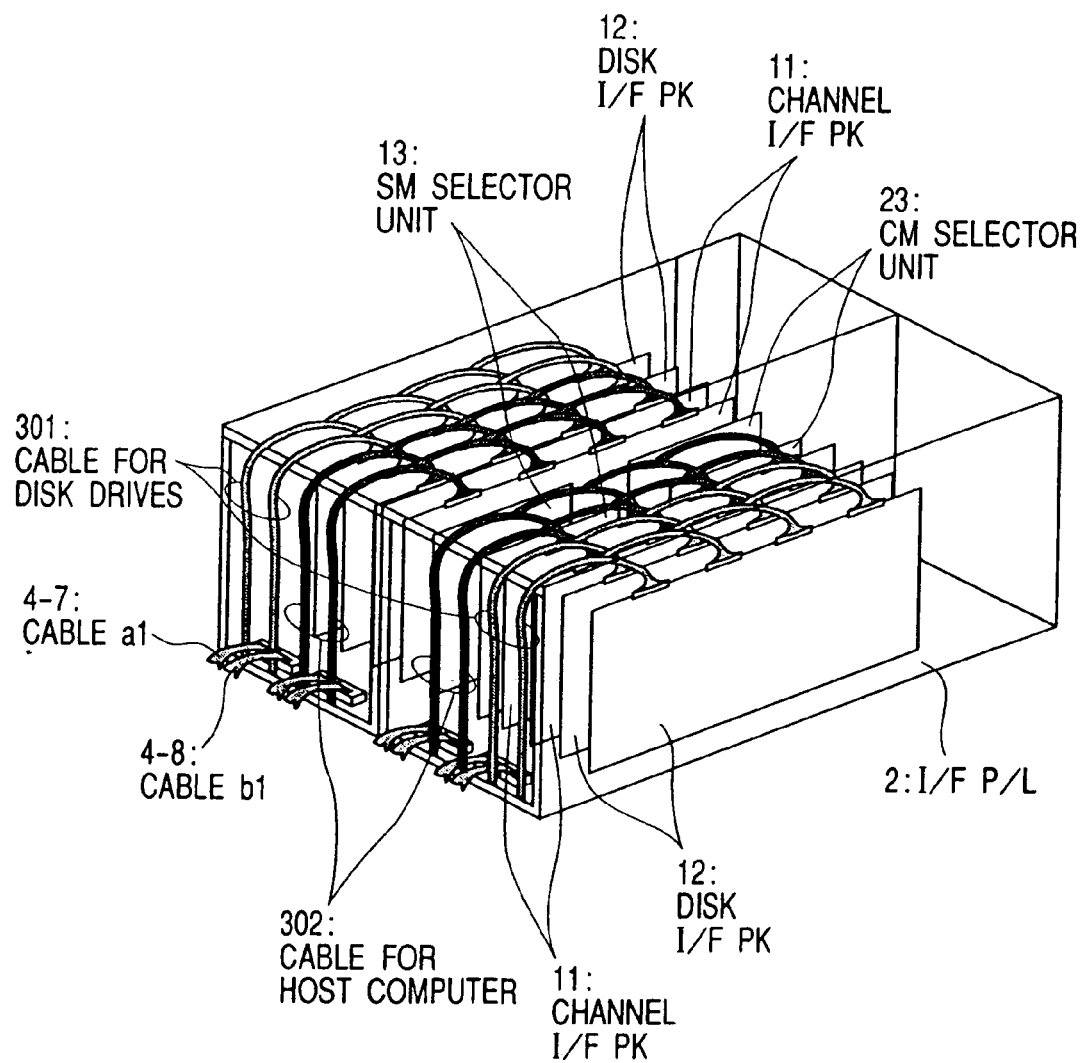
FIG. 81 shows how interface platters in a disk array controller according to this invention are mounted.

FIG. 81 shows, as an example, how channel interface packages 11, disk interface packages 12, SM selector packages 13 and CM selector packages 23 are housed in an MP box 250. One interface platter 2 bears a selector group 150 which consists of two channel interface packages 11, two disk interface packages 12, one SM selector package 13 and one CM selector packages 23.

Each interface platter is connected with two cables a1 (4-7) for connecting an SM selector package 13 with shared memory packages 14 and two cables b1 (4-8) for connecting a CM selector package 23 with cache memory packages 15.

One MP box 250 houses two interface platters 2 which constitute a redundant system 155. These two interface platters 2 are interconnected by cable a0 (4-5) and cable b0 (4-6) as shown in FIG. 80 to make up a redundant system.

Here, when two cables a0 (4-5) and two cables b0 (4-6) are used and one of the two cables is used for the access path to connect the interface units within one selector group 150 with a selector unit within the other selector group 150 and the other cable is used for the access path to connect a selector unit within the former selector group 150 with the interface units within the latter selector group 150, even if one of the access paths fails, the cable a0 (4-5) or cable b0 (4-6) can be replaced without affecting the other access path.

Four cables 302 for connection with the host computer 101 are connected at the sub edge side (opposite to the side where the packages are connected with the platters) of each channel interface package 11, and four cables 301 for connection with the magnetic disk drives 120 are connected at the sub edge side of each disk interface package 12.

Figure 82:
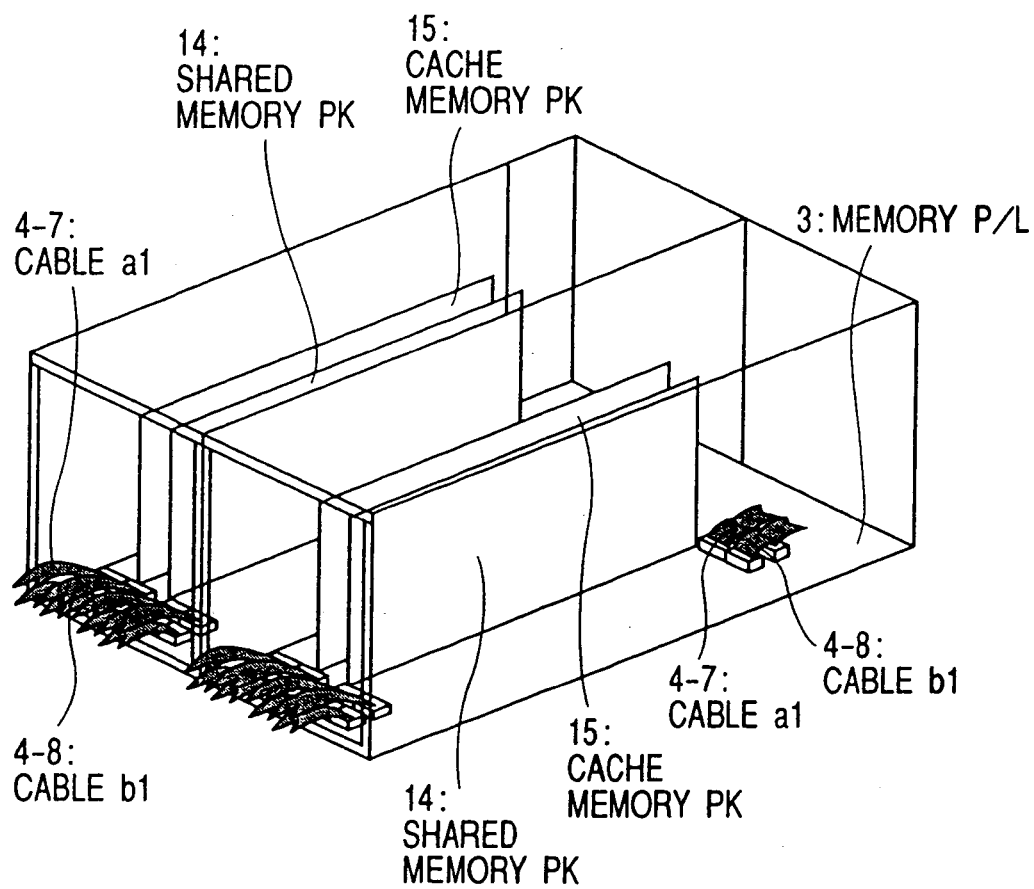
FIG. 82 shows how memory platters in a disk array controller according to this invention are mounted.

FIG. 82 shows, as an example, how shared memory packages 14 and cache memory packages 15 are housed in the MEM box 251. One memory platter bears two packages: one shared memory package 14 and one cache memory package 15.

Each memory platter 3 is connected with eight cables: cables a1 (4-7) for connection between the SM selector packages 13 and shared memory packages 14 and cables b1 (4-8) for connection between the CM selector packages 23 and cache memory packages 15.

To make a dual memory system, two memory platters 3 are housed in the MEM box 251 and the two memory platters 3 are interconnected by cable a2 (4-10) and cable b2 (4-11) as shown in FIG. 80.

Figure 83:
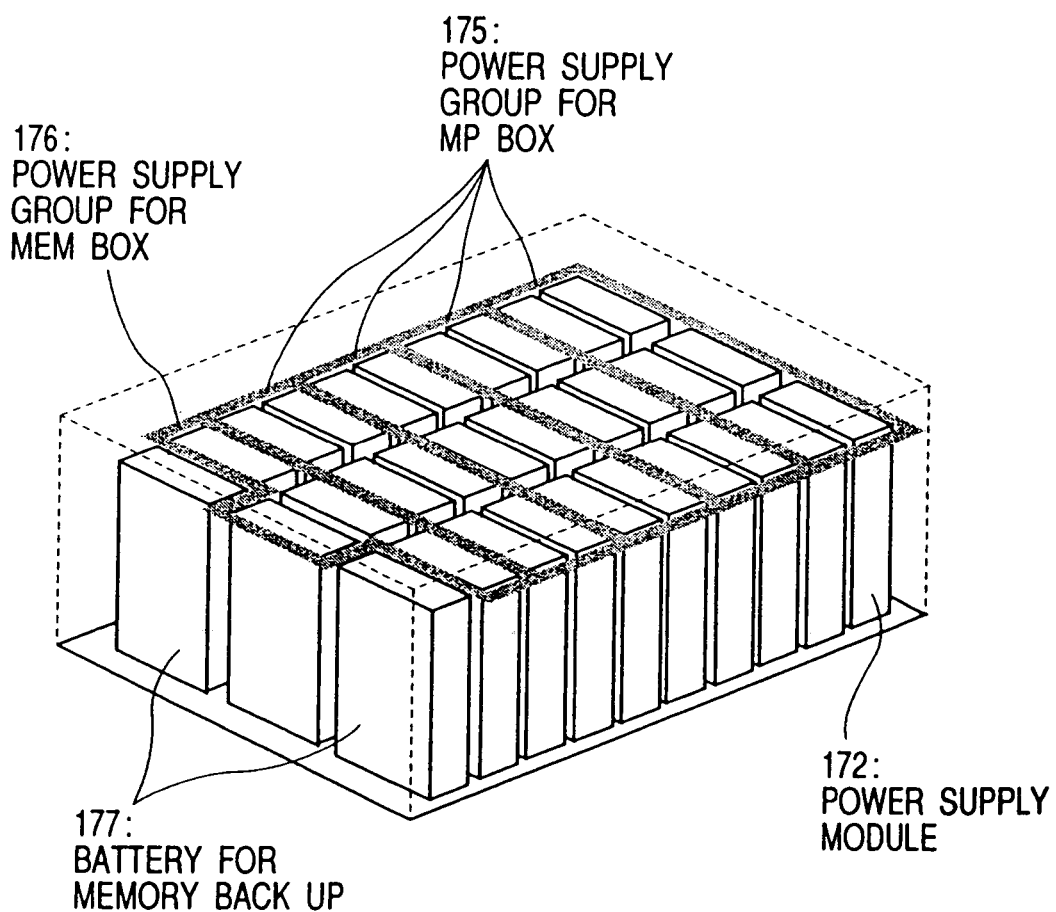
FIG. 83 shows how power supplies of a disk array controller according to this invention are mounted.

FIG. 83 shows, as an example, how power supplies are housed in the PS box 252. To one MP box, power is supplied from MP box power supply groups 175 each of which is composed of six power supply modules 172. The six power supply modules in each group constitute two 3-module sets to make a dual system. Power is supplied to one MEM box from an MEM box power supply group 176 composed of four power supply modules 172. These four power supply modules 172 constitute two 2-module sets to make a dual system. To back up the shared memory units 114 and cache memory units 115 in case of power failure, two memory backup batteries 177 are provided.

Because the disk array controller 1 consists of four MP boxes 250 and one MEM box 251, the PS box 252 houses four MP box power supply groups 175 and one MEM box power supply group 176.

FIG. 80 illustrates inter-platter cable connections. Between two interface platters constituting a redundant system, the channel interface packages 11 and disk interface packages 12 are connected with the SM selector units 113 and CM selector units 113 by cable a0 (4-5) and cable b0 (4-6), respectively.

Each interface platter 2 is connected with a total of four cables from two memory platters 3 where one cable a1 (4-7) and one cable b1 (4-8) come from each memory platter. Therefore, each memory platter 3 is connected with a total of 16 cables from eight interface platters 2, where one cable a1 (4-7) and one cable b1 (4-8) come from each interface platter.

The two memory platters 3 are interconnected by cable a2 (4-10) and cable b2 (4-11) to make a dual system of shared memory units 114 and a dual system of cache memory units 115.

The interface platters 2 are located so that the memory platters 3 are sandwiched by them. This can also shorten the cables which connect the interface and memory platters.

When the interface packages, memory packages and power supplies are housed in their respective boxes and the boxes are housed in the rack as mentioned above, the disk array controller 1 can be serviced box by box and thus its maintenance is easier.

In addition, a commercially available 19-inch rack can be used for the disk array controller, so it is possible to configure a workstation, server or other system housed in a 19-inch rack which includes storages.

So far, the best modes for embodying the invention have been explained using various embodiments. The invention may be embodied in other specific forms. For instance, in embodiments where channel interface units and disk interface units are not connected via shared buses, it is also possible to mount the channel interface packages and disk interface packages on different platters as mentioned for embodiment 1. In embodiments which have both shared memory units and cache memory units, it is also possible to mount the shared memory packages and cache memory packages on different platters. The above explanations have been made for a disk array controller which uses magnetic disk drives, but DVD-RAMs, magnet-optical disks, magnetic tape or other storages may be used in place of magnetic disk drives.

According to this invention, even if one platter fails, only components for which the packages mounted on that platter are responsible have to be stopped and a defective part on the platter can be replaced without stopping the entire system; in other words, faults can be remedied without stopping the system so that the system can be operated without interruption around the clock, all the year round.

In addition, to cope with the increase or decrease in the number of platters bearing interface packages, the performance of internal buses can be made scalable. Therefore, scalability of performance and capacity is assured to suit a wide range of systems from small to large systems without unfavorably affecting the cost performance. Besides, it becomes possible to supply products at reasonable prices which match the scale of the system.

What is claimed is:

1. A disk array controller comprising:
   a channel interface package in which at least a channel interface unit with a host computer and an access path interface unit are packaged;
   a disk interface package in which at least a disk interface with a disk drive and an access path interface unit are packaged:
   a memory package in which a memory unit for storing control data for the disk drive and an access path interface unit are packaged,
   wherein connections are made between the access path interface unit in the channel interface package and the access path interface unit in the memory package and between the access path interface unit in the disk interface package and the access path interface unit in the memory package by cables; and
   a platter,
   wherein the channel interface package and the disk interface package are mounted on the platter,
   wherein a first path and a second path are printed on the platter,
   wherein the first path couples the channel interface package to the cables, and
   wherein the second path couples the disk interface package to the cable.

2. A disk array controller comprising:
   a channel interface package in which at least a channel interface unit with a host computer and an access path interface unit are packaged;
   a disk interface package in which at least a disk interface with a disk drive and an access path interface unit are packaged:
   a memory package in which a memory unit for storing control data for the disk drive and an access path interface unit are packaged,
   wherein connections are made between the access path interface unit in the channel interface package and the access path interface unit in the memory package and between the access path interface unit in the disk interface package and the access path interface unit in the memory package by cables;
   first and a second platters;
   a first cable coupling the channel interface package and the memory packages; and
   a second cable coupling the disk interface package and the memory package,
   wherein the channel interface package is mounted on the first platter, and the disk interface package is mounted on the second platter,
   wherein a path coupling the channel interface package to the cable is printed on the first platter, and
   wherein a path coupling the disk interface package and the cable is printed on the second platter.

3. A disk array controller comprising:
   a channel interface unit to be coupled with a host computer;
   a disk interface unit to be coupled with a disk drive;
   a memory unit for storing control data for the disk drive;
   a first platter on which the channel interface unit is mounted;
   a second platter on which the disk interface unit is mounted;
   a third platter on which the memory unit is mounted;
   a first cable which couples the first and third platters:
   a second cable which couples the second and third platters,
   wherein a path coupling the channel interface unit to the first cable is printed on the first platter,
   wherein a path coupling the memory unit to the first cable is printed on the third platter,
   wherein a path coupling the memory unit to the second cable is printed on the third platter;
   a cache memory unit for storing data to be recorded into the disk drive;
   a fourth platter on which the cache memory unit is mounted;
   a third cable which couples the first and fourth platters; and
   a fourth cable which couples the second and fourth platters,
   wherein a path coupling the cache memory unit to the third cable is printed on the fourth platter, and
   wherein a path coupling the cache memory unit to the fourth cable is printed on the fourth platter.

* * * * *